United States Patent
Kahn et al.

(10) Patent No.: US 10,941,075 B2
(45) Date of Patent: Mar. 9, 2021

(54) METHOD OF FORMING A SELF-CONSOLIDATING CONCRETE CONSTRUCTION WITH SELF-ROUGHENING PROPERTIES

(71) Applicant: Georgia Tech Research Corporation, Atlanta, GA (US)

(72) Inventors: Lawrence Kahn, Atlanta, GA (US); Kimberly E. Kurtis, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 473 days.

(21) Appl. No.: 15/575,281

(22) PCT Filed: May 19, 2016

(86) PCT No.: PCT/US2016/033373
§ 371 (c)(1),
(2) Date: Nov. 17, 2017

(87) PCT Pub. No.: WO2016/187482
PCT Pub. Date: Nov. 24, 2016

(65) Prior Publication Data
US 2018/0162776 A1 Jun. 14, 2018

Related U.S. Application Data

(60) Provisional application No. 62/163,772, filed on May 19, 2015.

(51) Int. Cl.
*B29C 39/12* (2006.01)
*C04B 28/04* (2006.01)
(Continued)

(52) U.S. Cl.
CPC .............. *C04B 28/04* (2013.01); *B29C 39/02* (2013.01); *B29C 39/12* (2013.01); *B29C 39/123* (2013.01);
(Continued)

(58) Field of Classification Search
None
See application file for complete search history.

(56) References Cited

U.S. PATENT DOCUMENTS 2,727,829 A * 12/1955 Chertkof .............. C04B 20/1022
427/221
3,015,192 A * 1/1962 Jones ........................ E04B 2/02
206/322
(Continued)

FOREIGN PATENT DOCUMENTS

| CN | 103803904 | 5/2014 |
|---|---|---|
| GB | 228538 | 2/1924 |

(Continued)

OTHER PUBLICATIONS http://clemtex.com/literature/files/concrete-surface-profile-visual-scale.pdf teaches a CSP 7 or greater is needed for concrete overlay. 2020 (Year: 2020).*
(Continued)

*Primary Examiner* — Edmund H Lee
(74) *Attorney, Agent, or Firm* — Troutman Pepper Hamilton Sanders LLP; Ryan A. Schneider

(57) ABSTRACT

Adding a small amount of lightweight course aggregate to a normal weight concrete mix to produce a clean, rough top surface so that manual or mechanical roughing of the top surface is not necessary. The lightweight course aggregate will float to the surface, and make a rough surface so that the bond and shear resistance of the interface (cold joint)
(Continued)

(a)       (b)

between previously placed and newly placed concrete will be as strong as a manually roughened joint.

22 Claims, 51 Drawing Sheets

(51) Int. Cl.
    *C04B 28/02*      (2006.01)
    *B29C 39/02*      (2006.01)
    *C04B 14/06*      (2006.01)
    *C04B 18/02*      (2006.01)
    *C04B 111/00*      (2006.01)
    *C04B 103/00*      (2006.01)
    *C04B 111/40*      (2006.01)

(52) U.S. Cl.
    CPC ............ *C04B 14/06* (2013.01); *C04B 18/027* (2013.01); *C04B 28/02* (2013.01); *C04B 2103/0027* (2013.01); *C04B 2111/00103* (2013.01); *C04B 2111/00612* (2013.01); *C04B 2111/40* (2013.01); *Y02W 30/91* (2015.05)

(56) References Cited

U.S. PATENT DOCUMENTS

| | | | | |
|---|---|---|---|---|
| 3,775,529 A | * | 11/1973 | Paton | B28B 11/0863 264/162 |
| 4,060,581 A | * | 11/1977 | Darby | B28B 7/168 264/131 |
| 4,314,390 A | * | 2/1982 | Darby | A61G 17/007 27/35 |
| 4,496,504 A | * | 1/1985 | Steenson | B28B 19/0007 249/18 |
| 4,741,782 A | * | 5/1988 | Styron | C04B 18/027 106/122 |
| 4,774,045 A | * | 9/1988 | Kushida | B28B 1/008 264/133 |
| 2007/0079733 A1 | | 4/2007 | Crocker | |

FOREIGN PATENT DOCUMENTS

| | | |
|---|---|---|
| GB | 228538 | 4/1926 |
| GB | 2512606 | 10/2014 |
| JP | 62033919 | * 8/1987 |
| JP | 03183508 | * 8/1991 |
| JP | 2001260110 | * 9/2001 |
| WO | 2012139587 | 10/2012 |

OTHER PUBLICATIONS

Search Report and Office Action from Chinese application No. 2016800427964 dated Feb. 4, 2020 (with 4 pages of English translation).

Search Report and Opinion from PCT Application No. PCT/US16/033373 dated Aug. 25, 2016 (10 pages).

\* cited by examiner

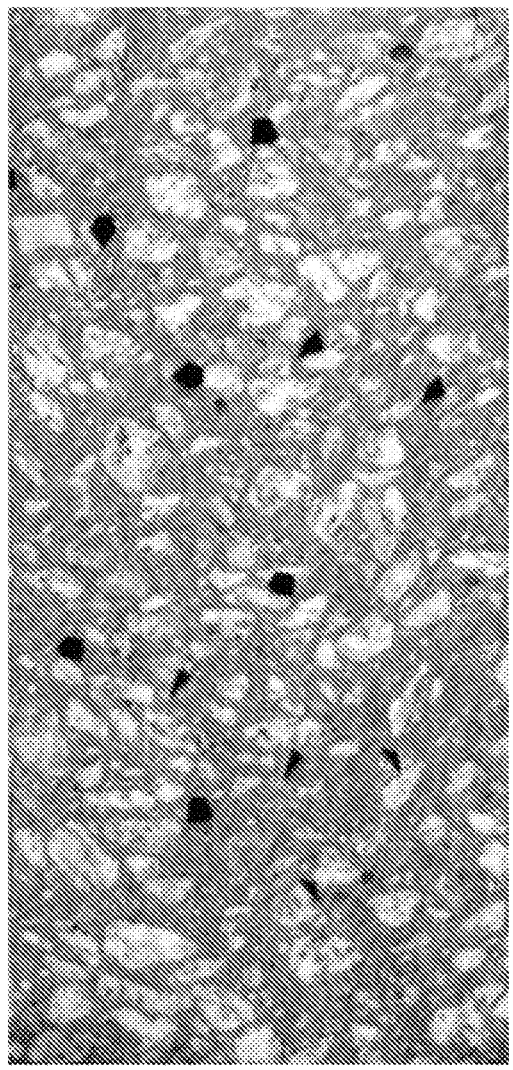 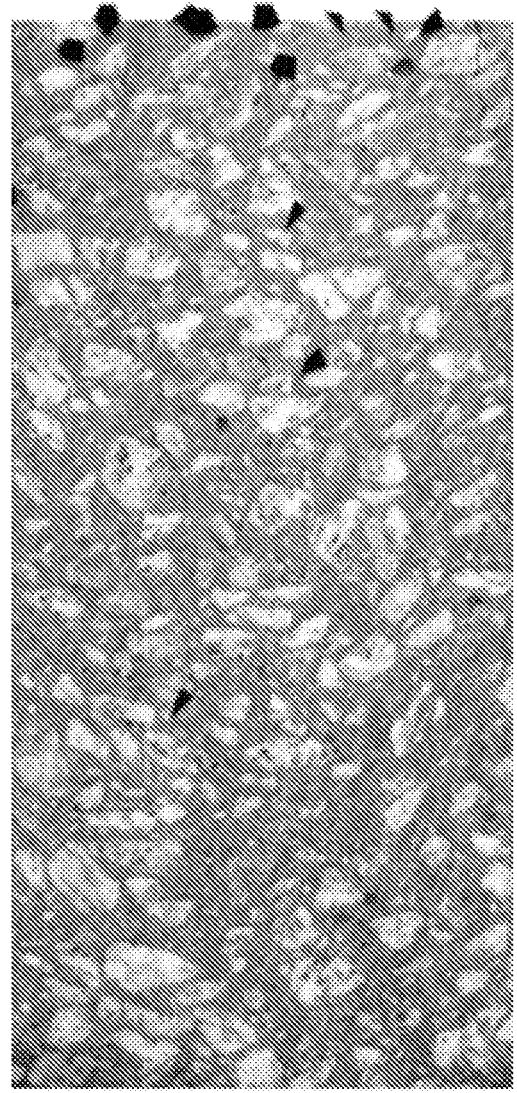
(a)              (b)
Fig. 1

FINESSES MODULUS: 6.46

| No. 100<br>150 μm | No. 50<br>300 μm | No. 30<br>600 μm | No. 16<br>1.18 mm | No. 8<br>2.36 mm | No. 4<br>4.75 mm | 3/8"<br>9.5 mm | 3/4"<br>19 mm | 1 1/2"<br>37.5 |
|---|---|---|---|---|---|---|---|---|
| 1 | 2 | 3 | 4 | 5 | 6 | 7 | 8 | 9 |

∧

PHYSICAL CHARACTERISTICS OF #67 VULCAN AGGREGATE

DENSITY
- DRY LOOSE (ASTM C29)                       96 lb/ft$^3$ (1538 kg/m$^3$)
- SATURATED SURFACE DRY LOOSE (ASTM C29)    102 lb/ft$^3$ (1633 kg/m$^3$)

SPECIFIC GRAVITY
- DRY (ASTM C127)                        2.75
- SATURATED SURFACE DRY (ASTM C127)       2.80

ABSORPTION
- SATURATED SURFACE DRY (ASTM C127)       0.51%

FINESSES MODULUS: 5.62

| No. 100 | No. 50 | No. 30 | No. 16 | No. 8 | No. 4 | 3/8" | 3/4" | 1 1/2" |
|---|---|---|---|---|---|---|---|---|
| 150 μm | 300 μm | 600 μm | 1.18 mm | 2.36 mm | 4.75 mm | 9.5 mm | 19 mm | 37.5 |
| 1 | 2 | 3 | 4 | 5 | 6 | 7 | 8 | 9 |

∧

PHYSICAL CHARACTERISTICS OF #89 VULCAN AGGREGATE

DENSITY
• DRY LOOSE (ASTM C29)                           92.3 lb/ft³ (1479 kg/m³)
• SATURATED SURFACE DRY LOOSE (ASTM C29)         98.0 lb/ft³ (1570 kg/m³)

SPECIFIC GRAVITY
• DRY (ASTM C127)                                2.65
• SATURATED SURFACE DRY (ASTM C127)              2.71

ABSORPTION
• SATURATED SURFACE DRY (ASTM C127)              0.64%

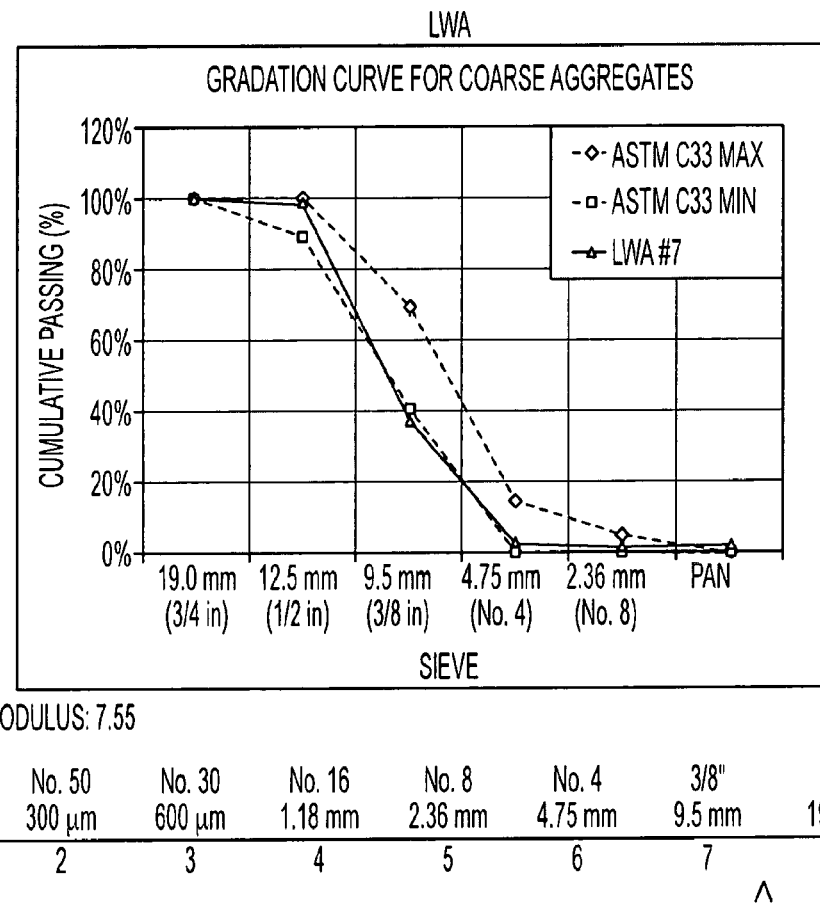

LWA
GRADATION CURVE FOR COARSE AGGREGATES

FINESSES MODULUS: 7.55

| No. 100 | No. 50 | No. 30 | No. 16 | No. 8 | No. 4 | 3/8" | 3/4" | 1 1/2" |
|---|---|---|---|---|---|---|---|---|
| 150 μm | 300 μm | 600 μm | 1.18 mm | 2.36 mm | 4.75 mm | 9.5 mm | 19 mm | 37.5 |
| 1 | 2 | 3 | 4 | 5 | 6 | 7 | 8 | 9 |

PHYSICAL CHARACTERISTICS OF EXPANDED STALITE AGGREGATE 1/2" (12.5mm)

DENSITY
- DRY LOOSE (ASTM C29)                          50 lb/ft³ (805 kg/m³)
- SATURATED SURFACE DRY LOOSE (ASTM C29)        52 lb/ft³ (833 kg/m³)

SPECIFIC GRAVITY
- DRY (ASTM C127)                               1.45
- SATURATED SURFACE DRY (ASTM C127)             1.52

ABSORPTION
- SATURATED SURFACE DRY (ASTM C127)             6%
- UNDER HIGH PUMPING PRESSURE OF 150 psi (1033 kPa) 9.4%

FIG. 4

NATURAL SAND

FINESSES MODULUS: 3.04

| No. 100 | No. 50 | No. 30 | No. 16 | No. 8 | No. 4 | 3/8" | 3/4" | 1 1/2" |
|---|---|---|---|---|---|---|---|---|
| 150 µm | 300 µm | 600 µm | 1.18 mm | 2.36 mm | 4.75 mm | 9.5 mm | 19 mm | 37.5 |
| 1 | 2 | 3 | 4 | 5 | 6 | 7 | 8 | 9 |

∧

DENSITY
• DRY LOOSE (ASTM C29)    164 lb/ft³ (2627 kg/m³)

SPECIFIC GRAVITY
• DRY (ASTM C127)    2.639

ABSORPTION
• SATURATED SURFACE DRY (ASTM C127)    0.401%

FINESSES MODULUS: 2.77

| No. 100 | No. 50 | No. 30 | No. 16 | No. 8 | No. 4 | 3/8" | 3/4" | 1 1/2" |
|---|---|---|---|---|---|---|---|---|
| 150 μm | 300 μm | 600 μm | 1.18 mm | 2.36 mm | 4.75 mm | 9.5 mm | 19 mm | 37.5 |
| 1 | 2 | 3 | 4 | 5 | 6 | 7 | 8 | 9 |

∧

DENSITY
- DRY LOOSE (ASTM C29)  166 lb/ft³ (2659 kg/m³)

SPECIFIC GRAVITY
- DRY (ASTM C127)  2.653

ABSORPTION
- SATURATED SURFACE DRY (ASTM C127)  0.422%

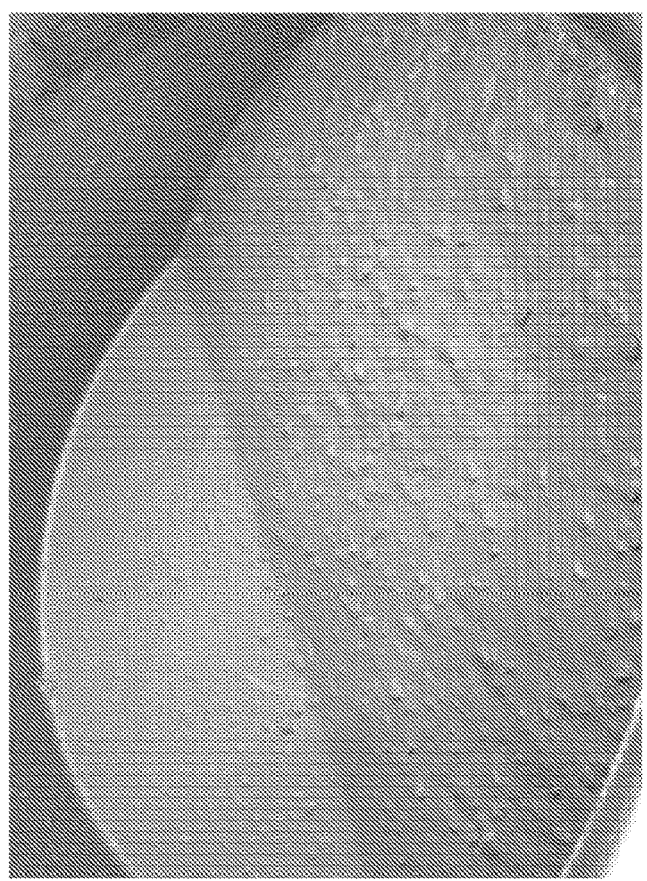
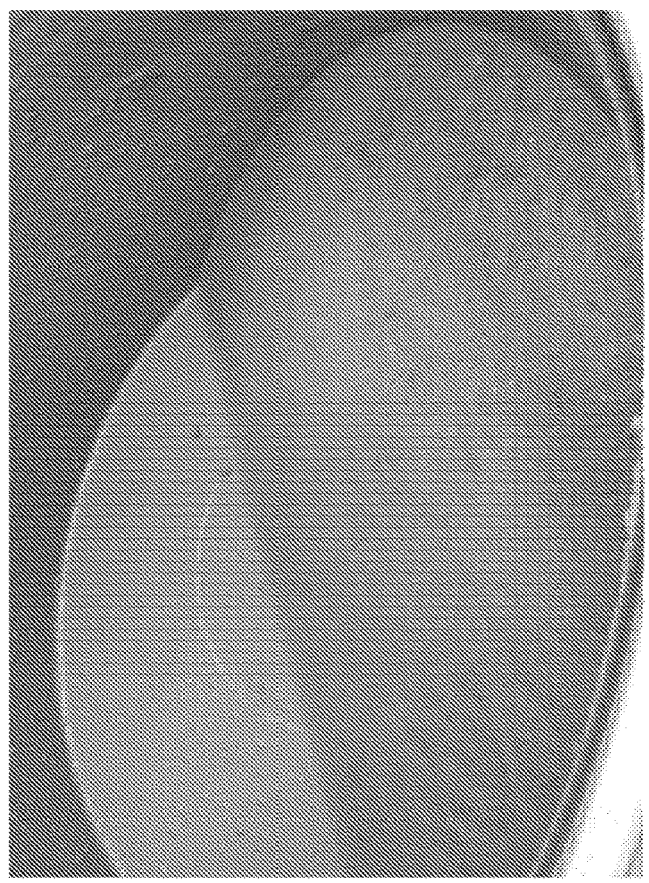
Fig. 7

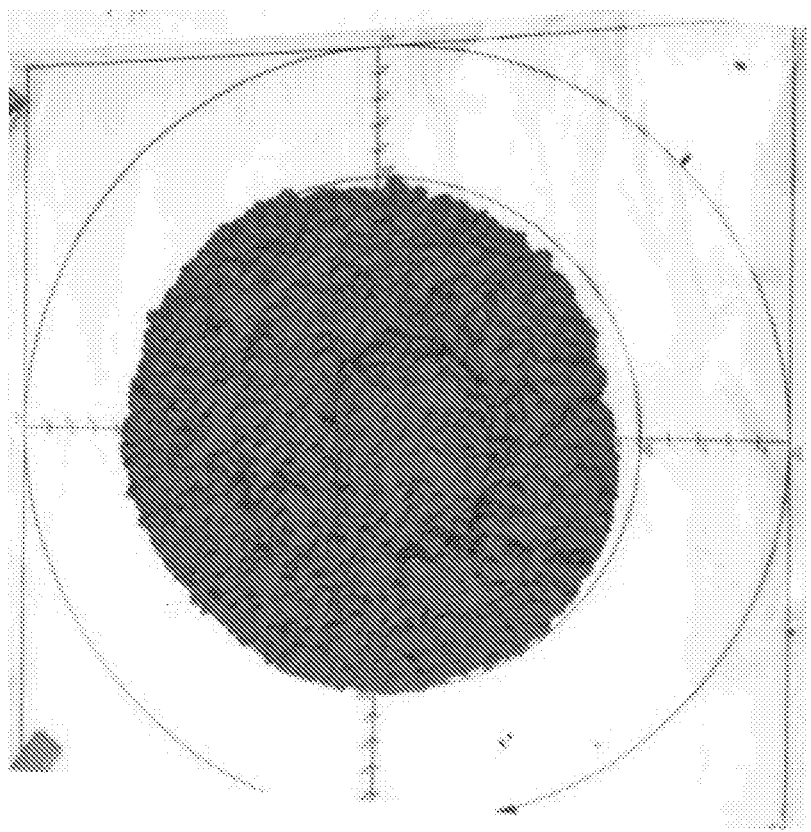
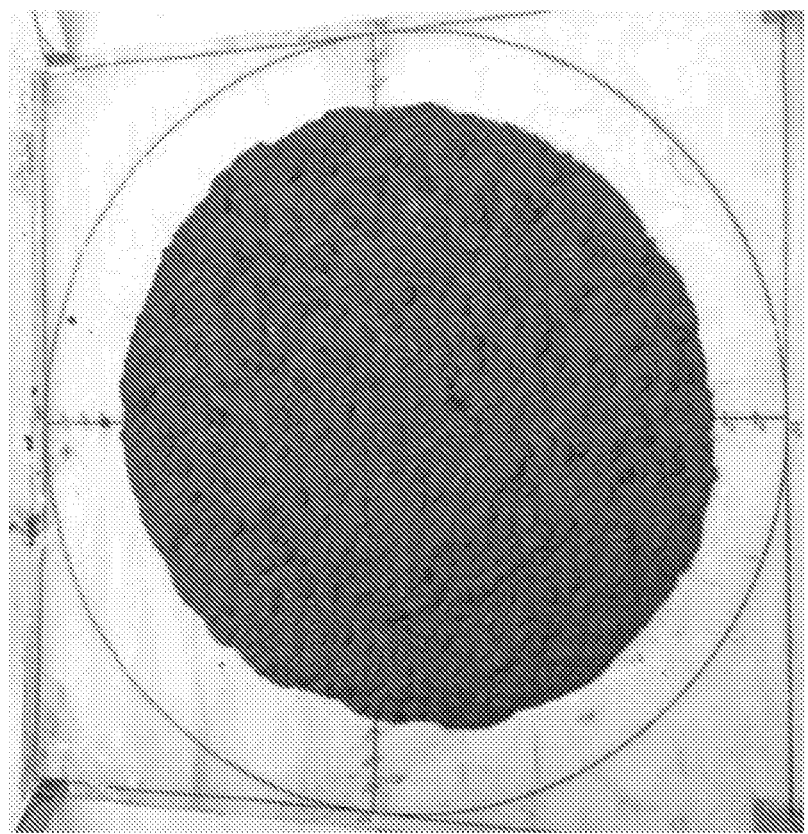
Fig. 10

3 PROPERTIES $A_3 := \left(\frac{3}{8}in\right)^2 \cdot \frac{\pi}{4} = 0.11 \cdot in^2$ $f_y := 92\,ksi$ SHEAR FRICTION CONCRETE AREA (Ac):

$t_c := 7.5in$ $h_c := 12in$ $A_c := t_c \cdot h_c = 90 \cdot in^2$

STEEL REINFORCEMENT RATIOS:

0.25% - 1 TWO-LEG STIRRUPS No.3    $P_{25} := \frac{2A_3}{A_c} = 0.25\%$ 0.50% - 2 TWO-LEG STIRRUPS No.3    $P_{50} := \frac{4A_3}{A_c} = 0.49\%$ 0.75% - 3 TWO-LEG STIRRUPS No.3    $P_{75} := \frac{6A_3}{A_c} = 0.74\%$

STEEL PLATE DESIGN BASED ON YIELD

PLATE HEIGHT $d_p := h_c$ AND USING A $f_y$ OF THE PLATE EQUAL TO 36ksi  $f_{yplate} := 36ksi$ $t_{25} := \frac{A_3 \cdot f_y}{f_{yplate} \cdot h_c} = 0.024in$    $t_{50} := \frac{2A_3 \cdot f_y}{f_{yplate} \cdot h_c} = 0.047in$    $t_{75} := \frac{3A_3 \cdot f_y}{f_{yplate} \cdot h_c} = 0.071in$ USING THE REAL $f_y$ OF THE STEEL PLATES:

$f_{y22} := 48ksi$         $f_{y16} := 45ksi$         $f_{y13} := 31ksi$ $t_{25r} := \frac{A_3 \cdot f_y}{f_{y22} \cdot h_c} = 0.018in$    $t_{50r} := \frac{2A_3 \cdot f_y}{f_{y16} \cdot h_c} = 0.038in$    $t_{75r} := \frac{3A_3 \cdot f_y}{f_{y13} \cdot h_c} = 0.082in$ $t_{0.25} := \frac{2A_3}{d_p} \cdot \frac{f_y}{f_{yplate}} = 0.047in$    22 GAUGE (0.03125in)

$t_{0.50} := \frac{4A_3}{d_p} \cdot \frac{f_y}{f_{yplate}} = 0.0941in$    16 GAUGE (0.0625in)

$t_{0.75} := \frac{6A_3}{d_p} \cdot \frac{f_y}{f_{yplate}} = 0.1411in$    13 GAUGE (0.09375in)

$t := \frac{2A_3}{1in} \cdot \frac{f_y}{f_{yplate}} = 0.565in$    00 GAUGE (0.0375in)

FIG. 19

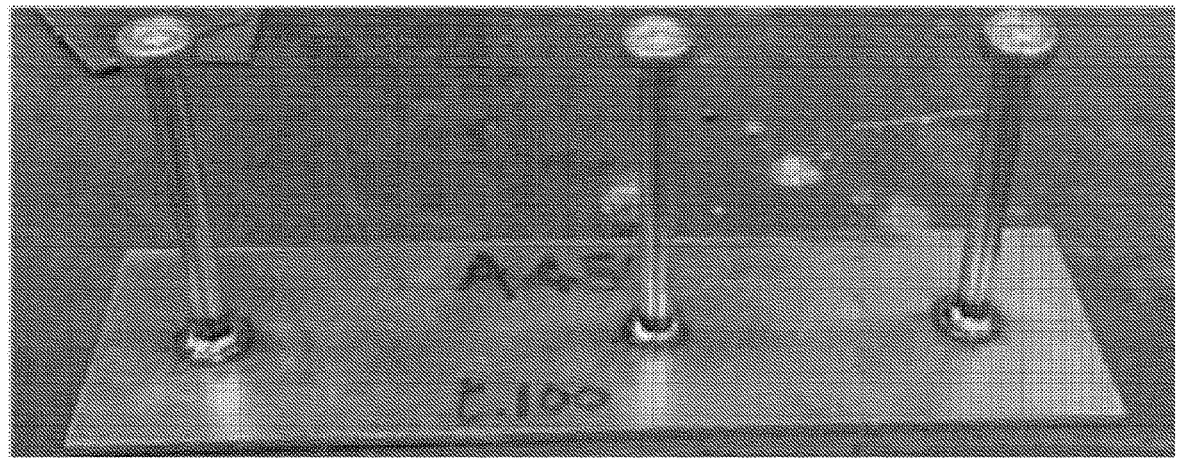
(a)
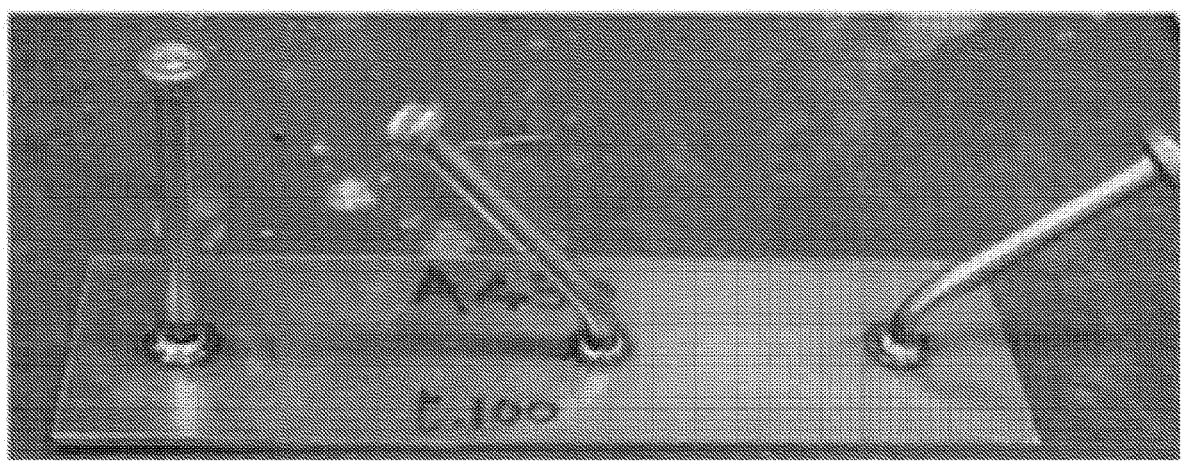
(b)
Fig. 20

METHOD OF FORMING A SELF-CONSOLIDATING CONCRETE CONSTRUCTION WITH SELF-ROUGHENING PROPERTIES

CROSS-REFERENCE TO RELATED APPLICATIONS

This application claims the benefit of U.S. Provisional Patent Application No. 62/163,772, filed 19 May 2015, which is hereby incorporated herein by reference in its entirety.

BACKGROUND OF THE INVENTION

1. Field of the Invention

The present invention relates to concrete systems and methods, and more particularly to the incorporation of lightweight course aggregate into self-consolidating concrete to form a rough surface for concrete construction.

2. Description of Related Art

Development of self-consolidating concrete (SCC) has been an important advancement in concrete technology and one which, with its growing use of the past 15 years, has fundamentally changed construction practices, while also producing savings in labor, costs, and time. In an exemplary environment like the construction of nuclear structures, SCC is used in placements between the steel plates of modules that may be as high as 90 ft. The concrete is placed continuously to avoid cold joints in the concrete.

Yet, placing concrete continuously is costly and not always possible. Having a sufficient number of ready-mix trucks organized by time and space is often not possible, especially in remote locations. A two-to-three hour delay in a truck delivery will result in a cold joint. Further, high placements create high hydrostatic loads against the plates that subsequently require stout reinforcement, not for resisting loads imposed by the plant operations, but just for concrete placement.

Permitting cold joints would mitigate if not eliminate the need for careful scheduling of ready-mix trucks and reduce the bursting construction loads on the plates, wherein each reduction would reduce costs and simplify design. This is true for nearly all mass concrete construction projects, not just in the example of nuclear construction. Cold joints have been used in construction of post-tensioned concrete containment walls. The strengths of the joints are determined based upon the shear-friction developed across the cold joint. This "friction" depends on the surface roughness, bond between the new are previously placed concrete, reinforcement that crosses the joint, and loading perpendicular to the joint.

Because of its typically high paste or mortar fraction and its reliance on very fine particles (e.g., silica fume, metakaolin, limestone, and other mineral powders), and because SCC "self-levels", the surface of SCC once set is typically very smooth. As a result, little shear-friction is expected to develop across cold joints of ordinary SCC.

The American Concrete Institute (ACI) Code Requirements for Nuclear Safety-Related Concrete Structures & Commentary, ACI 349-06, specifies that when shear friction reinforcement is perpendicular to the shear plane, the nominal shear capacity $V_n$ of the shear plane (the cold joint) may be calculated by Eqn. (1):

$$V_n = \mu A_v f_y \quad (1)$$

Where $\mu$ is the coefficient of friction, $A_v$ is the area of shear reinforcement across shear plane, and $f_y$ is the yield stress of reinforcement (≤60 ksi).

Some exemplary coefficients of friction include 1.4 for a monolithic concrete connection, 1.0 for concrete placed against hardened concrete intentionally roughed with ¼ inch roughness amplitude (a rough cold-joint), 0.7 for concrete anchored to as-rolled structural steel by headed studs or reinforcing bars, and 0.6 for concrete placed against hardened concrete not intentionally roughed (a smooth cold-joint)

While ACI 349-06 limits $V_n$ to the concrete area times 800 psi, ACI 318-11 limits the strength to the concrete area times 1600 psi based on *Shear Friction Tests with High-Strength Concrete*, Kahn, L. F., and A. D. Mitchell, 2002, ACI Structural Journal 99 (1): 98-103. The area of shear reinforcement, $A_v$, would include any vertical steel reinforcing bars in the module plus the surface steel plate.

Kahn and Slapkus conducted research on the interface shear between a precast concrete beam and poured-in-place concrete deck. *Interface Shear in High Strength Composite T-Beams*, Kahn, L. F., and A. Slapkus, 2004, PCI Journal 49(4): 102-110. The shear strength of that cold-joint interface is determined using shear friction concepts as presented in both ACI 349-06 and ACI 318-11 chapter 17. Kahn and Slapkus (2004) concluded that the strength of the interface could be calculated accurately using shear friction results presented by Kahn and Mitchell (2002) and that as noted by Loov and Patnaik (*Horizontal Shear Strength of Composite Concrete Beams With a Rough Interface*, Loov, R. E. and A. K. Patnaik 1994, PCI Journal 39(1): 48-69) and by shear friction push-off tests by Kahn and Mitchell (2002), a clean and rough as-cast surface where aggregates protrude ¼-in. (6 mm) provided an adequate surface for developing good composite action.

Those shear friction results demonstrated that the one surface of the concrete did not need to be intentionally roughed by a rake or by cast-in keys—the surface could be intentionally roughened by having the aggregate protrude from the surface of the concrete in an "as cast" state.

From the code provision and research findings, the rough surfaces provide substantially more strength than a smooth surface. Therefore, about 40% less reinforcement is needed to develop a specific required strength if the surface is rough rather than smooth.

Further, some conventional procedures in the building industry require that personnel roughen the cold joint. Again, this is true for nearly all mass concrete construction projects, not just in the example of nuclear construction. The confined space between steel walls of the modules, the closely spaced reinforcement, and the distance down from the top (up to 90 ft.) make the roughening of the joint by workers very difficult, time-consuming, and expensive and require heightened safety procedures. Further, it can be challenging to ensure effective roughening, particularly for SCC, where if these operations are not timed appropriately, the concrete can flow and mitigate the effects of roughening operations. Eliminating special construction operations by personnel in this space will be a great benefit in time, costs and safety.

Finally, the fluidity and cohesiveness of traditional SCC derive, at least in part, from its higher paste fraction (i.e., in addition to controlling aggregate size and gradation and appropriate use of supplementary cementitious and inert materials and chemical admixtures). The total cementitious content—cement and supplementary cementitious materials (SCMs)—found in SCC typically exceeds 800 lbs/yd³. As a result of SCC's higher paste fraction along with the common use of smaller maximum size coarse aggregate and finely divided SCMs and powders (e.g., limestone), increased shrinkage is observed, which in composite elements can potentially lead to delamination from steel walls, affecting structural capacity and durability.

In addition, the higher cement contents and use of certain SCMs characteristics of SCC can increase heat development and lead to thermal issues during construction. Constructions of the scale typical in the nuclear industry are considered mass concrete. While various agencies have different dimensional limits to discriminate mass concrete, generally when the minimum dimension exceeds 3 to 4 feet, especially where cement contents in excess of 600 lbs/yd, high early strength cement (e.g., ASTM C150 Type III), and/or accelerators are used (ACI 301-10) a placement can be considered to be mass concrete. Therefore, the combination of the scale of concrete for nuclear structures or other mass concrete constructions along with the high cementitious fraction, requires specialized SCC to be developed for these applications.

It would be beneficial to find SCC mixes that can address the particular challenges associated with mass concrete construction—both the increasing potential for problematic shrinkage and thermal effects—while also producing improvements in cold joint shear friction.

Therefore, there is a need for SCC mixtures that enable concrete placement into steel plate composite (SC) modular structures without the need for continuous concrete placement. Such innovative SCC mixtures must exhibit sufficient shear capacity across cold-joints, while minimizing shrinkage and temperature increase during curing to enhance concrete bonding with the steel plate construction found in modular units. It is to the provision of such SCC mixtures and methods of using them that are a primary object of the present invention.

BRIEF SUMMARY OF THE INVENTION

In an exemplary embodiment of the present invention, the present invention is a self-consolidating concrete construction with self-roughening properties. As used herein, "self-roughening" is the ability of the material to achieve such a surface without external manipulation, an inventive feature of the present invention over existing construction methods. In a preferred embodiment, the self-roughening properties are provided via the use of lightweight course aggregate (LWA), that enable the formation of rough cold joints for concrete construction.

As used herein, LWA comprises aggregate of low density such as, for example, (i) expanded or sintered clay, shale, slate, diatomaceous shale, perlite, vermiculite, or slag; (ii) aggregates of volcanic origin, including natural pumice, scoria, volcanic cinders, tuff, and diatomite; and (iii) sintered fly ash or industrial cinders.

To efficiently and economically construct tall precast concrete units for nuclear containment structures, cold joints need to be formed at certain levels in the height. Manually raking or chipping the top surface of a concrete placement to form a rough surface to provide adequate shear strength is dangerous and expensive.

Adding a small amount of LWA to a normal weight concrete mix will produce a clean, rough top surface so that manual or mechanical roughing of the top surface is not necessary. The LWA will float to the surface, and make a rough surface so that the bond and shear resistance of the interface (cold joint) between the previously placed and newly placed concrete will be as strong as a manually roughened joint.

The LWA may be added to self-consolidating concrete (also termed "self-compacting concrete" or SCC) mixtures. The incorporation or "seeding" of a relatively small fraction (e.g., ~5-15% by mass) of LWA into the SCC is beneficial. The aggregates, due to their very low specific gravity and the viscosity of the SCC, will rise to the surface of the concrete during placement. The LWA particles will thus protrude from the SCC surface.

The present invention comprises use of a faction of LWA into normal weight concrete to create a rough surface has application in cast-in-place concrete production throughout the world. Many concrete elements are designed to be made with cast-in-place concrete. Thus, the interface surface of the precast element must be rough. Using the LWA to make the rough surface is a way to make a rough surface on all such elements.

For the particular case of tall elements where horizontal joints are needed so that concrete placements may be stopped and started, use of the LWA technique of the present invention allows such start and stop operations. Continuous concrete placements are often impossible due to complications with ensuring correct scheduling of concrete trucks. So the use of the present LWA technique allows more realistic and economic delivery of concrete. This provides advantages for construction in remote locations, for construction of massive concrete sections, and in particular for construction of tall concrete elements (e.g., water storage, nuclear structures, and structural concrete walls).

In an exemplary embodiment, the present invention is a concrete with self-roughening properties comprising a mixture of a cementitious material, coarse aggregate (CA), fine aggregate (FA), water and air, and the addition of LWA having a specific gravity lower than that of the mixture, wherein the mass of the LWA is in the range of between approximately 5%-15% of the mass of the CA in the concrete.

The cementitious material can include cement alone or in combination with minerals, SCMs, and pozzolanic materials.

The cementitious material can comprise approximately 10%-30% by weight of the concrete.

The CA can comprise between approximately 30%-45% by weight of the concrete.

The FA can comprise between approximately 25%-40% by weight of the concrete.

At least a portion of the LWA provides the self-roughening properties without excessive internal or external vibration to the concrete.

In another exemplary embodiment, the present invention is a method of forming a concrete structure comprising pouring a first amount of a first concrete with self-roughening properties comprising a mixture of a cementitious material, coarse aggregate (CA), fine aggregate (FA), water and, air and lightweight coarse aggregate (LWA) having a specific gravity lower than that of the mixture, wherein the mass of the LWA is in the range of between approximately 5%-15% of the mass of the CA in the first concrete, wherein a first joint surface is formed by the first concrete, pouring a second amount of a second concrete on at least a portion of the first joint surface, wherein the first joint surface provides a rough surface so the bond and shear resistance of the interface between the first joint surface of the first concrete and the second concrete are sufficient to form the concrete structure therefrom.

The first joint surface can have a concrete surface profile of 7 or greater, wherein the concrete surface profile is defined by the International Concrete Repair Institute's standard concrete surface profile (CSP).

The first concrete and the second concrete can comprise substantially the same mixture of components, or be different in constituent makeup.

The first amount and the second amount can be substantially the same, or different.

The first joint surface can be fully formed without manual interference, for example, by operator raking.

The first joint surface can be fully formed without manual interference via at least a portion of the LWA being located at the first joint surface. The portion of LWA preferably migrates up through the poured concrete over time to form at least a portion of the roughness of the first joint surface. There are other ways to provide the LWA surface roughness where the entirety of the surface roughness attributable to the LWA is via the migrated LWA.

In another exemplary embodiment, the present invention is a self-consolidating concrete mixture comprising a sufficient amount of lightweight coarse aggregate (LWA) such that placement of an amount of the self-consolidating concrete mixture into steel plate composite modular structures can comprises discontinuous concrete placements.

The mixture can comprise coarse aggregate (CA), and the mass of the LWA is in the range of between approximately 5%-15% of the mass of the CA in the mixture.

In another exemplary embodiment, the present invention is a self-consolidating concrete mixture comprising a sufficient amount of lightweight coarse aggregate (LWA) such that in use it forms a self-roughening cold-joint having a concrete surface profile of 7 or greater, wherein the concrete surface profile is defined by the International Concrete Repair Institute's standard concrete surface profile (CSP).

Technical Reports by Gentry, R., Loreto, G, et al., *Self-Consolidating Concrete Construction For Modular Units*, DE-NE0000667 NEET (Nuclear Energy Enabling Technologies, US Department of Energy) are herein incorporated by reference in their entirety.

These and other objects, features and advantages of the present invention will become more apparent upon reading the following specification in conjunction with the accompanying drawing figures.

BRIEF DESCRIPTION OF THE DRAWINGS

FIGS. 1(a)-(b) show the generation of a rough surface by incorporating LWA into a concrete mix according to an exemplary embodiment of the present invention.

FIGS. 2-6 are material data sheets of mix constituents according to an exemplary embodiment of the present invention.

FIGS. 7(a)-(b) compare (a) a SCC and (b) a SRC mix design during their fresh state.

FIGS. 10(a)-(b): "S" groove test good (a) and poor (b) performances.

FIG. 19 is an $A_s f_y$ analysis reported of steel plate design.

FIGS. 20(a)-(b) illustrate 30 degree angle test on welded studs: (a) Complete formation of fillet around stud circumference, (b) 30 degree angle test.

FIGS. 31-35 are taken are identified on the plot.

DETAIL DESCRIPTION OF THE INVENTION

Figure 2:
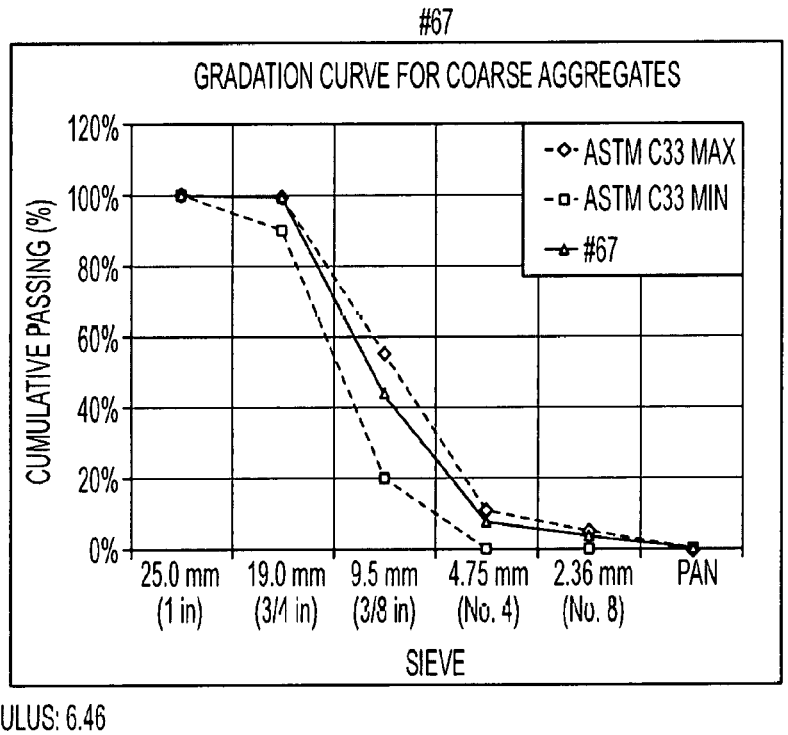
Figure 3:
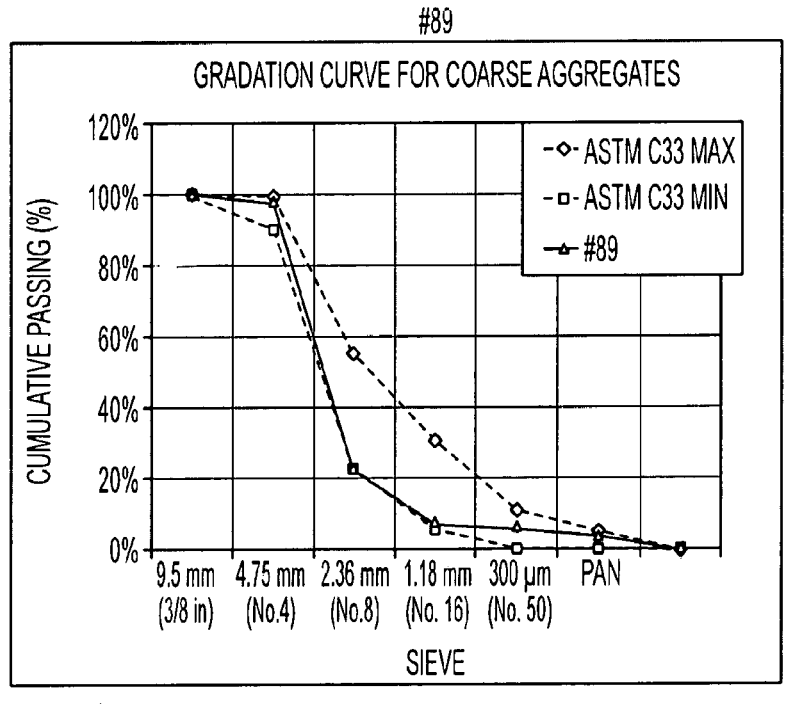
Figure 5:
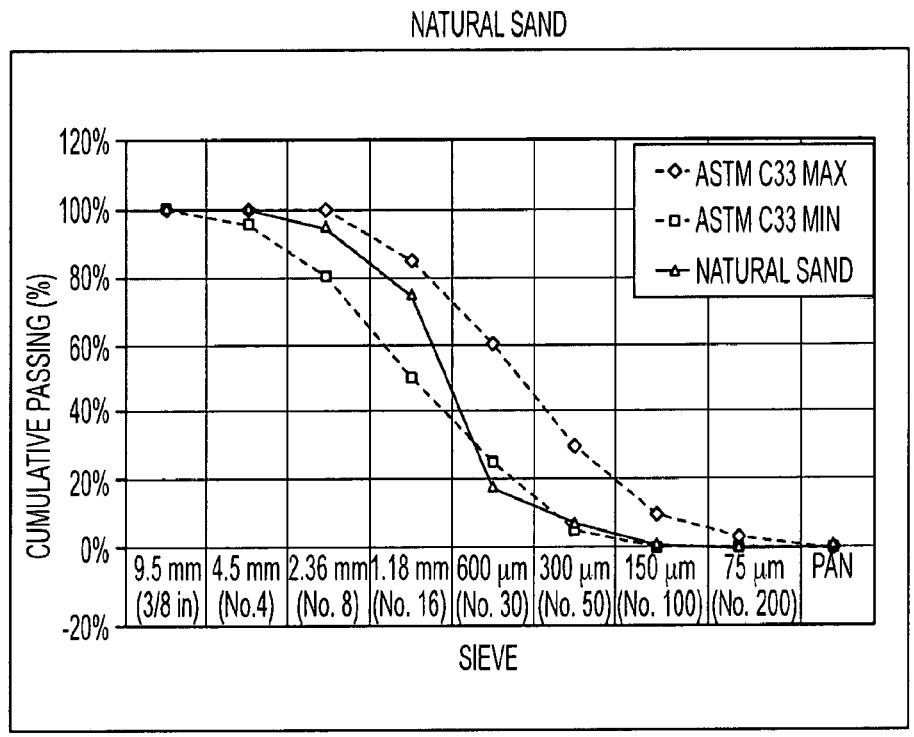
Figure 6:
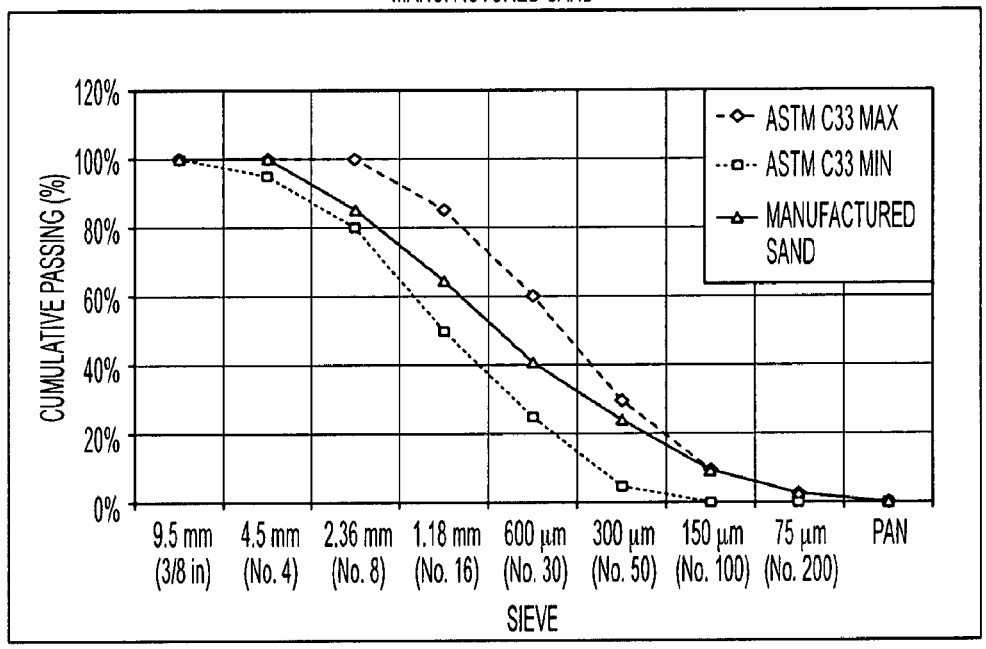

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

The present invention attends to two needs, among others: the assembly and material innovation to enhance modular building techniques such as advances in high strength and high performance concrete and reinforcement, inspection equipment, and pre-assembled rebar systems; and advances in modular construction to include improved design codes, improved methods for transport and delivery and advancements in integrated prefabrication.

The present invention advances the technology in high strength/high performance concrete materials and SC structures and will improve the construction and economy of modular systems by facilitating the concrete construction while assuring high quality bonding of concrete and composite steel elements. This is achieved through innovations in the composition and properties of SCC, where mixtures and processes are optimized to overcome challenges of cold-joint shear capacities, while also addressing heat generation and shrinkage at cold joints, factors which have constrained construction operations employing modular SC construction until now. This capability to perform intermittent SCC pouring into modular SC structures provides more construction flexibility, reduce risk, and reduce critical path schedule duration.

The present invention focuses on the development and assessment of SCC mixes that develop and self-roughening characteristics across cold-joints and thereby generate the capacity to carry shear forces across the cold-joint boundaries. The self-roughening is achieved by adding a tailored fraction of LWA to the concrete mix, some of which rises to the surface during curing, forming a rough surface on which subsequent concrete placements can bond. The roughness of the surface is a function of the LWA size and the amount of LWA included in the SCC, among other factors. The desired properties for a self-roughening SCC concrete mix design for the construction of modular units are examined, and fall into six observations First, SCC mixes demonstrate very high slumps (measured by flow diameter) to facilitate concrete placement in the field without excessive, if any, internal vibration. The slump flow diameters of SCC relative to typical concrete mixes range between 21 in. (530 mm) and 26 in. (660 mm), where the minimum values is set to achieve flowability, whereas the maximum to reduce possible segregation.

Second, SCC mixes should preferably maintain the slump for a sufficient period of time to allow for in-situ concrete placement operations. Times between 45 min. and 60 min. are considered an average in which regular concrete mix ensure their fresh properties.

Third, the SCC mixes should preferably also demonstrate cohesive properties, so that the mixture remains in a consistent state during concrete placement. This is a particular challenge in the SRC because it is necessary that some fraction of the LWA rise through the mix (and thus segregate) to form the rough surface, but the remaining portion of the mix, including the normal weight aggregates and fines, should remain cohesive.

Fourth, the SCC mix should preferably also control heat generation in mass concrete placements due to the exothermic heat generation in high-cement fraction SCC concrete mixes. By using a relatively high percentage of fly ash as a SCM, better performances in terms of heat generation can be achieved while also improving fluidity and cohesiveness.

Fifth, because of the high-cement fraction in the SCC mixes, shrinkage should preferably be monitored. High volumes of fly ash used to produce SCC helps to reduce drying shrinkage.

Sixth, the development of the self-roughening surface during concrete placement and consolidation is examined.

These properties were examined over time in roughly a four phase process. In a first phase, development of SCC with shear-friction capacity for mass placement was completed. An objective during this phase was the development of SCC mix(es) specialized for staged mass concrete construction. Mix designs were developed to:

Increase shear friction about 40% or more between facing surfaces of cold joints;
Limit temperature differential to 35° C. or less;
Limit 28-day autogenous concrete shrinkage to, for example, 250 μm or less; and
Limit 90-day drying concrete shrinkage to, for example, 250 μm or less.

The approach combined experiments and modeling, and relied upon examination of current industry practice in design and concrete construction procedures and in concrete mix proportions.

One innovative aspect in the design of this SCC was the incorporation or "seeding" of a relatively small fraction (~5-15% by mass) of LWA. The purpose of the aggregate is to provide an internal source of surface roughening. The aggregates, due to their very low specific gravity and the viscosity of the SCC, rise to the surface of the concrete during placement. Once set, the LWA particles protrude from the SCC surface. A lightweight expanded slate aggregate (Stalite) was used due to its relatively high strength and low specific gravity. This aggregate is used widely in specialized construction projects throughout the world.

The appropriate size and dosage of LWA was investigated during the assessment of the rheological properties of the concrete, since it was believed that the SCC viscosity influences the ability of the LWA to rise through the concrete and produce a roughened surface. The effects of LWA size and dosage rate on surface roughness were qualitatively assessed in the first phase to determine appropriate materials and proportions, while in the second and third phases, the effect of this surface roughening on shear friction was quantified. The second phase was run concurrently with the first, allowing for optimization of surface roughening, while also achieving SCC meeting shrinkage and thermal requirements.

The use of relatively high substitutions by mass of fly ash (>25%) or slag (>50%) for cement was examined, to limit shrinkage and heat development associated with cement hydration and also to retain the desired self-consolidating behavior. Prior research demonstrated that high fractions of fly ash, in particular, can be used to produce SCC with reduced shrinkage.

Relatively less effort has been put forth for slag-based mixtures. Use of larger SCM fractions would result in cost savings, as the costs for fly ash and slag are lower than Portland cement.

Initial combinations of cementitious and SCMs were determined based upon thermal modeling. At least three different sources of cement, fly ash, and slag was considered to assess the influence of material variability on heat generation.

Using combinations of cementitious and SCMs determined through thermal modeling with the addition of LWA determined through second phase outcomes, SCCs were cast and their early age and hardened properties assessed. Using standard SCC test methods, flow and passability for the candidate mixes were evaluated and improved, if needed.

The yield stress of SCC was expected to be considerably lower than ordinary concrete and the viscosity relationship showed shear-thickening behavior. A goal of the research on rheology was to better understand the boundaries of desirable yield stress and viscosity for achieving both self-consolidation and top surface roughness.

In parallel with the rheological study, drying shrinkage was measured on high-SCM content SCC mixtures, stored in a 50% relative humidity environment, by ASTM C157. Companion sealed concrete samples were monitored, also by ASTM C157, for autogenous shrinkage.

In the second phase, the shear friction of SCC joints were examined in small and full-scale experiments. Both reinforcing bars and the composite plates with studs were examined for providing the shear-friction reinforcement. Various mixtures of SCC developed in the first phase were examined for their potential to provide increased bond—higher friction factors.

The small-scale tests will mimic traditional cold-joint shear-friction push-off tests originally developed by Anderson (*Composite designs in precast and cast-in-place concrete*, Anderson, A. R. (1960) Progressive Architecture 41(9): 8) and used by Kahn and Mitchell (2002) for high-performance concrete.

In the third phase, using mix design identified through the first and second phases, medium-scale experiments tested three 2-ft wide modules in which cold joints have been constructed. The modules were constructed in a vertical orientation with horizontal cold joints and tested as a horizontal beam in flexure to examine shear and flexural performance. The results were compared to a module made with no cold-joint.

Modules with and without added longitudinal reinforcement were tested to develop the most effective shear-friction reinforcement. Shear-friction provisions are given in ACI 349-06, "Code Requirements for Nuclear Safety-related Concrete Structures," which is adopted by ASME. These provisions limit the strength of cold joints to those of concrete with compressive strength of 4000 psi. Added research on high-performance SCC provided a basis for increasing the maximum permitted shear-friction strength as was done for increasing strengths as provided in ACI 318-08 based on research by Kahn and Mitchell (2002).

In the fourth phase, validation through full-scale testing and modeling, a single full-size module, 4-ft thick, 3-ft wide and 24-ft tall was constructed to fully examine the thermal curing and shrinkage characteristics of the most promising SCC mixture as well as form pressure exerted by the SCC. The concrete was placed in 8-ft lifts. Temperature and shrinkage were measured using thermal couples and vibrating wire strain gauges with internal thermistors. Low stiffness strain gauges have proven excellent for measuring early shrinkage and creep strains in high-performance concrete structures. The surface of each lift was assessed for roughness. Concrete placements were separated by two days. Further, pressure sensors were attached to the inner face of the forms to measure concrete pressure during placement, and these pressures compared with those found from current design guidelines for concrete forming.

Electrical resistant strain gauges mounted on the surface of the module's steel plates measured stresses created by the placement pressures, concrete consolidation, shrinkage, and thermal conditions.

Finite element analyses was compared with the experimental results to calibrate models for future use in design.

Four months following construction of the module, it was destructively examined. A simple beam shear test was performed to determine the full-size capacity of the cold joint. Shear in deep beams with minimum reinforcement has been shown to be lower than in smaller specimens. Cores were taken to determine if the strength varies through the thickness due to previous thermal differences. Cores taken at the cold joint were tested to determine the tensile bond strength of the joint.

NDE techniques were used on the full-scale test specimens to examine any delaminations between the plate and concrete, and any cracking at the cold joints or within the monolithic pour.

Further, SCCs were developed with high volumes of SCMs to yield a higher strength SCC, yet one with lower shrinkage, lower heat of hydration, and with improved bonding between new and previously placed concrete. The use of SCMs reduces the cost of the SCC and increase performance.

Shrinkage and cooling after an initial high heat of hydration produce tension between the steel plates and the concrete. The tension may induce delamination between the plates and concrete. Even though the studs keep the two together and result in adequate ultimate strength, the service load stiffness of the system is reduced because of the delamination. Further, the small delamination can lead to premature corrosion of the plate which cannot be controlled or maintained. Developing the present mixtures that reduce this tension improves module performance.

The concept of shear friction in the behavior of concrete structures describes the ability to transmit shear across a given boundary, typically between two separate placements of concrete—sometimes called a "pour joint" or "cold joint". In conventional reinforced concrete internal reinforcements provides a tension tie that limits/prevents the concrete placements from moving perpendicular to the boundary. The friction of the surface, which is considered by ACI 318 to be a function of the surface roughness, limits/prevents the placements from moving parallel to the boundary. The normal force comes from the tensile strength of the steel and the coefficient of friction comes from the boundary, thus "shear friction".

In proposed construction of modular units, no internal reinforcement is used. Instead two external steel plates, one per each side of the unit, are employed to provide all flexural reinforcement in order to increase the confinement action. Steel plates are bonded to concrete by stud connectors that provide force transfer between the concrete and steel plate.

The shear friction specimens from the second phase were reinforced using one of two strategies, one more traditional that uses internal reinforcing bars and a second that mimic the inventive construction of the modular unit where steel plates with shear studs are used as shear-friction reinforcement. In both configurations the compression load are transferred through the reinforcement into the shear failure plane. The effect of traversing the failure surface with bars or plate reinforcement is expected to be the same providing that the level of reinforcement in both configurations are the same.

The third and fourth phase specimens were essentially validation phases, where the shear-dominated specimens from the second phase were replaced by beam specimens used to assess the force transfer of the steel plates across boundaries in both shear and flexure. In addition, the second phase specimens were capable of transferring only in-plane forces, while the multiple beam specimens produced in the third phase were tested for both in-plane and out-of-plane loading. The final large-scale specimen produced in the fourth phase acts as a full-scale validation of the roughly one-third scale testing completed in the third phase.

Development of Self-Roughening (SR) Concrete Mix Design

A primary objective of the first phase was to optimize SCC mixtures so that concrete placement could be made into SC modular structures without the need for continuous concrete placement. The first phase focused on the design and resulting properties of SCC mix design to ensure that sufficient shear capacity across cold-joints was achieved by incorporating or "seeding" a relatively small fraction of LWA. The LWA provided an internal source of surface roughening; because of its low density, it rises to the surface and produces desired roughness amplitude. FIGS. 1(a)-(b) show the generation of a rough surface by incorporating LWA into the mix where (a) shows relatively locations of LWA during mix and (b) shows LWA after migration, after casting.

During this phase, fresh concrete properties such as slump spread and segregation resistance were evaluated. The effects of LWA size and dosage rate on surface roughness were also qualitatively assessed.

A SCC mixture able to generate a rough surface without additional work is herein referred to as a self-roughening concrete (SRC). The SRC mix was designed using materials readily available to concrete producers in the state of Georgia. Initially the objective was to become familiar with the constituent materials and also with the mixing techniques for SCC. Therefore, a number of trials were tested for fresh properties.

Concrete Constituents

Concrete typically contains four main ingredients: CA, FA, cement, and water. Additionally, mineral and chemical admixtures such as fly ash and super-plasticizers are used to modify the plastic and/or hardened state properties. SCC mixes generally uses a higher volume of FAs and employ super-plasticizers and water-reducers to achieve their increased workability. The SRC mix of the present invention contains coarse and fine aggregates, cement, SCMs such as fly ash, water and high-range water reducer as admixture.

The CA used were crushed granite from the Vulcan Materials quarry in Lithia Springs, Georgia. Both #67 and #89 stones were used in these mixes. As a FA, a blend of 50% manufactured (e.g., fractured granite) sand and 50% alluvial sand was used in order to enhance better performances during the fresh state. Both type of sand were locally available and, overall, the materials could be considered very accessible to regional concrete producers.

The aggregates were characterized using ASTM standards. Density and specific gravity were determined as per ASTM C29 and ASTM C127, respectively. In addition the absorption in saturated surface dry condition was also computed as per ASTM C127. Gradation curves were generated in accordance to the ASTM C33, which fully respected the upper and lower limits of the ASTM specifications.

Results were collected into material data sheets, shown in FIGS. 2-6.

The LWA used to generate surface roughness was an expanded slate aggregate supplied by Stalite Company (Salisbury, N.C.), which produced the aggregate by a rotary kiln process. The physical and mechanical properties provided by the manufacturer are shown in FIG. 4.

All aggregates were stored in a dry condition using large metal storage bins located in the lab where the temperature is constantly maintained around 73.5±3.5° F. (23±2° C.).

The cement used for the laboratory mixes was an ASTM C150 Type I/II Portland cement. Argos USA (Atlanta, Ga.)

supplied the cement in 80 lb. (36 kg) bags. The cement was also stored in the lab and kept sealed in the large steel drums to minimize any pre-hydration or carbonation of the cement particles.

The only SCM used in combination with cement was fly ash. The fly ash was provided by Boral Material Technologies LLC, United States, and conformed to ASTM C618 specifications for Class F.

The chemical admixtures used was the Sika ViscoCrete 2100, a high range water reducing and superplasticizing admixture supplied by Sika. Dosage rates vary according to materials, environmental conditions and requirements of a specific project. For lab condition the recommended dosage was between 5 fl. oz. and 12 fl. oz. per 100 lbs. (145-390 ml/100 kg) of cementitious materials. Sika ViscoCrete 2100 was added at the end of the batching cycle directly to freshly mixed concrete in the concrete mixer.

Mix Design Matrix

The mix design study included researching SCC mixes with similar materials and adjusting those mixes until the desired characteristics were achieved. At the beginning some design parameters were set in order to quantify and qualify the concrete. The first properties of concern were at SCC fresh state and included flowability and resistance to segregation. In order for the fresh concrete to qualify as an adequate mix, the slump flow was limited to 23±2 in. (584±51 mm). If the mix passed the slump flow test, then it would be considered for the "S" groove test and the visual stability index (VSI) were used to rate the quality of the mix as it pertains to segregation resistance. These tests will be fully described in the following sections.

If the mix passed these qualifications, 4×8 in. (102×203 mm) concrete cylinders would be made to investigate on the concrete compressive strength.

The SCC mixes that better performed at their fresh state were selected for a second cast in which the original mix proportions were conserved while substituting 5%, 10% or 15% in volume of LWA to the #67. The inclusion of LWA into the mix led to the formation of a rough surface. When a SRC were cast, 6×12 in. (152×559 mm) cylinders were used for surface characterization in addition to 4×8 in. (102×203 mm) cylinders for concrete compressive strength.

FIGS. 7(a)-(b) compare (a) a SCC and (b) a SRC mix design during their fresh state.

Using standard test methods, SCC flow and viscosity (ASTM C1611 "standard test method for slum flow of self-consolidating concrete") as well as drying and autogenous shrinkage (ASTM C157 "standard test method for length change of hardened hydraulic-cement mortar and concrete") and strength (ASTM C39 "standard test method for compressive strength of cylindrical concrete specimens") were measured for the selected mix design, and those which achieved targets were identified.

All mixes were cast in accordance with ASTM C 192 (standard practice for making and curing concrete test specimens in the laboratory). During the mixing, dry sand was used while CAs were used in the saturated surface-dry (SSD) condition. LWA were pre-soaked in water for 24 hours and then brought to SSD condition before their use. The design quantities considered in the mix design proportions were:

Total Cement, lb/yd$^3$ (kg/m$^3$)
Fly Ash, lb/yd$^3$ (kg/m$^3$)
Coarse Aggregate—#67—lb/yd$^3$ (kg/m$^3$)
Coarse Aggregate—#89—lb/yd$^3$ (kg/m$^3$)
Coarse LWA—#7—5%, 10% and 15% in volume of #67
Water Cement (w/c) ratio
Chemical admixtures fl oz/yd$^3$ (ml/m$^3$) (HRWR)

A total of thirty-five trial mixes were cast. TABLE 1 and TABLE 2 report on some of the mixes that passed the first qualification protocol. These included the mixes with 5%, 10% and 15% of LWA. The batches reported in TABLE 1 and TABLE 2 were chosen for several reasons: adequate slump flow ranging from 21 in. to 25 in. (533-635 mm), comparable performances using slightly different amount of HRWR, differences in the aggregate gradation (i.e. trial 07 23-2 contained the two sizes of crushed granite, #67 and #89, giving a much more "well-graded" aggregate curve for the mix since #89 stone fills the gaps between the sand and the large #67 stone and separates the larger aggregates).

Mixing was conducted in a 2.5 ft$^3$ (0.07 m$^3$) countercurrent, high shear manufactured by Eirich.

The first step was to ensure that the mixer was clean and free of leftover chemical admixtures that could affect the outcome of the mix. Once the mixer had been thoroughly cleaned, excess water was removed leaving only a small film of water inside. This ensured that the mixer was not absorbing any water intended for the mix.

Another concern was the timing of the high-range water reducer addition. It was decided that the HRWR would be added after the addition of the cement. This procedure allows one to assess the water demand of the cement and aggregates and adjust the HRWR dosage if needed.

TABLE 1

Trial Mixes 1/2

| Cementitions | Mix Component | | | | | |
|---|---|---|---|---|---|---|
| | 05 28-2 lb/yd$^3$ | 05 30-2 lb/yd$^3$ | 06 05-3 lb/yd$^3$ | 06 10-1 lb/yd$^3$ | 06 23-1 lb/yd$^3$ | 06 24-1 lb/yd$^3$ |
| Cement Type I/II | 808 | 808 | 770 | 770 | 617 | 617 |
| Fly Ash, Class F | 161 | 161 | 306 | 153 | 459 | 459 |
| Water | 315 | 315 | 350 | 329 | 343 | 343 |
| w/cm | 0.326 | 0.326 | 0.325 | 0.356 | 0.318 | 0.318 |
| Coarse Aggregates | | | | | | |
| # 67 | 1510 | 1510 | 1286 | 1439 | 1286 | 1286 |
| # 89 | — | — | — | — | — | — |
| LWA | — | 10% | — | — | — | 15% |
| Fine Aggregates | | | | | | |
| Natural sand | 712 | 712 | 678.5 | 678.5 | 578.5 | 678.5 |
| Manufactured sand | 712 | 712 | 678.5 | 678.5 | 678.5 | 678.5 |

TABLE 1-continued

Trial Mixes 1/2

| | Mix Component | | | | | |
|---|---|---|---|---|---|---|
| Cementitions | 05 28-2 lb/yd³ | 05 30-2 lb/yd³ | 06 05-3 lb/yd³ | 06 10-1 lb/yd³ | 06 23-1 lb/yd³ | 06 24-1 lb/yd³ |
| Admixtures (fl oz./cwt) | | | | | | |
| HRWR | 5.65 | 5.65 | 5.09 | 7.42 | 5.94 | 6.36 |
| Flow Slump (in.) | 23 | 23 | 21 | 25 | 21 | 23 |
| T20 (sec) | 4 | 4 | 5 | 3 | 4.5 | 3 |
| "S" groove (0-5) | 1 | 0.5 | 2 | 0 | 1 | 0 |
| VSI (0-3) | 0.5 | 0.5 | 1 | 0 | 0 | 0 |
| Compression (psi) | — | 6771 | 7274 | 7489 | 7755 | 8851 |
| Std. dev. | — | 275 | 238 | 638 | 523 | 309 |
| Unit weight (pcf) | 156.3 | 156.3 | 150.7 | 149.9 | 150.4 | 150.4 |
| Roughness (1-9) | — | 8 | — | — | — | 9 |

TABLE 2

Trial Mixes 2/2

| | Mix Component | | | | | |
|---|---|---|---|---|---|---|
| Cementitions | 06 25-1 lb/yd³ | 07 08-1 lb/yd³ | 07 23-1 lb/yd³ | 07 23-2 lb/yd³ | 11 04-1 lb/yd³ | 12 16-1 lb/yd³ |
| Cement Type I&II | 617 | 617 | 617 | 617 | 617 | 510 |
| Fly Ash, Class F | 459 | 459 | 459 | 306 | 459 | 340 |
| Water | 343 | 343 | 343 | 294 | 343 | 271 |
| w/cm | 0.318 | 0.318 | 0.319 | 0.319 | 0.319 | 0.319 |
| Coarse Aggregates | | | | | | |
| # 67 | 1286 | 1286 | 1286 | 1136 | 705 | 1512 |
| # 89 | — | — | — | 306 | 459 | — |
| LWA | 15% | 5% | — | — | 15% | — |
| Fine Aggregates | | | | | | |
| Natural sand | 678.5 | 678.5 | 678.5 | 678.5 | 678.5 | 950 |
| Manufactured sand | 678.5 | 678.5 | 678.5 | 678.5 | 678.5 | 407 |
| Admixtures (fl oz./cwt) | | | | | | |
| HRWR | 6.79 | 6.36 | 6.36 | 7.42 | 6.8 | 6.44 |
| Flow Slump (in.) | 21 | 25 | 23.5 | 23.5 | 26 | 29.5 |
| T20 (sec) | 5 | 4 | 4 | 4 | 3 | 4 |
| "S" groove (0-5) | 1.5 | 1 | 0.5 | 0.5 | 0 | 0 |
| VSI (0-3) | 0 | 0.5 | 0.5 | 1 | 0 | 2 |
| Compression (psi) | 7608 | 7670 | 8248 | 7165 | 6421 | 7431 |
| Std. dev. | 537 | 807 | 839 | 524 | 351 | 772 |
| Unit weight (pcf) | 150.4 | 150.4 | 150.4 | 137.4 | 145.9 | 147.4 |
| Roughness (1-9) | 9 | 7 | — | — | — | — |

The final mixing procedure was as follows:
1. The coarse and fine aggregates were added next to the mixer.
2. Mixing took place for approximately two minutes.
3. The cementitious materials and water were added next.
4. Mixing took place for approximately four minutes.
5. The super-plasticizer was added to the mixer.
6. Mixing took place for two minutes.
7. If required, more super-plasticizer was added.
8. Mixing took place for an additional two minutes.
9. Slump flow readings were taken at this point.
10. If the mix passed the slump flow test, "S" groove test and VSI were performed.
11. If the mix passed the "S" groove test and the VSI, specimens were cast for hardened state property testing.

Fresh Properties

As for SCC, self-roughening ability depends entirely on its fresh properties; therefore, a successful SRC mix must have high fluidity, deformability, good filling ability, and adequate resistance to segregation. Additionally, aggregate particles preferably are uniformly distributed throughout the mix to avoid uncontrolled segregation at all times especially during transportation and placement.

In general, SCC with a slump flow less than 17 in. (432 mm) will not have self-compacting properties; on the other hand SCC with a slump flow over 26 in. (660 mm) may experience severe segregation and bleeding. Evaluation of the fresh properties for SRC was essentially carried out in the same way as for SCC. The slump flow tests in conjunction with the visual stability index (VSI) are effective in evaluating the workability of the mix on-site. The data collected using these tests appeared to be adequate for quantifying the rheological properties of the SCC. A sufficient understanding of the quality of SRC in its plastic state was achieved by visual observations of the floating LWA during mixing.

Figure 8:
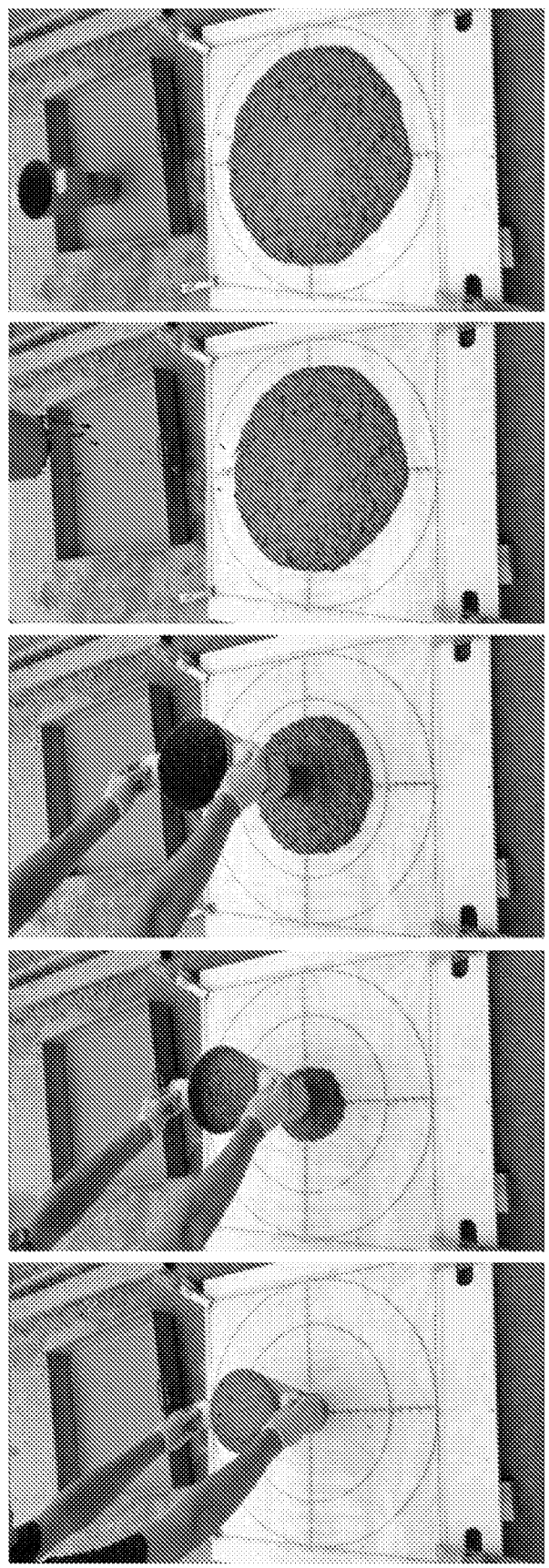
FIG. 8 illustrates the performance of the flow slump test, where from left to right, the times are 0, 1, 2, 4 (T20) seconds, and then end of test.

The slump flow method is the oldest and most widely used test in concrete technology. The simplicity of the procedure and apparatus used makes it suitable for every-day practice and field application. Mainly the test measures the fluidity or filling ability of the concrete paste. To determine the slump flow, an Abrams cone is placed on a non-absorptive surface and filled with fresh concrete without any tampering. The cone is lifted and the concrete flows out under its own weight (FIG. 8). Two perpendicular measurements of what appears to be the maximum diameter are taken across the spread of concrete and the average is reported. The final flow time, from cone removing to flowing completion is recorded, as well as the T20 flow time, which is the time needed by the paste to spread up to 20 in. (50 mm).

Slump flow spread diameter values of 23±2 in. (584±51 mm) were considered satisfactory with test results ranging from 21 in. to 25 in. (533-635 mm). T20 values were spanning from 3 sec. to 5 sec. and they were inversely proportionated to the slump flow diameter. A complete overview of data is reported in TABLE 1 and TABLE 2.

Figure 9:
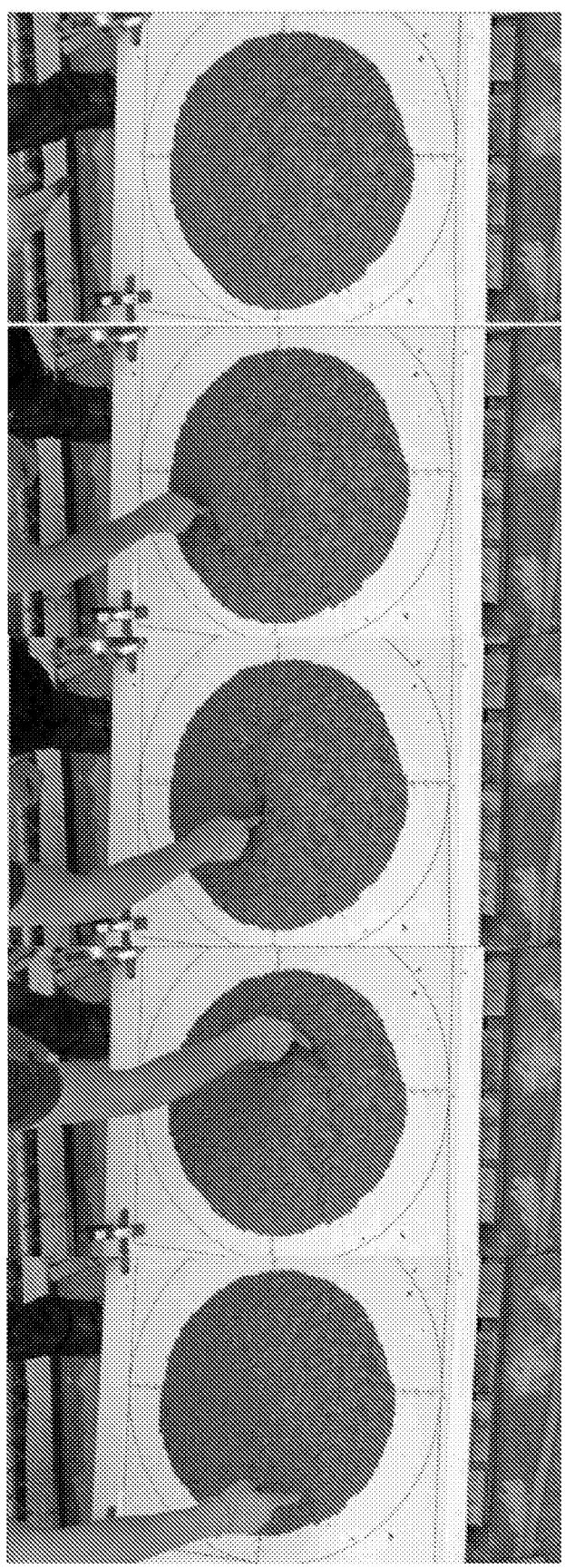
FIG. 9 illustrates the performance of the "S" groove test, where from left to right, the times are 0, 1, 2, 4 (T20) seconds, and then end of test.
Figure 11:
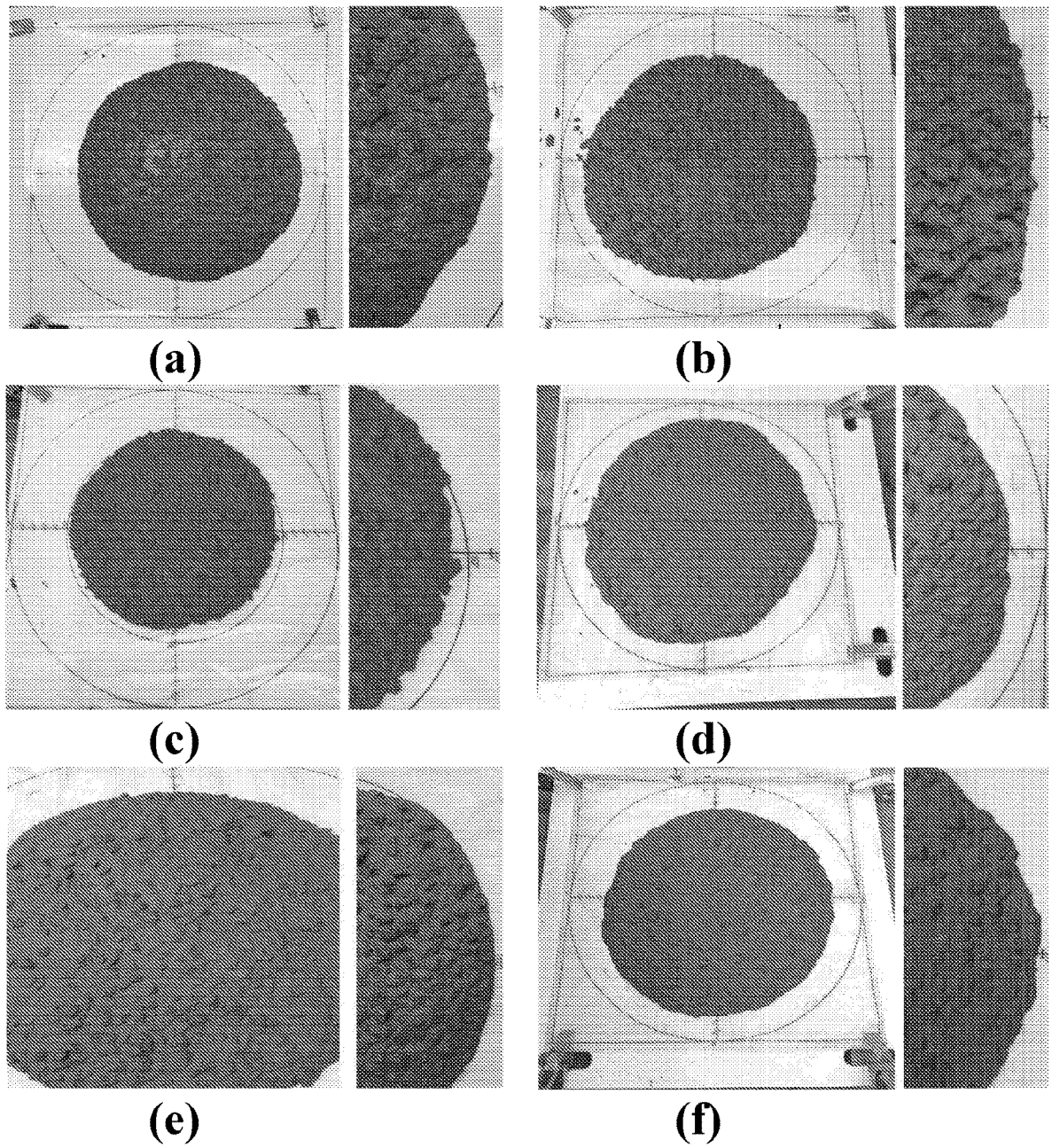
FIGS. 11(a)-(f): Samples after "S" groove test and VSI, part A. ((a) 0528-1, (b) 0530-2 (c) 0605-3, (d) 0610-1, (d) 0623-1, (f) 0624-1).
Figure 12:
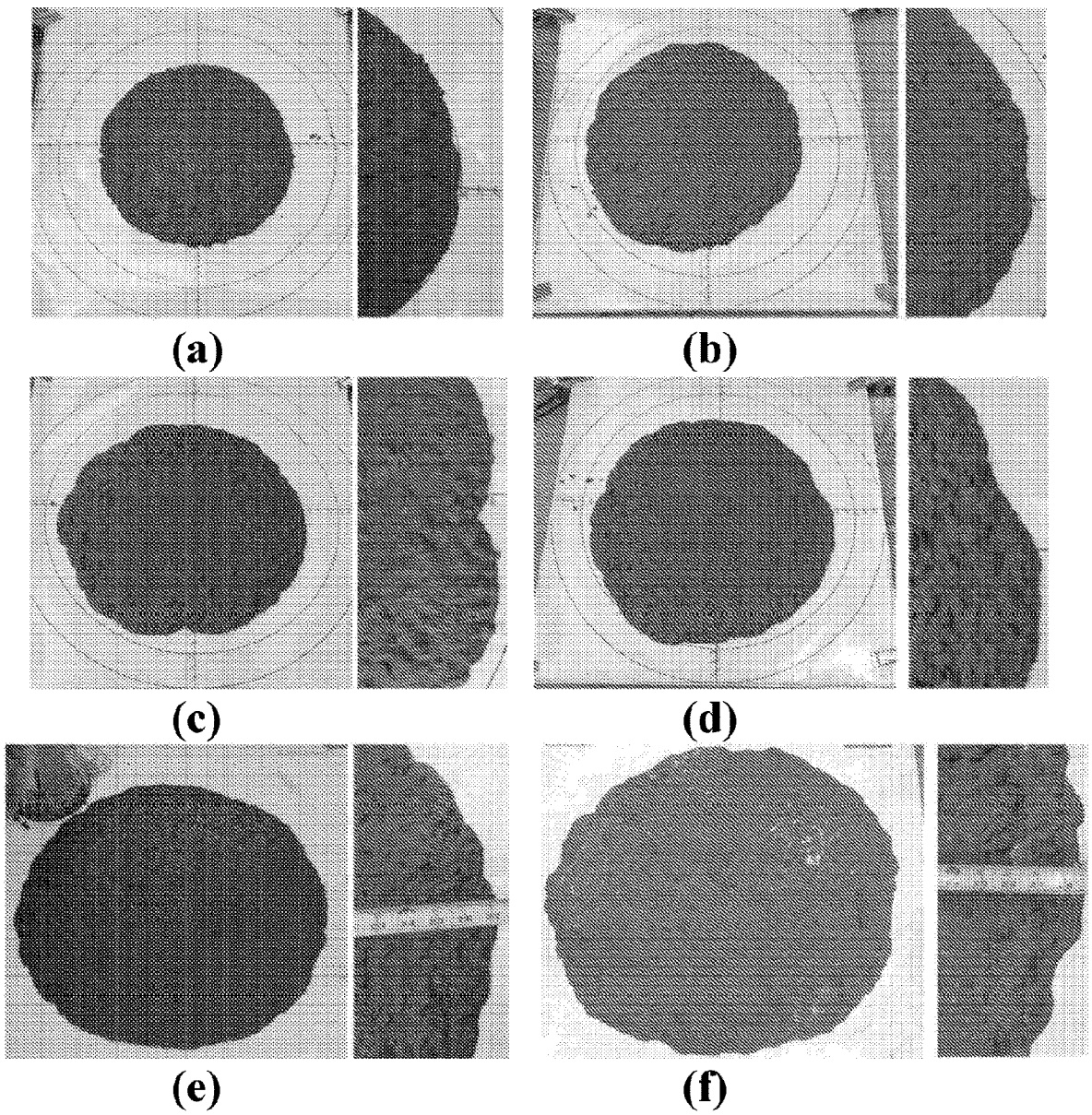
FIGS. 12(a)-(f): Samples after "S" groove test and VSI, part B. ((a) 0625-1, (b) 0708-1, (c) 0723-1, (d) 0723-2, (e) 1104-1, (f) 1216-1).

The "S" groove test is a simple and effective method of determining the stability and self-healing ability of fresh SRC. Using a finger or a tamping rod, an "S" is drawn into the concrete on the slump flow board (FIG. 9). If the mix is stable, the concrete will rapidly fill the 'S' groove and the stability of the concrete is good, as seen in FIG. 10(a); otherwise a layer of paste or bleed will fill in the groove essentially showing the segregation of the CA within the mix FIG. 10(b). An empirical range of values spanning from 0 to 5 was used (0 being highly stable and 5 highly unstable) was associated to the test in order to better characterize the behavior. Numerical data are reported in TABLE 1 and TABLE 2, whereas pictures taken at the sample after test are reported in FIGS. 11-12.

The resistance to segregation of SCC can be visually evaluated in a lesser or greater degree in almost every test mentioned above. The VSI test is recommended to be implemented with the slump flow test; although, the parameters evaluated in the VSI test can be found in every test that allows the observation of a significant volume of SCC. The range of values for the VSI is 0 through 3, with zero being a highly stable mix, and 3 designates a highly unstable mix. The parameters for determining the VSI number of a given mix are mortar halos, bleed, air bubbles, and aggregate pile-up.

TABLE 3

Visual Stability Index

| Rating | Number | Criteria |
|---|---|---|
| Highly Stable | 0 | No evidence of stump segregation |
| | 0.5 | Very Slight evidence of bleed and air popping |
| Stable | 1 | No mortar halo No aggregate pile-up Slight bleed and air popping |
| | 1.5 | Just noticeable mortar halo and aggregate pile-up |
| Unstable | 2 | Slight mortar halo, less than 0.4 in. (10 mm) Slight aggregate pile-up Noticeable bleed |
| Highly Unstable | 3 | Large mortar link greater than 0.4 in. (10 mm) |

Figure 13:
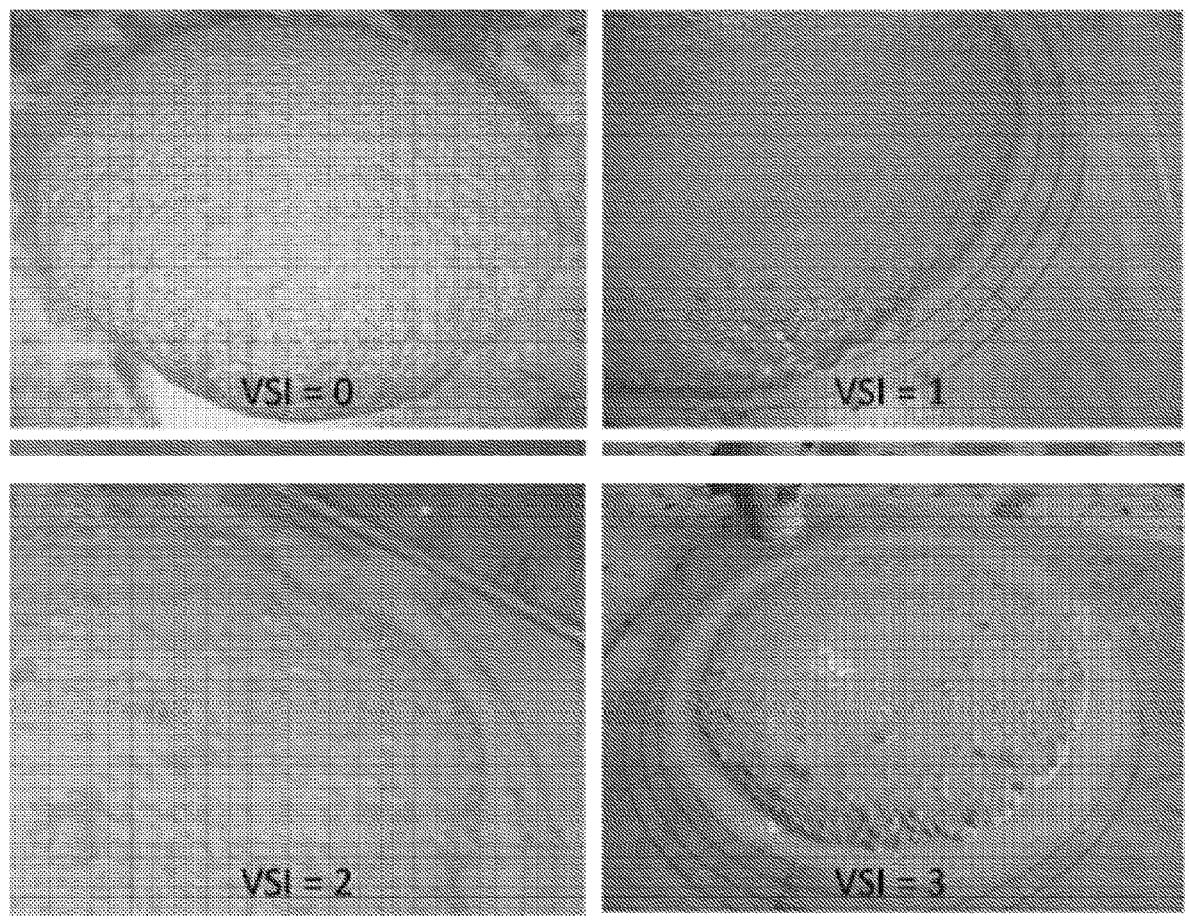
FIG. 13 present photos of visual stability index examples for various slump flow tests.

TABLE 3 presents the different criteria for VSI numbers. Mortar halos result from the segregation of the paste from the concrete due to too much water or CA in a mix. An unstable mix may contain a mortar halo less than 0.4 in. (10 mm); larger halos result in highly unstable concrete mixes. Slight bleed and few air bubbles surfacing are allowed for stable mixes, but not highly stable. FIG. 13 displays examples of the different VSI, whereas data are reported in TABLE 1 and TABLE 2. Pictures taken at the sample after test are reported in FIGS. 11-12.

Hardened Properties

Preliminary hardened properties were measured for some mixes in which free shrinkage under controlled laboratory conditions, compression capacity and surface roughness were studied.

All specimens were cured following the ASTM C192 (Making and curing concrete test specimens in the laboratory) prescriptions. Specimens were stored in a controlled environment (fog room) with monitored temperature and humidity levels of 73.5±3.5° F. (23±2° C.) and >95%, respectively.

Drying shrinkage tests were performed following the ASHTOO T160 (Length Change of Hardened Hydraulic Cement Mortar and Concrete) and Alabama DOT (*Standard Specification for Highway Construction*) specifications. In addition autogenous shrinkage tests on the 1104-1 mix design were also performed following the ASTM C157 (Standard Test Method for Length Change of Hardened Hydraulic-Cement Mortar and Concrete).

For drying shrinkage two sets of three specimens were cast in prism molds (75×75×285 mm—3×3×11.25 in.), coated in advance with an oil-based form release agent, with gage studs inserted into their ends. SCC was cast using the proportion of the 0625-1 mix. Freshly mixed concrete was placed in one lift. Excess was struck off. Concrete specimens were covered with a polyethylene sheet and wet towels to avoid moisture loss during the first 24 hours, demolded after one day, and placed in the environment chamber 73.5±3.5° F. (23±2° C.) and >95% RH after measuring the initial length.

Following the Al DOT specification, a first set of specimens (0625-1a, 0625-1b and 0625-1c) was cured in these conditions for seven days, whereas the remaining specimens (0625-1d, 0625-1e and 0625-1f) were left curing for 28 days in accordance to AASHTO T160. Upon the end of curing duration, the specimens were moved to an environmental chamber with control drying condition of 73.5±3.5° F. (23±2° C.) and 50±4% RH. During drying, the length was monitored by a length comparator, which was kept in the same temperature chamber to avoid any variations due to temperature change according to ASTM C 157 (the standard test method for length change of hardened hydraulic-cement mortar and concrete). Measurements were taken at the ages of 3, 7, 14, 21, 28, 35, 42, 49, and 56 days. The following procedure was used for each shrinkage measurement:

Recorded the length of the reference bar.
Reset the measuring gauge to zero and removed the reference bar.

Placed the sample in the dilatometer bench and recorded the gauge reading.

At the early age, soft samples were handled carefully, using both hands to carry them, to avoid any damage. To obtain accurate results, it was important to place the reference bar and all samples in the same orientation. A line mark helped to keep all samples at the same position after each measurement.

Figure 14:
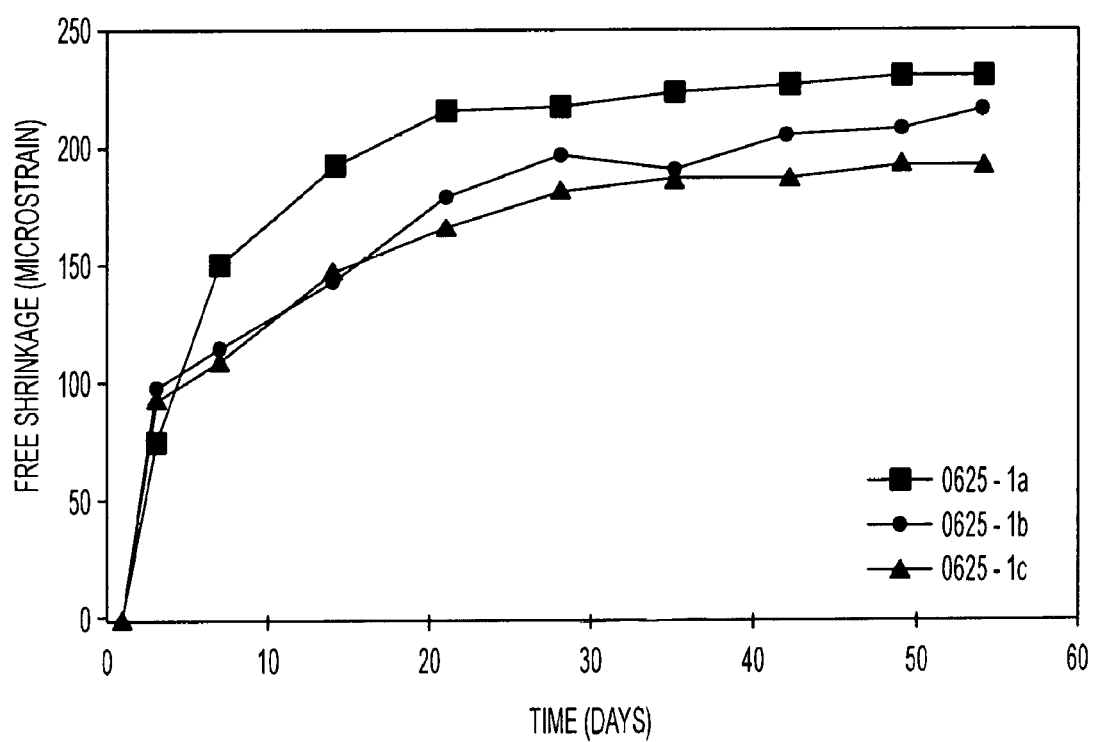
FIG. 14: Free Shrinkage test results 7-day initial curing
Figure 15:
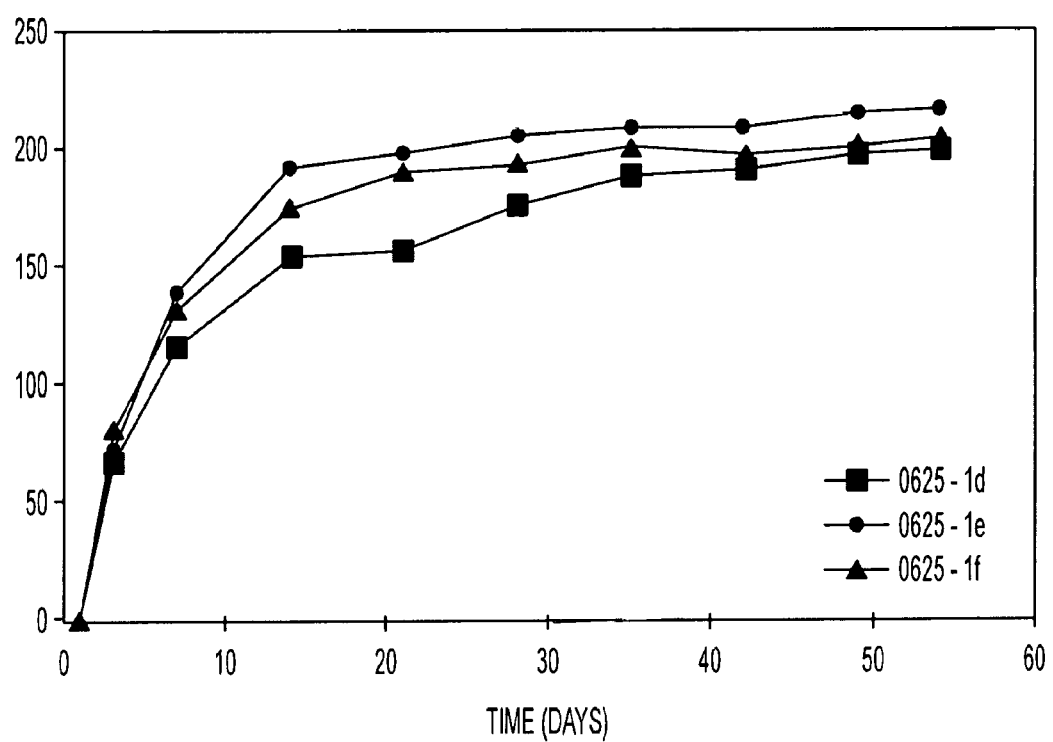
FIG. 15: Free Shrinkage test results 28-day initial curing.

The shrinkage values were calculated as the percent change in length from the time the specimen was removed from curing. Results were plotted in two graphs throughout time and reported in FIGS. 14-15.

For both sets, the average measured drying shrinkage was less than 250 µε, which was below the limit of 400 µε reported in the Al DOT specification.

Figure 16:
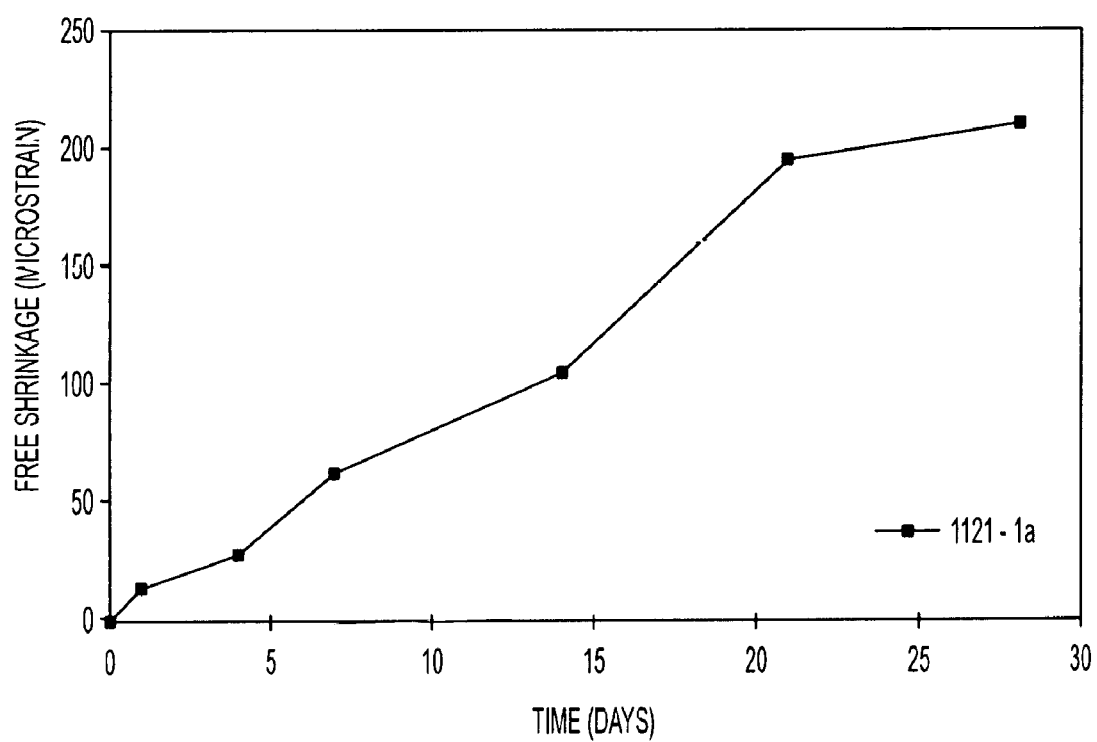
FIG. 16: 28 days Autogenous Shrinkage test results.

For the autogenous shrinkage one set of three specimens were cast in prism molds (75×75×285 mm—3×3×11.25 in.). In making the specimen the same procedure described for the drying shrinkage specimens was adopted, however, after being demolded the specimens were immediately double-wrapped with a self-sealing polythene film and sealed in aluminum tape to minimize any moisture loss. After being sealed, the specimens were stored in an environment chamber at a constant 73.5±3.5° F. (23±2° C.) and >95% RH after measuring the initial length, until further testing. Also in this case the shrinkage values were calculated as the percent change in length from the time the specimen was removed from curing. FIG. 16 shows the 28 days results of 1121-1a specimen in which autogenous shrinkage reached the value approximately 200 µε.

Compression tests were conducted as per ASTM C39 using 4×8 in. (100×200 mm) cylinders. Five cylinders were cast for every mix, demolded after 24 hours and stored in a fog room where they were kept until testing. The fog room held a constant temperature of 73° F. (23° C.) and 100% humidity. Specimens were cured for 28 days before testing. Results are reported in TABLE 1 and TABLE 2 along with their standard deviations.

One of the main objectives in the first phase was to generate the appropriate surface roughness essential to facilitate shear interlock between the existing substrate of concrete and the overlay at a cold joint. According to the ACI 318 (Building Code Requirements for Structural Concrete) when concrete is placed against previously hardened concrete, the interface for shear transfer shall be roughened to a full amplitude of approximately ¼ in. By incorporating a small fraction of LWA in some mix designs, the SCC was able to generate a rough surface so that roughening by raking or other means may not be necessary.

Presently, the surface roughness is measured using one of two fundamental methods for determining surface roughness: (i) International Concrete Repair Institute's (ICRI's) standard concrete surface profiles (CSPs) (qualitative assessment) or (ii) profilometry (quantitative assessment).

ICRI's CSPs are benchmarks used to establish industry acceptable specifications and represent varying degrees of concrete roughness and texture. Nine rubber profiles represent varying degrees of concrete roughness, with CSP 1 being thought to represent the least rough (smoothest), while CSP 9 being the most rough.

A qualitative assessment of the surface roughness was performed by visual inspection comparing the concrete surface to the CSPs. The level of roughness was considered acceptable when comparable to the range of CSP 7 to 9, which correspond to an amplitude roughness of ¼ in. (7 mm). Results are reported in the last row of TABLE 1 and TABLE 2.

Assessment of Cold Joint Shear Capacity

The shear friction of SRC joints in small-scale experiments in the second phase are used to optimize mixtures prior to full-scale shear-friction experiments (third phase). Historically push-off tests have been the primary test specimen used to evaluate shear friction, in fact they can be fabricated with a cold-joint to simulate the interface of two layers of concrete cast in different times. The test program was designed to experimentally evaluate shear friction behavior in specimens created by using SRC. The mix was selected among the ones developed in the first phase. Two percentages of LWA, 5% and 15%, are examined for their potential to provide increased bond—higher friction factors. Both reinforcing bars and the composite plates with studs are examined and compared for providing the shear-friction reinforcement.

Shear Friction Test Design

The specimens were designed similar to typical specimens from previous research. This allowed the shear friction data to be directly extended and compared to other tests. The specimens were divided into three groups based on the two joint conditions and the shear reinforcement location:

Type 1, monolithic pre-cracked push-off specimen.

Type 2, cold-joint specimen to simulate the behavior that occurs at the interface between two consecutive layers in a concrete wall. The cold-joint surface condition is left as-cast in an unaltered condition. The surface is characterized by a roughness amplitude of ¼ in. qualifying it as a rough interface.

Type 3a and 3b, cold-joint specimen to study the effect of traversing the failure surface with steel plate reinforcement as shear-friction reinforcement anchored to concrete through using shear studs rather than reinforcing bars.

Test Matrix

Figure 51:
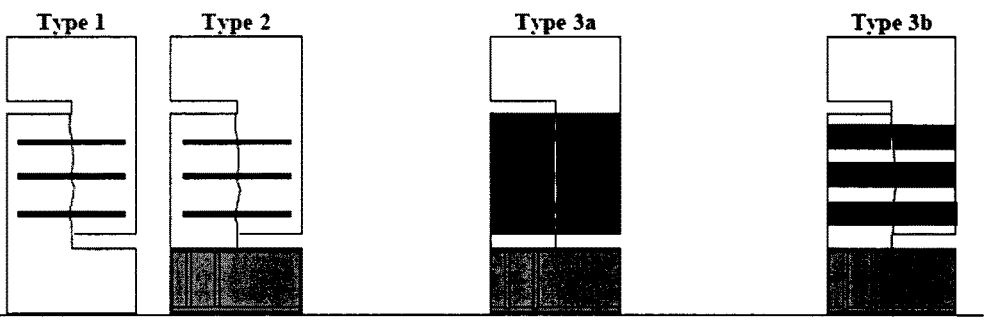

Design data for the 27 push-off test specimens are listed in FIG. 51. The TABLE indicates the joint condition of each specimen, the area and type of steel crossing the shear plane, the reinforcement ratio ($\rho$), the amount of LWA and the number of repetition.

Figure 17:
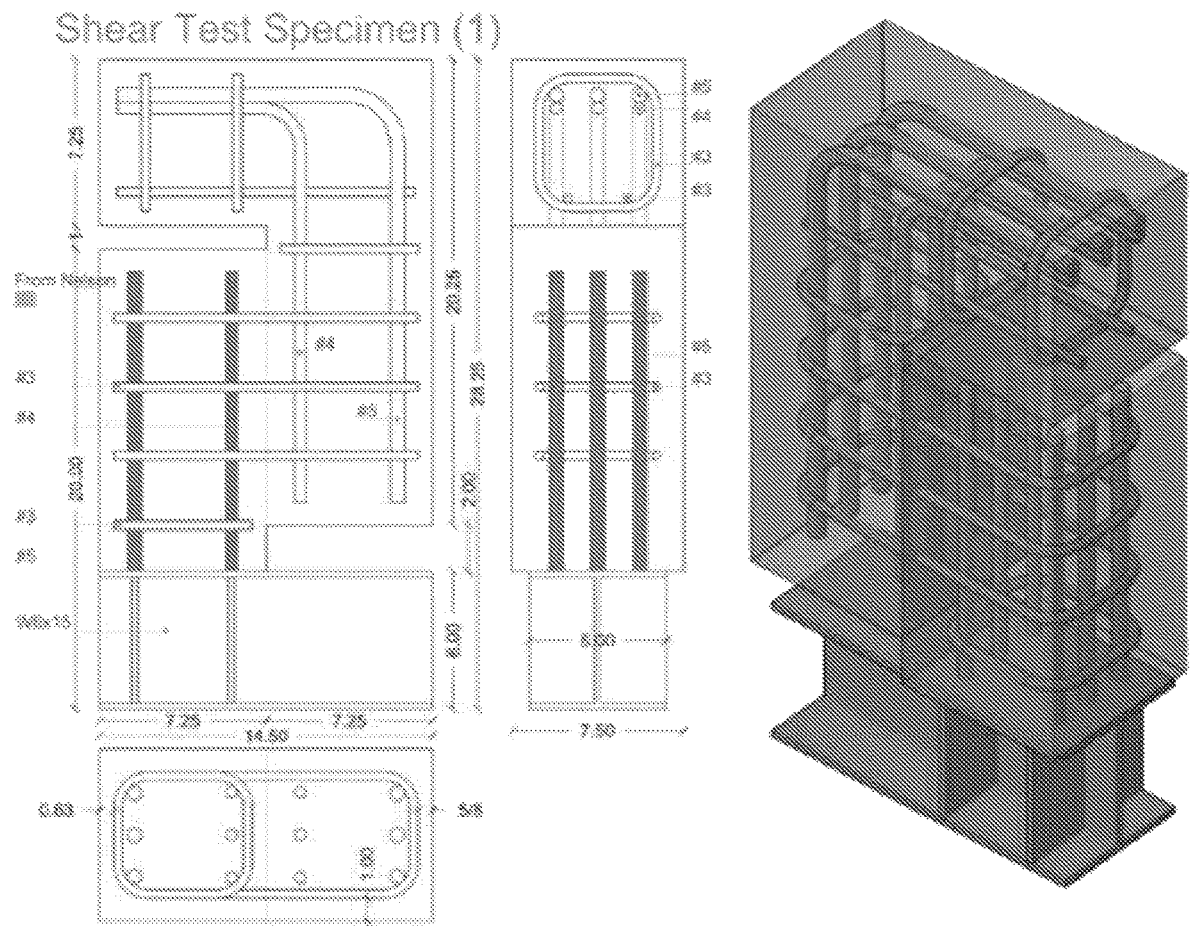
FIG. 17: Type 2 push-off specimen design.

The general push-off specimen (Type 1 and 2) is illustrated in FIG. 17. The shear plane is rectangular with dimensions of 12 in. (305 mm) long by 7.5 in. (190 mm) wide. The amount of stirrup reinforcement crossing the shear plane is 3 #3 stirrups with a reinforcement ratio equal to 0.75%. Shear stirrups are equally distributed across the shear plane.

Figure 18:
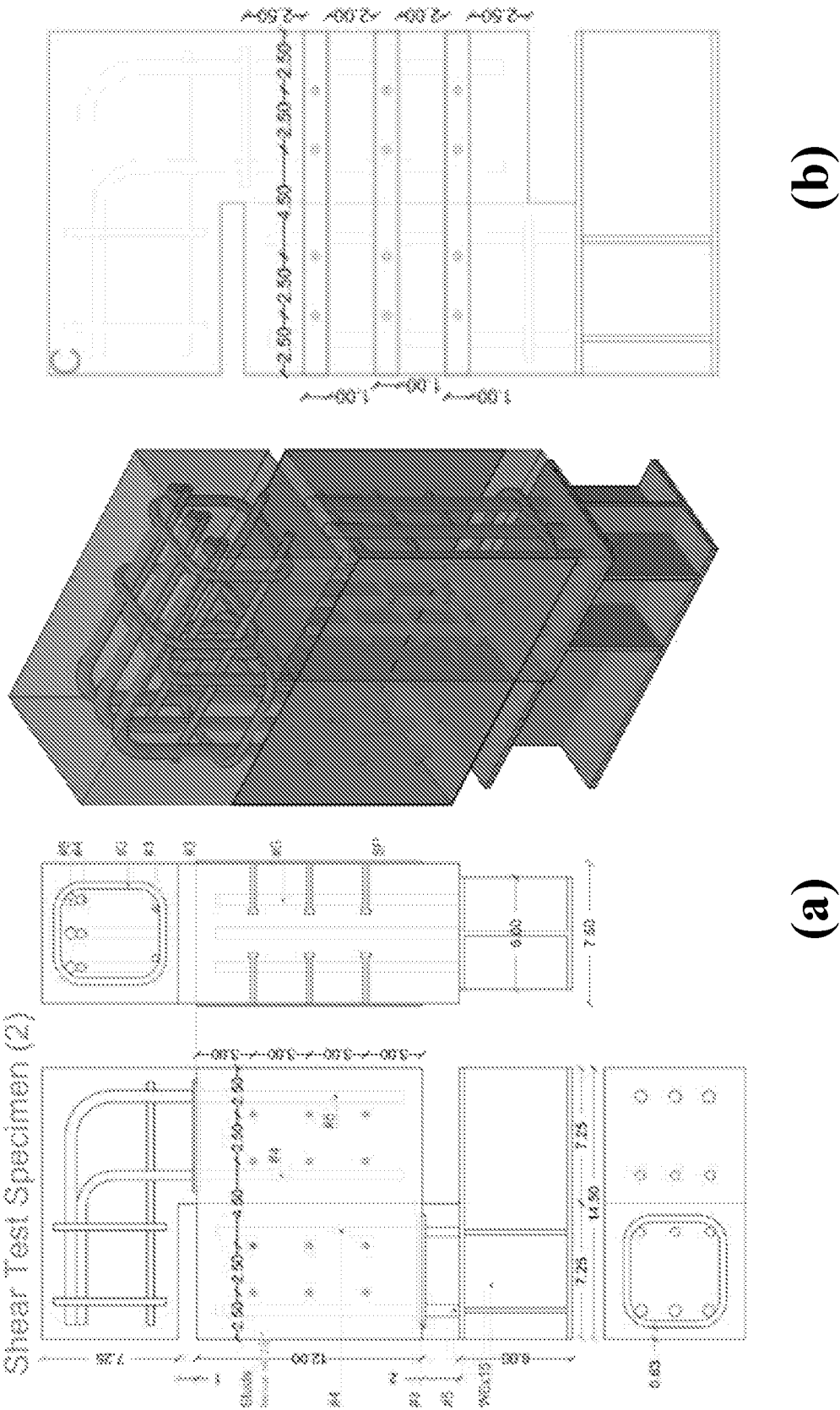
FIGS. 18(a)-(b): (a) Type 3a push-off specimen design, (b) Type 3b push-off specimen design.

Type 3a and 3b push-off specimen are illustrated in FIG. 18. While the shear plane remains the same, the reinforcement is now located on the outside and anchored to the specimen using shear studs. Different configuration of the steel plate and reinforcement ratio are considered as reported in FIG. 51.

Indicating with $A_s$ the area of steel reinforcement transverse to the shear friction plane and $f_y$ its corresponded yielding capacity, steel plate thicknesses were calculated using an $A_s f_y$ type of analysis in order to obtain Type 3a and 3b specimens with comparable reinforcement ratio of Type 2 specimens.

Materials

The SRC mixtures developed in the first phase contained coarse and fine aggregates, cement, SCMs such as fly ash, water and high-range water reducer as admixture. In addition, a percentage of LWA was substitute in volume to the CA in order to provide self-roughening properties typical of a SRC. The mix design used in second phase reflected the developments made in the first phase and uses the same materials.

The concrete mixture used in specimen construction was selected among the trials reported in the first phase. SRC mixtures contained Portland cement type 1-2, water, #67 granite coarse aggregates, a blend of 50% manufactured sand and 50% natural sand, and high range water reducers (HRWR). Mixture proportions are provided in TABLE 5. Aggregates used in the production of concrete met or exceeded ASTM C33 specification requirements. Similarly, LWA met or exceeded the requirements set forth by ASTM C330. All concrete was batched, mixed, and cast in the Structural Laboratory of Georgia Tech using a 5 cubic feet rotary drum mixer.

TABLE 5

Concrete Mix Design For Second Phase Specimens

| Mix Component | 06 25-1 |
|---|---|
| Cementitious | lb/yd$^3$ |
| Cement Type I&II | 617 |
| Fly Ash, Class F | 459 |
| Water | 343 |
| w/cm | 0.318 |
| Coarse Aggregates | |
| # 67 | 1286 |
| # 89 | — |
| LWA | 15% |
| Fine Aggregates | |
| Natural sand | 678.5 |
| Manufactured sand | 678.5 |
| Admixtures fl oz./cwt) | |
| HRWR | 6.79 |

At the end of each batch, fresh concrete unit weight was determined in accordance with ASTM C138, whereas flow and viscosity were determined in accordance with ASTM C157. Also, five 4×8 in. (100×200 mm) cylinders were cast for every mix along with the corresponding specimens. Cylinders were demolded after 24 hours and stored in a fog room where they were kept for 28 days. Compression tests were conducted as per ASTM C39 and results were used to predict the shear friction capacity.

All reinforcing steel bars used in this experimental program were ASTM A615 Grade 60 provided by Gerdau SA. Properties reported by the manufacturer were verified by conducting tensile tests of representative samples. Reinforcing bar testing was performed in accordance with ASTM A370. A typical stress-strain plots for the tensile tests is shown in FIG. 19, in which values of stress were the applied force divided by the nominal cross sectional area of the bar. Values of strain were measured using a 4.0 in. extensometer attached to the reinforcing bar, which was removed upon yielding of the specimen. A summary of the measured results is provided in TABLE 6.

TABLE 6

Reinforcing Steel Bar Properties

| Reinforcement ID* | Nominal Diameter | Yield Stress (kip/in$^2$) | Modulus of Elasticity** (kip/in$^2$) | % Elongation at Break |
|---|---|---|---|---|
| 60-3-1 | No 3 | 110 | 25,000 | 10.75 |
| 60-3-2 | No 3 | 85 | 26,700 | 8.75 |
| 60-3-3 | No 3 | 83 | 26,400 | 8.75 |
| Average | | 92.7 | 26,100 | 9.42 |
| Standard Deviation | | 12.3 | 758 | 0.94 |

*ID notation; first indicates grade, second nominal size, and third specimen number.
**Slip of extensometer on small-diameter bars led to lower than anticipated modulus values, retests in progress.

The Grade 60 No. 3 reinforcing bars used for all closed stirrup transverse reinforcement had an average yield stress of 92.3 ksi (636 MPa); however, the ACI-318 recommended maximum $f_y$ of 60 ksi (414 MPa) was used in the calculations of predicted shear stress values.

Steel studs used for the second phase specimens were provided by the Nelson Stud Welding Company and were attached to the steel plates using a Nelweld Model 6000 stud welder. The studs were nominal 0.25 in. (6 mm) diameter, 2.75 in. (70 mm) long with a tensile yield stress of 51,000 psi (350 MPa). Steel stud configuration is shown in FIG. 18 and FIG. 51.

The number and spacing of studs for each plate was computed to overcome the shear friction capacity of the cold-joint and to avoid any local failure within the stud.

The steel plate thicknesses were computed using an $A_s f_y$ analysis reported in FIG. 19. Three different thicknesses were selected, 13, 16 and 22 gauge, which correspond to a reinforcement ratio of 0.75%, 0.50% and 0.25%, respectively. Tensile test were performed on 1 in. by 8 in. (25.4× 203.2 mm) coupons in order to characterize the tensile strength. A summary of the measured results is provided in TABLE 7.

TABLE 7

Steel Plate Properties

| Reinforcement ID* | Width (in.) | Thickness (in.) | Yield Stress (kip/in$^2$) | Modulus of Elasticity (kip/in$^2$) |
|---|---|---|---|---|
| 36-13-1 | 1.019 | 0.087 | 31.5 | 27,800 |
| 36-13-2 | 1.018 | 0.087 | 31.0 | 24,900 |
| 36-13-3 | 1.018 | 0.087 | 31.6 | 32,800 |
| Average | 1.018 | 0.087 | 31.4 | 28,500 |
| Standard Deviation | 0.0005 | 0.00 | 0.24 | 3,229 |
| 36-16-1 | 1.019 | 0.063 | 46.1 | 30,500 |
| 36-16-2 | 1.017 | 0.063 | 44.7 | 29,700 |
| 36-16-3 | 1.019 | 0.063 | 45.7 | 32,300 |
| Average | 1.018 | 0.063 | 45.5 | 30,800 |
| Standard Deviation | 0.0009 | 0.00 | 0.58 | 1,096 |
| 36-22-1 | 1.008 | 0.031 | 48.8 | 28,500 |
| 36-22-2 | 1.013 | 0.030 | 47.5 | 29,700 |
| 36-22-3 | 1.011 | 0.030 | 47.9 | 27,800 |
| Average | 1.011 | 0.030 | 48.1 | 28,600 |
| Standard Deviation | 0.0021 | 0.000 | 0.54 | 0.768 |

*ID notation; first indicates grade, second bar gauge, and third specimen number.

Steel plates are bonded to concrete through headed anchors welded to the steel plates using a Nelson Stud Welding system composed of a power supply with a transformer rating of 7600 amps and standard welding gun. Equipment settings vary based on the steel plate thickness and different trials were performed to optimize the equipment configuration. During the trials, a visual inspection was performed to ensure the formation of a full 360 degree weld fillet around the circumference of the stud. In addition, test on the welded stud was performed by bending the stud in any direction to a 30 degree angle from weld position. For 13 and 16 gauge steel plates the test was easily satisfied (FIGS. 20(a)-(b))

At first it was impossible to successfully attach studs to the 22 gauge steel plate. Even with reduced welding settings (amperage and time), the energy release from the stud gun created a large hole in the thin plate with the stud remaining unattached. A number of strategies were developed to aid in the attachment of the plate.

Figure 21:
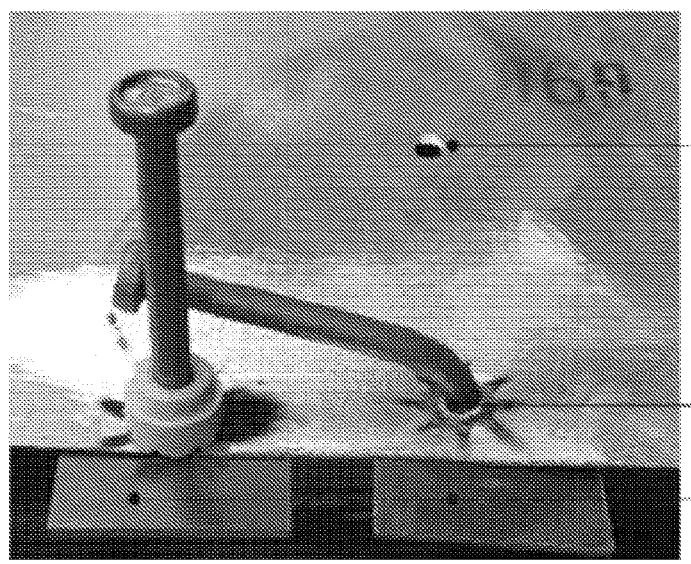
FIG. 21: Stud connection for 22 gage plate and 30 degree bend test.

A simple 1 in. square backing plate of 16 gage steel did not remedy the problem, as the stud would attach to the backing plate but would leave a circular damage zone around the 22 gage main plate and thus the stud was attached to the backing plate but not the primary plate. In the end, an innovative solution was developed. A series of holes, of 0.2 in. (5 mm) diameter, were waterjet cut in the 22 gage steel plates. The 16 gage steel backing plate was used under the point of application of the stud to avoid the penetration of the stud through the plate. The hole allowed the stud to be welded to the support while forming a complete weld fillet on both steel plates. This configuration successfully passed the 30 degree angle test as shown in FIG. 21.

Figure 22:
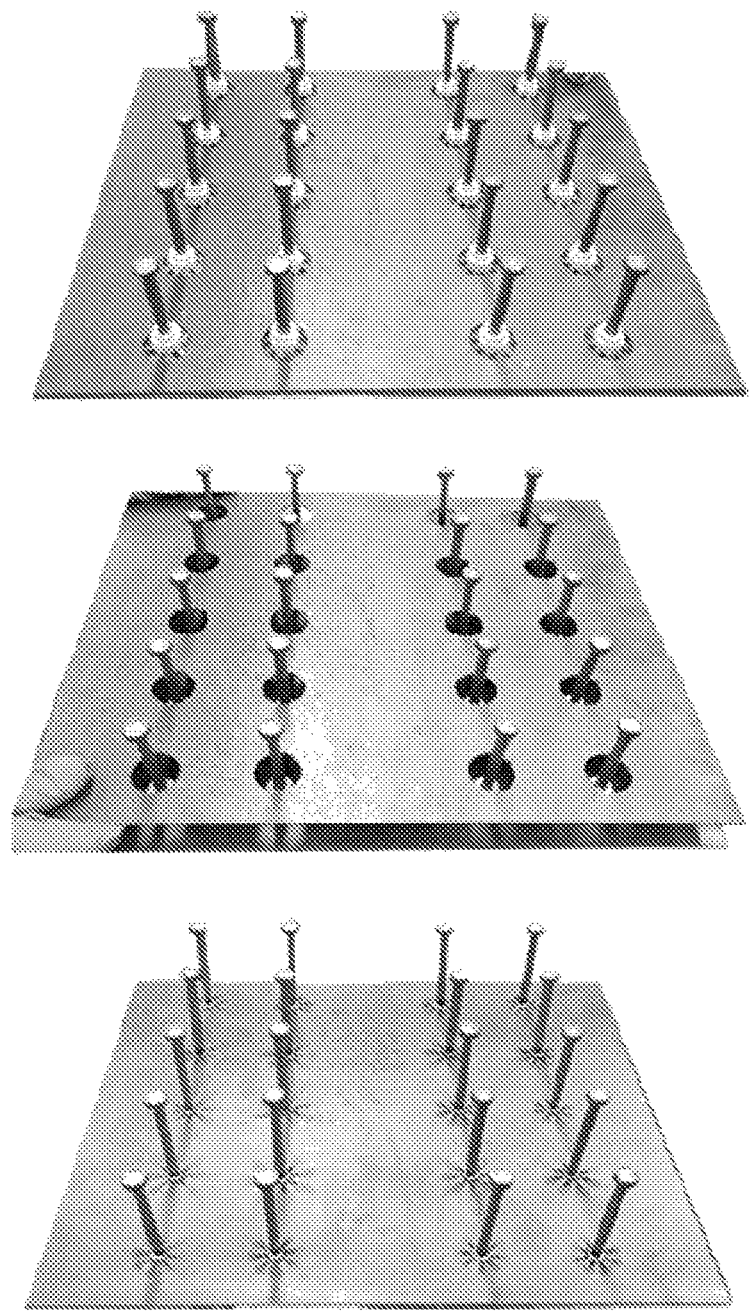
FIG. 22: Steel plate and stud matrix.

To aid in the installation, a guide plate was created in order to facilitate the stud installation and to ensure consistency (see FIG. 22).

Specimen Preparation

Two methods are used to fabricate the push-off specimens; though the final result are the same except for the surface condition at the cold joint location.

Figure 23:
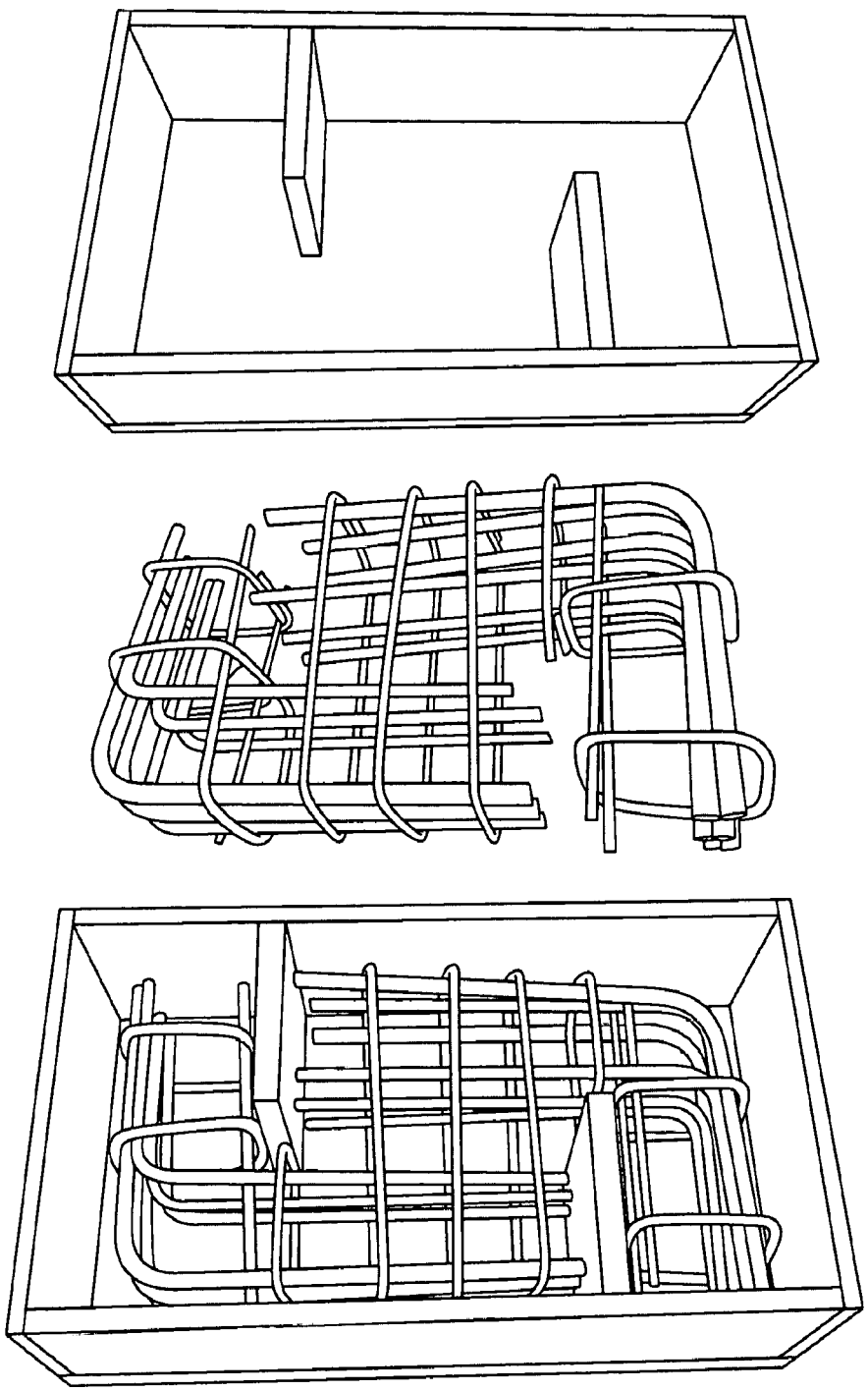
FIG. 23: Monolithic Specimen Prior to Casting.

The monolithic specimens are cast on their sides compared to the testing position with the shear plane oriented vertically. A picture of the monolithic specimen forms prior to casting is shown in FIG. 23.

The cold-joint specimens (Type 2, 3a and 3b) are cast in two stages with the shear interface surface horizontal, so that it could set as an as-cast surface. In order to achieve that, one half of the rebar cage with all the stirrups is tied separately from the other half. Each Type 2 specimen includes three No. 3 closed tie stirrups placed normal to the shear plane. The so-formed cage is placed in a separate reusable forming designed to produce half a specimen with the stirrups protruding from the surface after casting. Minimum cover of 0.5 in. (12.7 mm) is provided at the intended shear plane, and 0.75 in. (19.1 mm) is provided in the remainder of the specimen.

Figure 24:
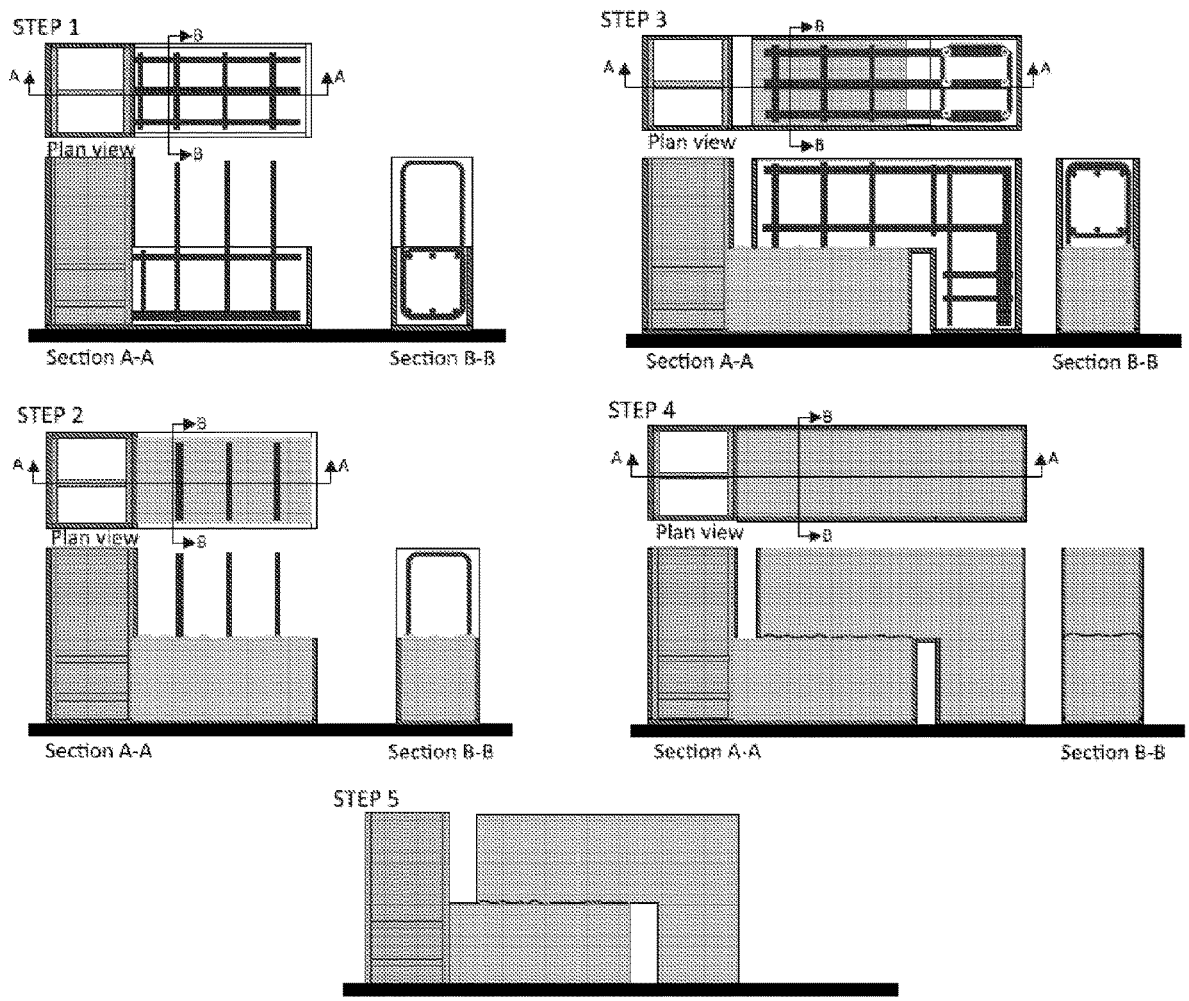
FIG. 24: Steps for the fabrication of the shear friction specimens. The steps will remain the same for both steel reinforcement configurations. Step 1: Bottom mold with surface up. Step 2: Pour concrete in first part (day 1). Step 3: Add additional mold. Step 4: Pour concrete second part (day 2). Step 5: Cure 28 days.
Figure 25:
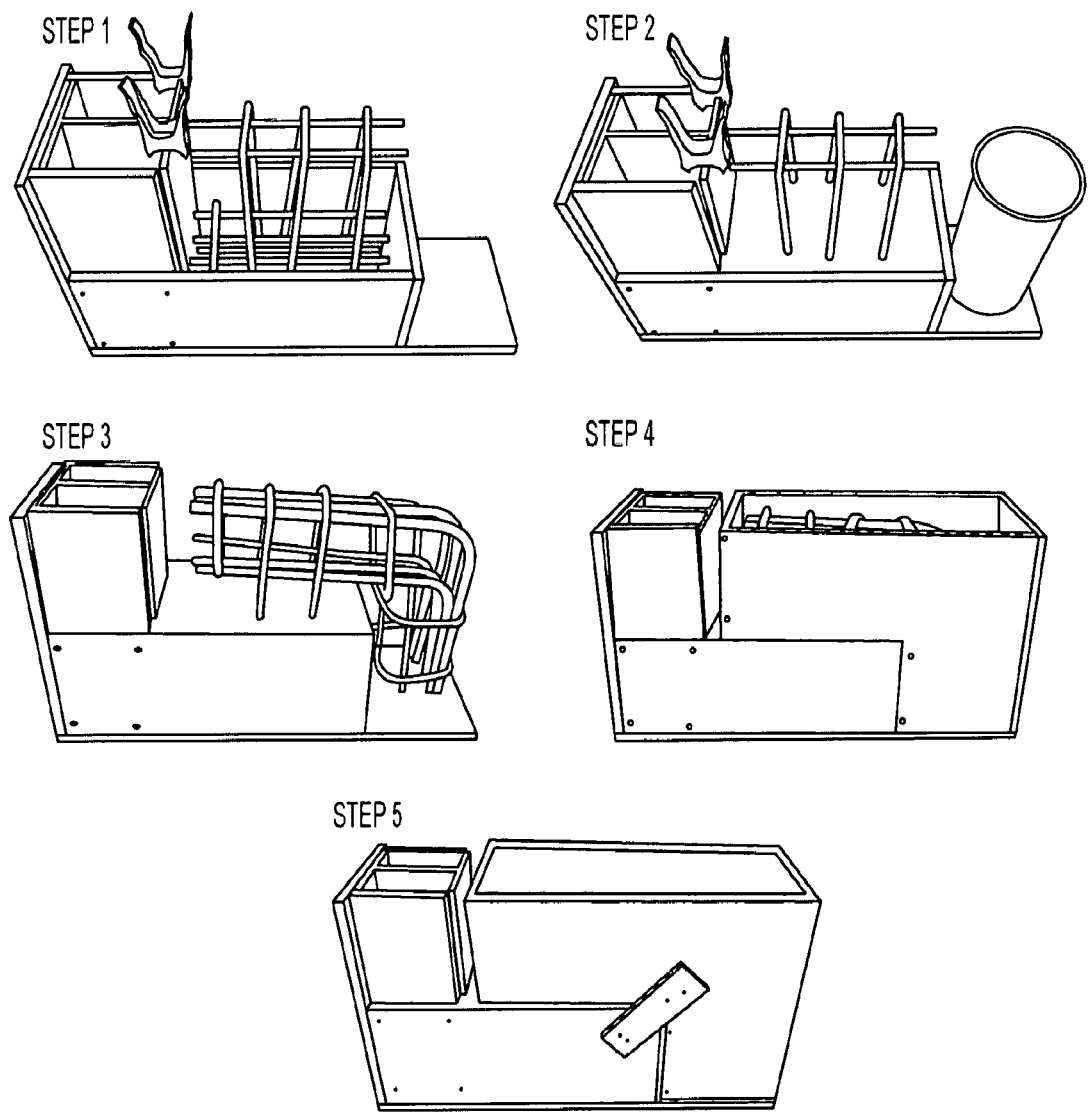
FIG. 25: Cold-joint Specimen preparation.

The cold-joint specimens is left to set with an as-cast surface at the shear plane generated from the SRC. After adequate hardening of the concrete, the forms is removed and the surface cleaned of any impurities. The other half of the specimen is formed and cast on top of a moist interface. Schematic steps of the construction process are illustrated in FIG. 24, whereas the fabrication process is shown in FIG. 25.

Presently, the surface roughness is measured using one of two fundamental methods for determining surface roughness: (1) International Concrete Repair Institute's (ICRI's) standard CSPs (qualitative assessment) or (2) profilometry (quantitative assessment).

The ICRI's CSPs are benchmarks used to establish industry acceptable specifications and represent varying degrees of concrete roughness and texture. Nine rubber profiles represent varying degrees of concrete roughness, with CSP 1 being thought to represent the least rough (smoothest), while CSP 9 being the most rough. A qualitative assessment of the surface roughness was performed by visual inspection comparing the concrete surface to the CSPs. The level of roughness was considered acceptable when comparable to the range of CSP 7 to 9, which correspond to an amplitude roughness of ¼ in. (7 mm).

TABLE 8 summarizes the details of specimens cast so far. The remaining specimen are scheduled to be cast in the following two weeks. The first two letters reported in the ID classification in TABLE 8 represent the type of specimen (MO for monolithic, CJ for cold-joint and SP for steel plate), the first two numbers indicate the interface type characterized by the amount of LWA (5% and 15%), and the following two numbers indicate the reinforcement ratio (0.25, 0.50 and 0.75).

TABLE 8

Specimen IDs And Concrete Properties

| Specimen ID | Flow Slump [in] | $t_{20}$ [sec] | S test [0-3] | VSI [0-5] | f'c (1st) [psi] | f'c(2nd) [psi] |
|---|---|---|---|---|---|---|
| MO-1 | 24 | 3 | 0 | 0 | 7280 | n/a |
| MO-2 | 24 | 3 | 0 | 0 | 7380 | n/a |
| CJ 15 75-1 | 23 | 5 | 0 | 0 | 8040 | 8120 |
| CJ 15 75-2 | 23.5 | 4 | 0 | 0 | 6400 | 6560 |
| CJ 15 75-3 | 23.5 | 4 | 0 | 0 | 6400 | 6780 |
| CJ 05 75-1 | 26.5 | 3 | 0.5 | 1 | 6800 | 7430 |
| CS 05 75-2 | 26.5 | 3 | 0.5 | 1 | 6800 | 7430 |
| SP 15 50-1 | 22.5 | 6 | 0.5 | 0 | 6060 | 6730 |
| SP 15 50-2 | 22.5 | 6 | 0.5 | 0 | 6060 | 6730 |
| SP 15 50-3 | 22.5 | 6 | 0.5 | 0 | 6060 | 6730 |
| SP 05 50-1 | 23 | 5 | 0 | 0 | 6230 | 6680 |
| SP 05 50-2 | 23 | 5 | 0 | 0 | 6230 | 6680 |

Figure 26:
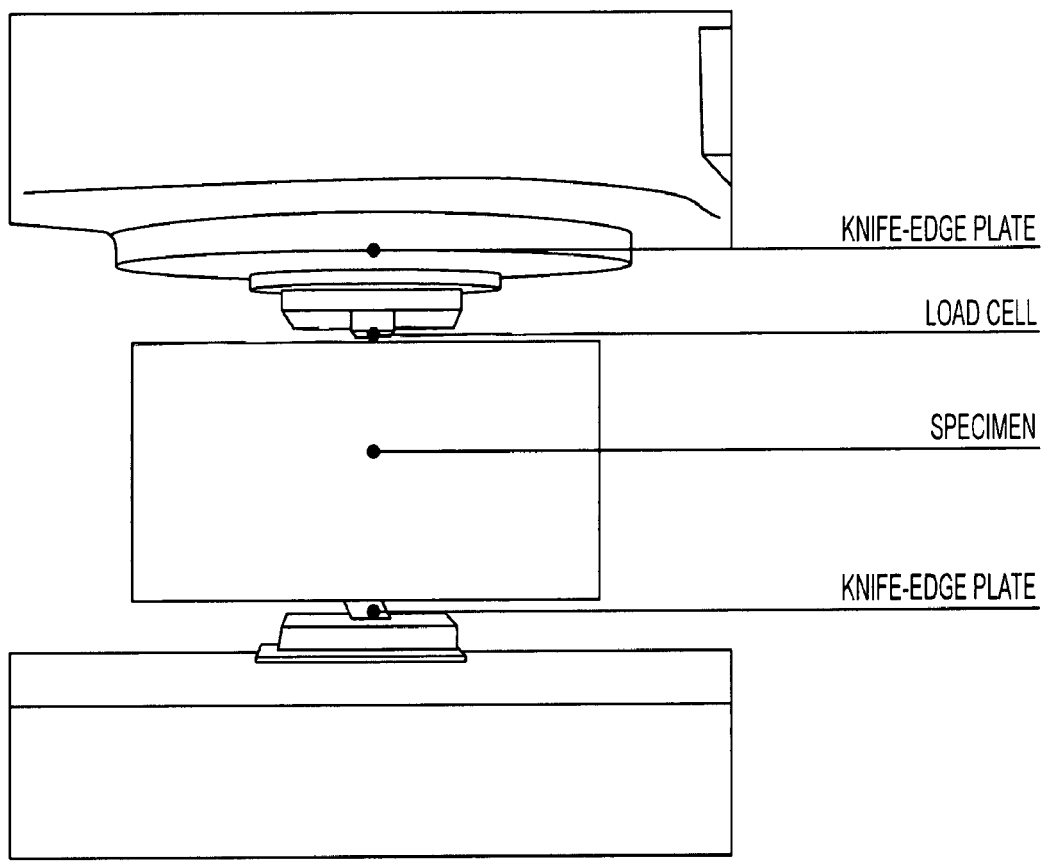
FIG. 26: Load and position of monolithic specimen during pre-cracking.
Figure 27:
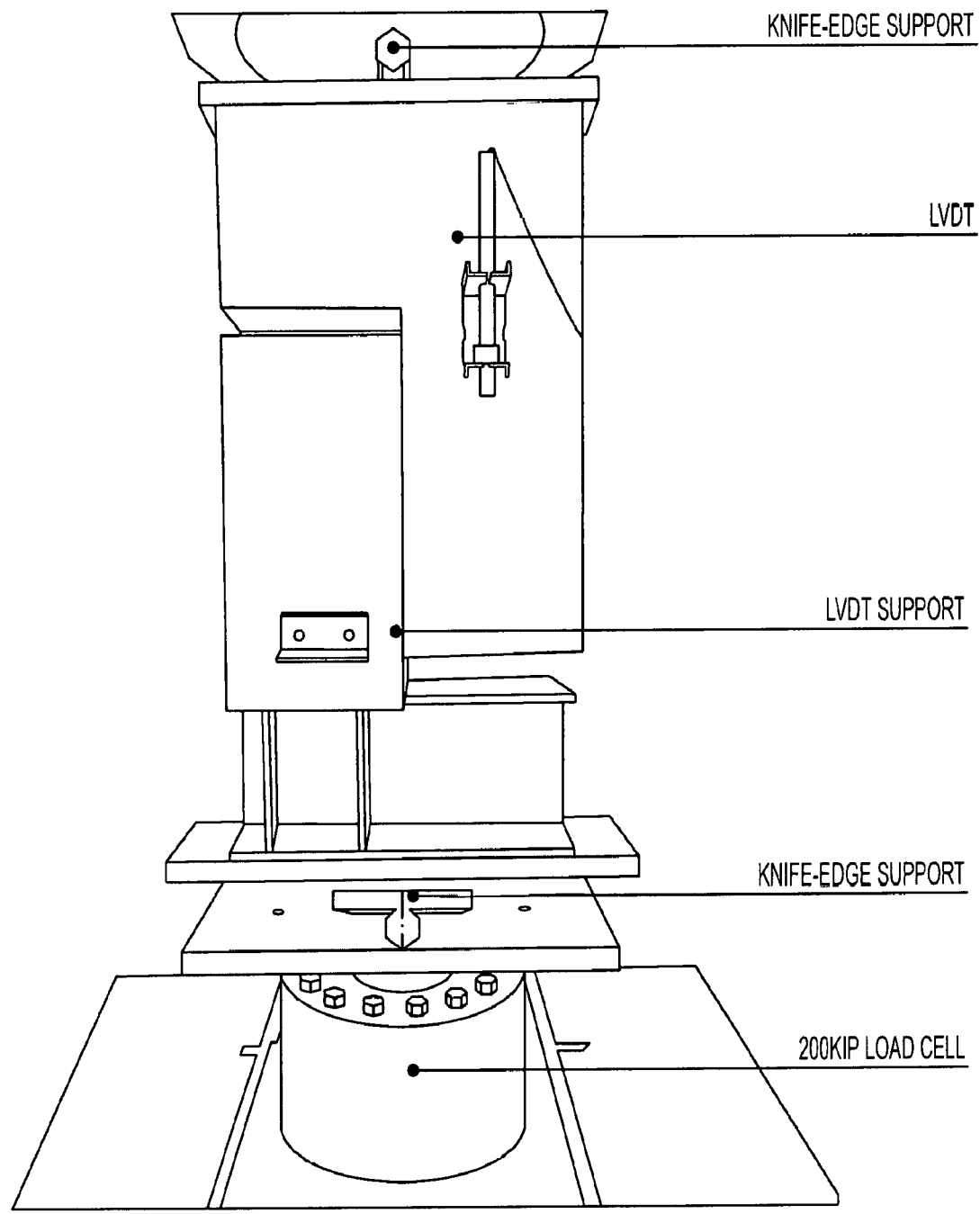
FIG. 27: Test setup.

MO—monolithic
CJ—includes cold joint but is internally reinforced
SP—external steel plate reinforcement with cold joint
05/15—represents volume of lightweight aggregate in concrete mix
25/50/75—represents nominal reinforcing ratio across the cold joint in percent
-X—represents specimen number for repeated tests Test Setup The monolithic pre-cracked specimens were prepared by placing a specimen on its front side while aligning a knife-edge plate perpendicular to the shear plane as shown in FIG. 26. All push-off specimens were tested using the set up illustrated in FIG. 27.

Testing was performed using a screw-driven hydraulic testing machine with a maximum capacity of 400 kip (1,780 kN). Applied load was recorded using a 200 kip load cell placed at one of the supports. Relative slip movement across the interface was measured by two linear voltage displacement transformer (LVDT) located on both front and back of the specimen. In the case of specimens reinforced using steel face plates, strain measurements were recorded using two strain gauges, one horizontal and one vertical, located at the mid-height of the specimen. Experimental data were gathered using a National Instruments data acquisition system running Lab VIEW software. Load was applied at a rate of 500 lb/s (2,224 N/s). Specimens were tested until one of the following conditions occurred: a target slip of 0.3 in. was reached, or a sudden and significant drop in applied load occurred. Prior to testing, the width and height of the interface shear surface were measured and recorded for determining interface shear stress.

Test Results

Preliminary results were obtained from the following specimens: MO-1, CJ0575-1, CJ1575-1 and SP1550-1. Critical values recorded for each specimen include peak (ultimate) applied load (shear force) Vu (63.2 kip, 53.2 kip, 51.1 kip and 62.1 kip, respectively) and slip at peak load (0.375 in., 0.052 in., 0.048 in, and 0.48 in., respectively).

Figure 28:
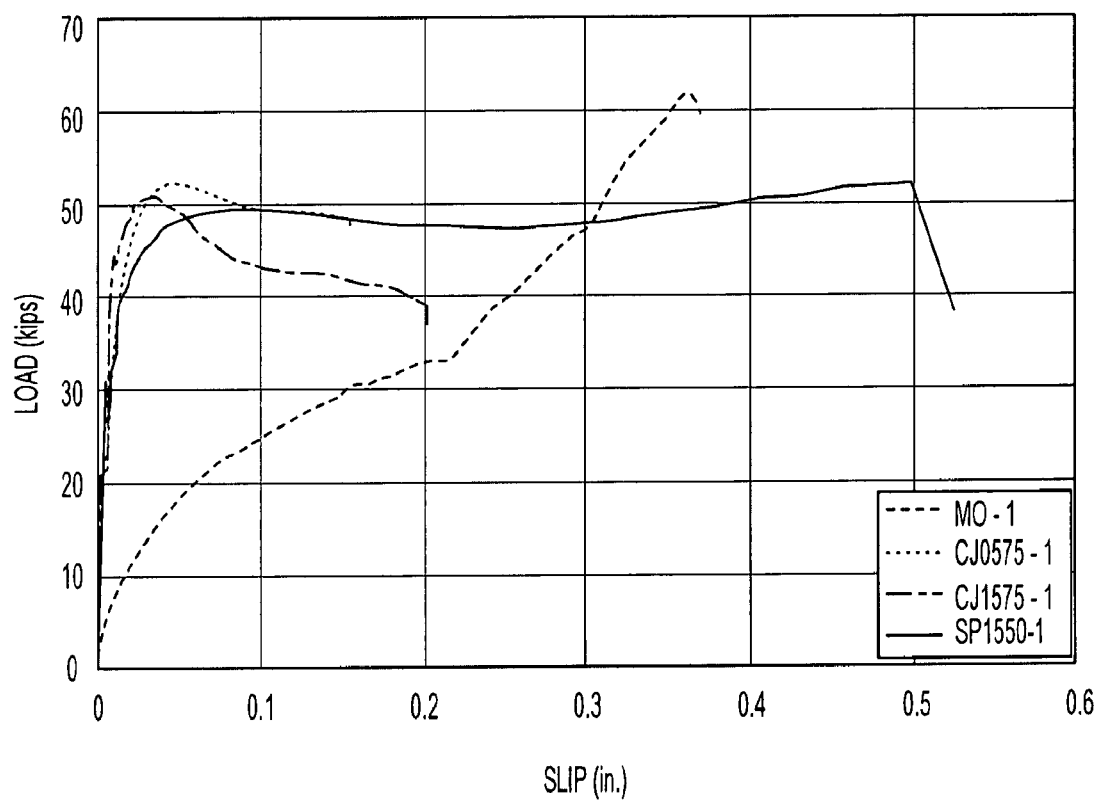
FIG. 28: Graph of typical load-slip course for push-off specimens.
Figure 29:
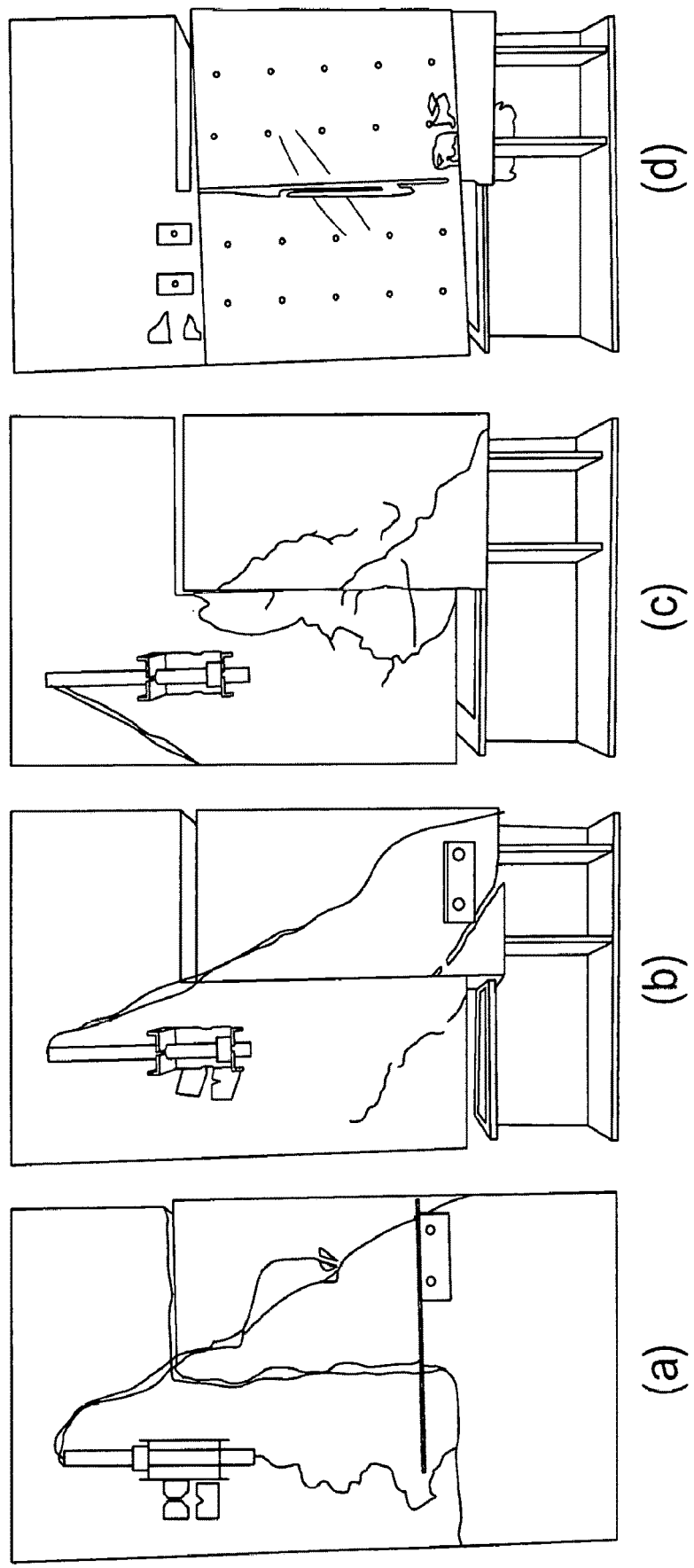
FIGS. 29(a)-(d): Failure mode. (a) MO-1, (b) CJ0575-1, (c) CJ1575-1, and (d) SP1550-1.

Data presented for each specimen include a shear force-slip diagram reported in FIG. 28. The load-slip curves for the pre-cracked specimens (MO-1) showed an initial slope of the curve less than the slope for cold-joint specimens, both with internal and external (steel plate) reinforcement. No peak load was observed because the load increased through the entire displacement. A load-slip curve like this was also observed in pre-cracked push-off tests by previous research. The pre-cracked specimen showed a plateau when slip was around 0.2 in. After that point the load transferred from the concrete to the rebar that were resisting shearing through the formation of dowel mechanism.

The cold-joint specimen with external reinforcement (steel plate bonded through headed studs) tended to have more gradual changes to the slope of the load-slip curve than did the cold-joint specimen with internal reinforcement even though they exhibited a higher stiffness before reaching the peak load. This could be due to a more gradual transfer of force from cohesion to shear friction.

The specimens with external reinforcement exhibited much more ductile failures than the ones with internal reinforcement with a load carrying capacity comparable to cold joint specimens with internal reinforcement. However, failure mode where governed by the different reinforcement configuration. Sudden and brittle was the failure showed by the cold-joint specimens with internal reinforcement where cracks started to propagate after reaching an approximated value of slip of 0.05 in. Although the obvious increase in terms of ductility, the specimens with external reinforcement failed due to local buckling among studs. This type of failure is typical in SC structures and it is governed by geometry of the stud system (FIGS. 29(a)-(d)).

Analytical Modeling of Second Phase Specimens

Figure 30:
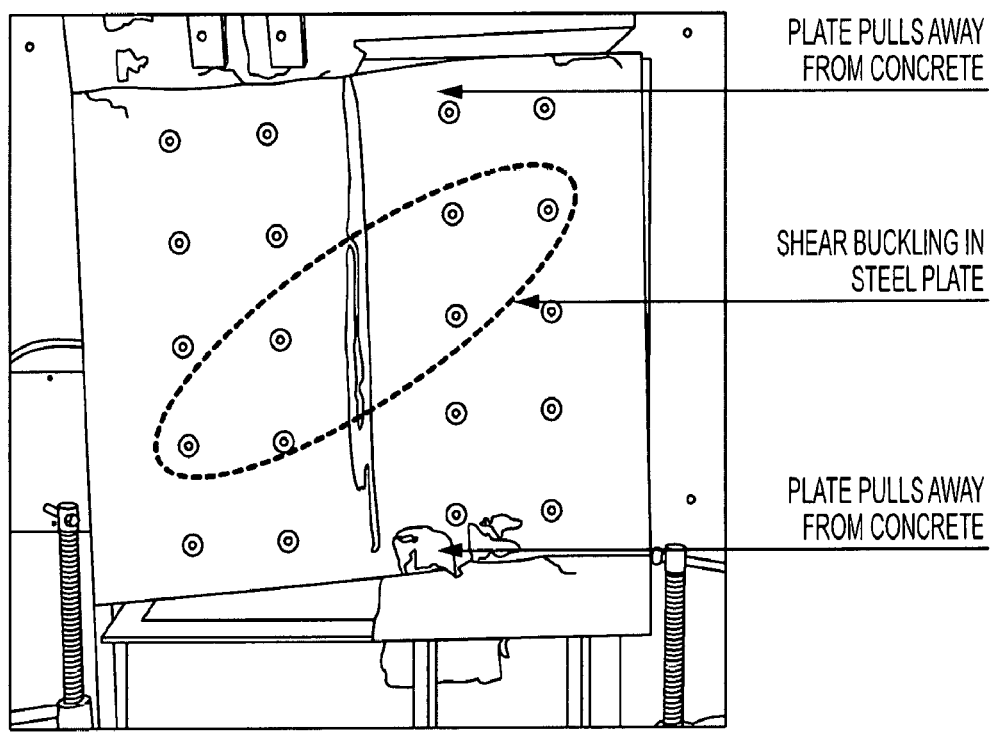
FIG. 30: Shear buckling of Task 2 Specimen SP 15 50-1.
Figure 31:
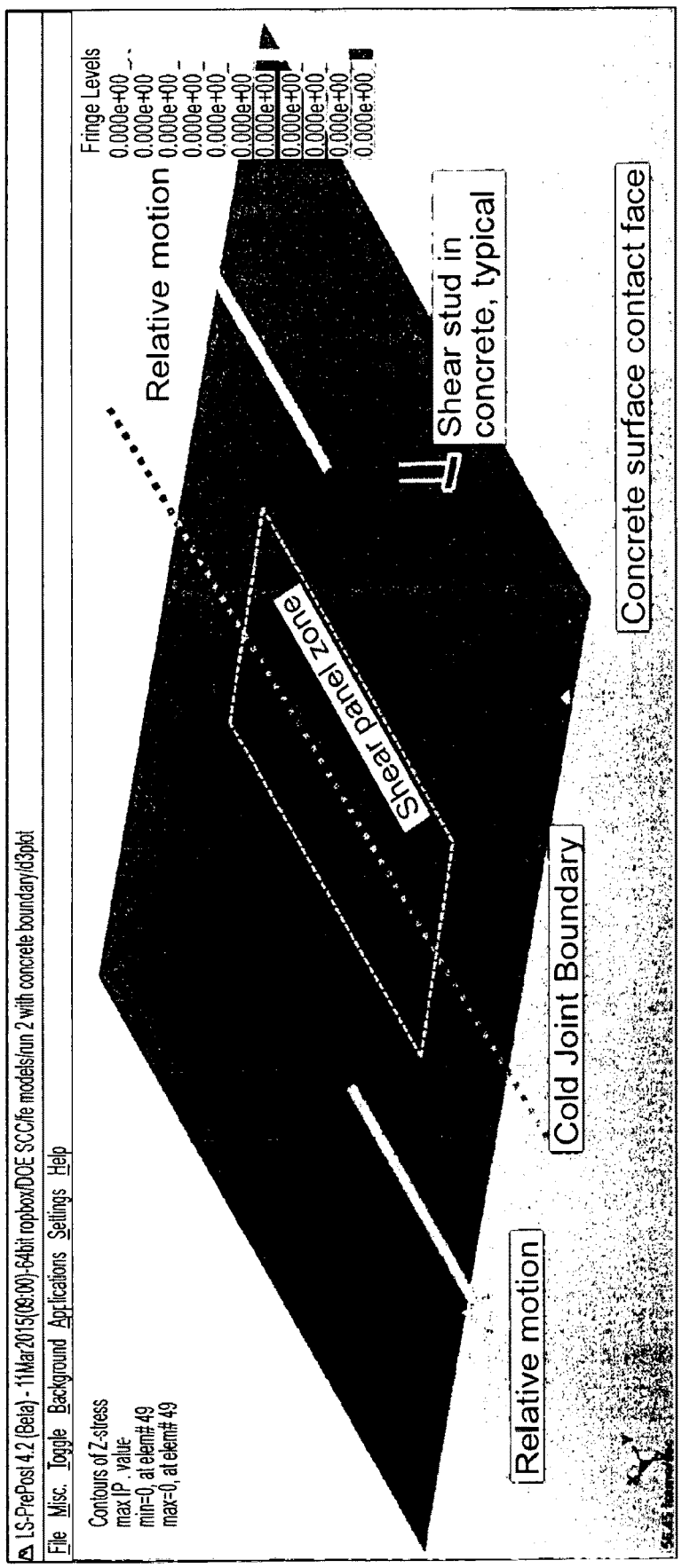
FIG. 31: Non-linear finite element model in LS-DYNA explicit. This initial model approximates the geometry of specimen SP 15 50-1 but with fewer Nelson studs.
Figure 32:
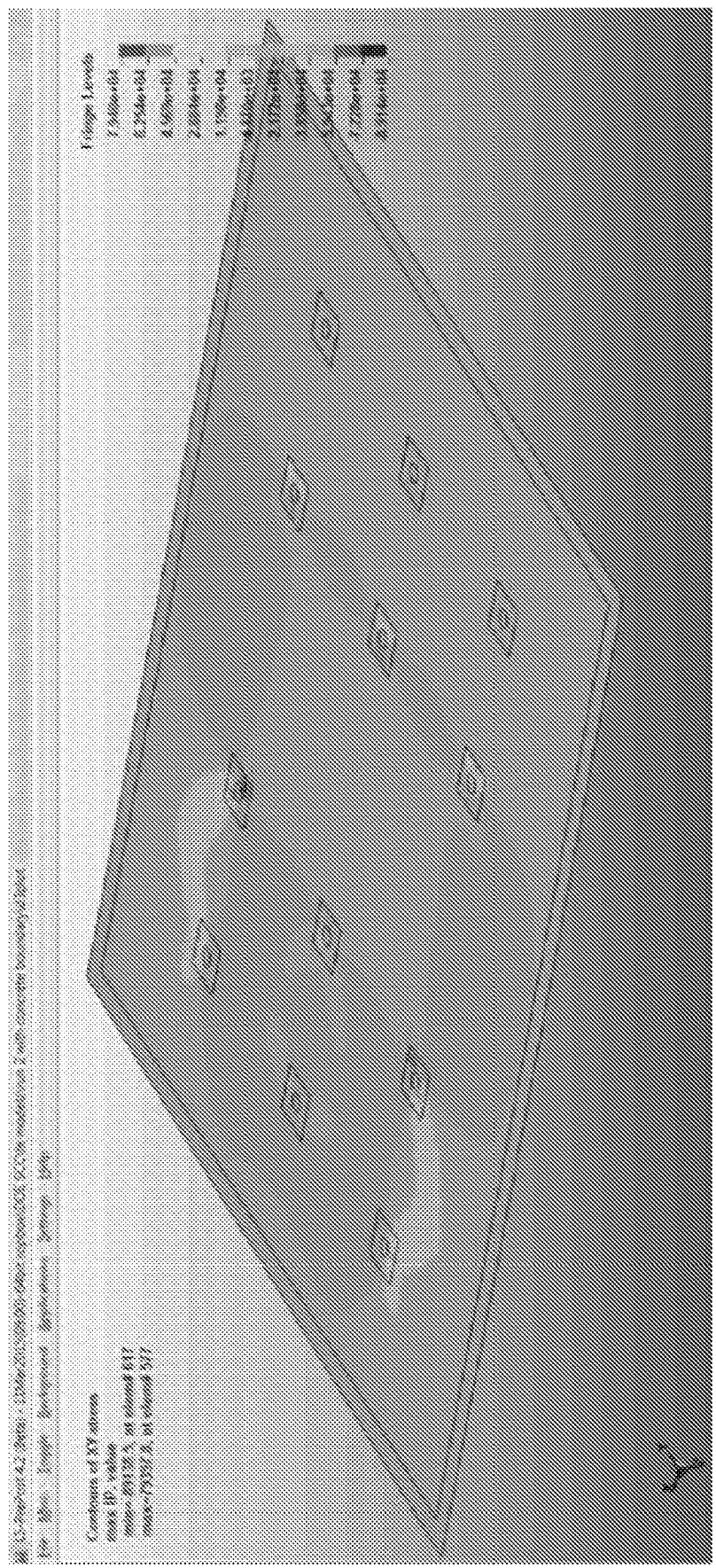
FIG. 32: Initial loading. Constant shear in the panel zone. In-plane shear stresses shown (all stresses in Pa).
Figure 33:
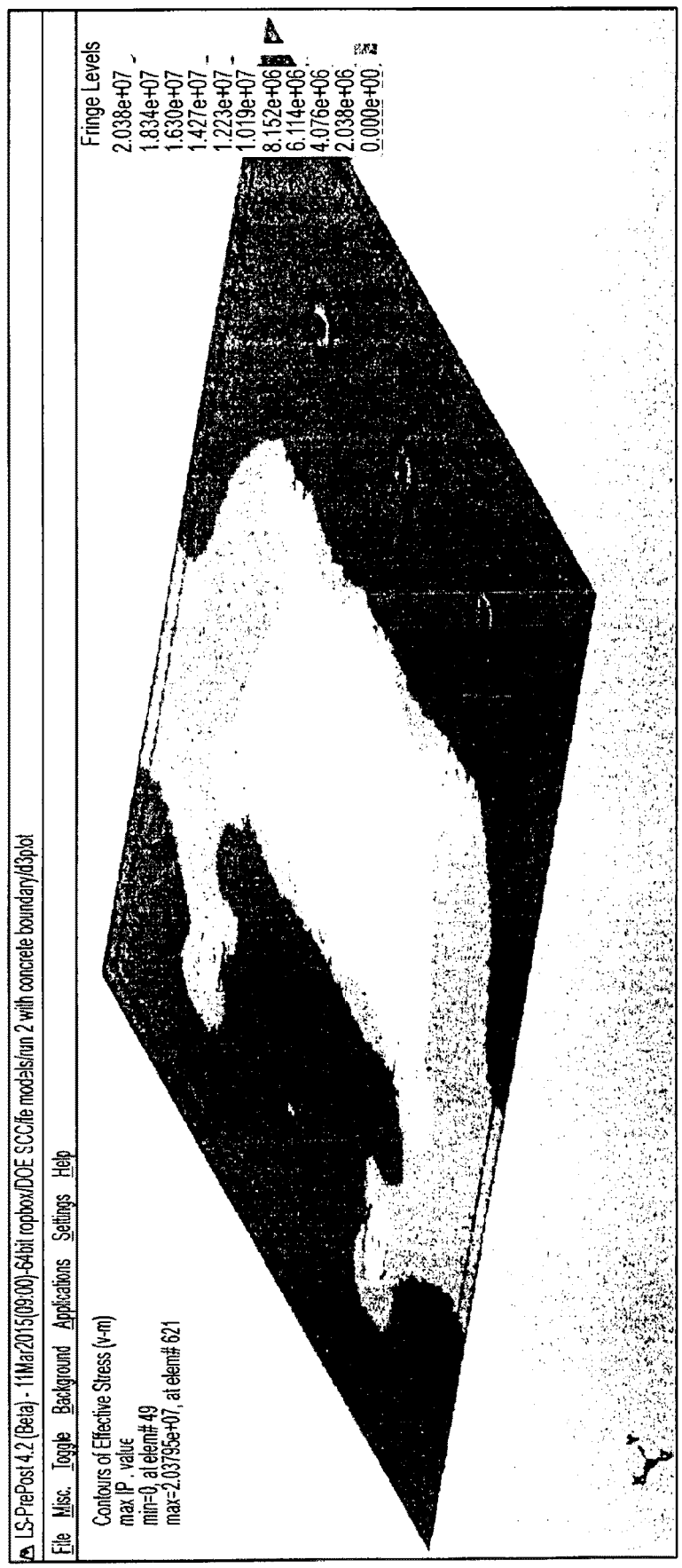
FIG. 33: Initial loading. Constant shear in the panel zone. Von Mises stresses shown. Note that outside rows of studs are not participating in the shear transfer.
Figure 34:
FIG. 34: Onset of buckling. Panel zone shear dramatically reduced. Principle tensile stresses align with buckling of plate steel. Buckling is elastic, that is, steel plate does not yield before the bucking initiates. Model also predicts the pulling of the edge of the steel plate as shown in FIG. 30.
Figure 35:
FIG. 35: Buckling progresses. Steel plate begins to yield in the vicinity of two studs. The buckling distortion as the plate pulls away from the concrete visible along the edges.
Figure 36:
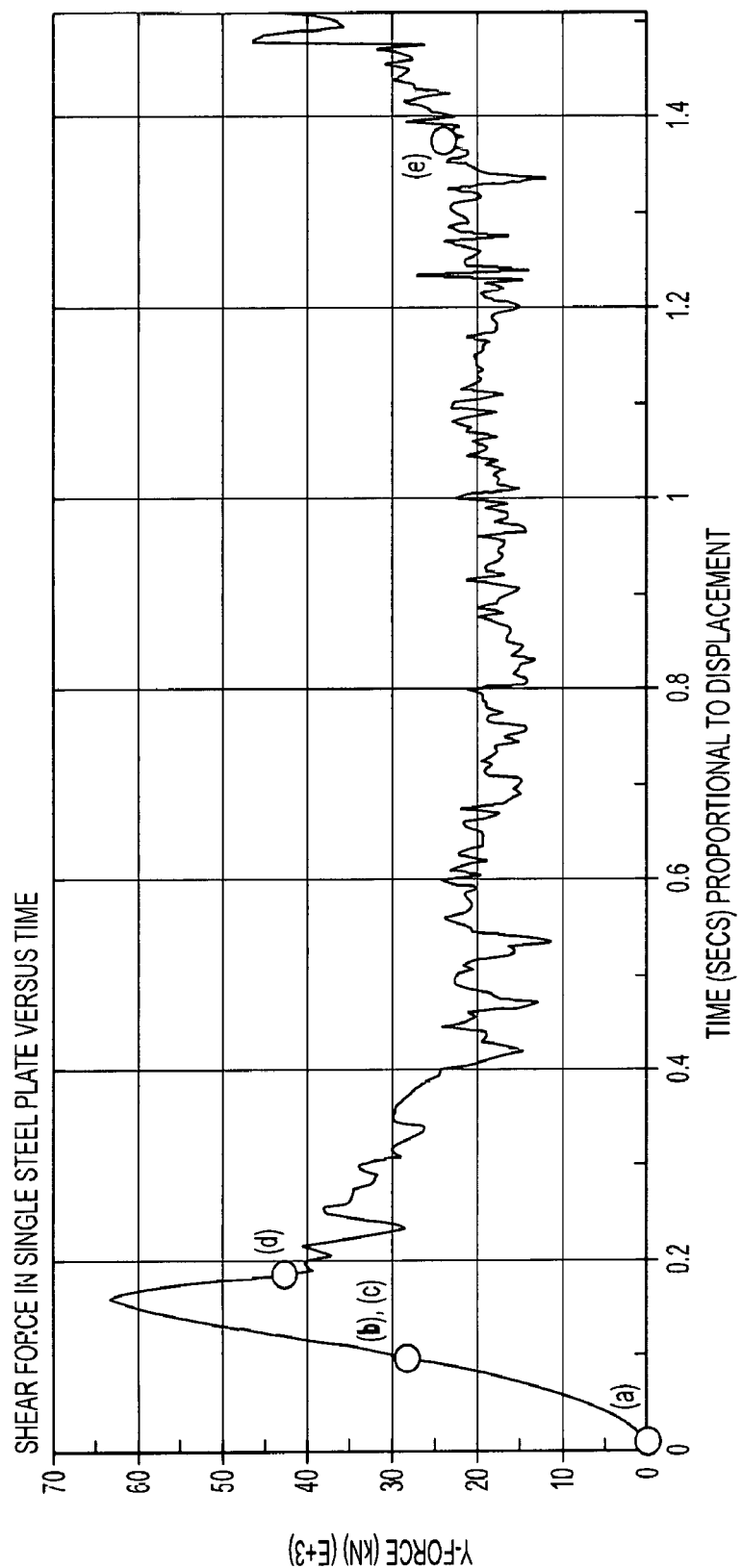
FIG. 36: Shear force versus time plot for FE model (note that displacement is proportional to time). Times when stress contour snapshots

From initial second phase test results, it is clear that the specimens with 16 gage steel plates are capable of carrying a significant load across the cold joint—and that the capacity of the specimen is comparable to that of similar internally-reinforced shear friction specimen. The onset of failure is characterized by shear buckling of the steel plate (see FIG. 30). The propagation of the shear buckling is constrained by the studs and the specimen demonstrates a flat force-displacement curve post-buckling, indicating significant energy dissipation and continued load capacity. Capturing and modeling this behavior analytically will enable the present invention to aid in predicting the behavior of the more complex third and fourth phases specimens and provide guidance for cold-joints. An initial analytical model is described below.

An initial first analytical model depicts the steel plate on one size of the second phase specimen. The steel plate is subject to in-plane loading that is transferred to the steel plate through six Nelson studs on each side of the cold joint boundary. In FIGS. 31-36, the geometry and behavior of the model are shown. At this point, this should be considered a causal model, developed to describe the behavior of the steel plate across the cold-joint boundary. The model is not sufficiently detailed at this point to directly match the second phase experimental data.

The finite element model is developed in LS-DYNA explicit and considers both material and geometric non-linearities. A monotonically increasing displacement across the cold-joint boundary is applied to the model, with the displacement being applied to the plate by the moving shear studs on one side of the cold-joint boundary, while the studs on the opposite side are fixed. The concrete in the second phase specimen is not modeled, but a contact surface is applied to the stud-side of the steel plate to prevent the plate from buckling into the concrete surface.

Validation through Full-Scale Testing and Modeling

In the third phase the failure of concrete and steel modular units at cold joints was explored. The mid-size specimens used in the third phase were approximately one-half the scale of the modular units currently used in the AP 1000 reactor buildings. The full-scale fourth phase specimen was received directly from Westinghouse. This C20-06 module was fabricated at Oregon Iron Works and a section of the module was cut and shipped to Georgia Tech. The test article was 26 ft. 6 in. long, and had a cross-section of 3 ft. wide by 2 ft. 6 in. deep. The module had the typical steel angle longitudinal members and steel channel members used to retain the two faces of the module. Steel studs, ¾ in.×6 in. nominal on a nominal 6 in. square grid spacing pattern, were welded to both interior faces of the module.

Georgia Tech constructed a formwork for the test article to enclose the two open sides of the module. The module was then affixed vertically to the strong wall of the structures lab, in preparation for concrete placement. The self-roughening SCC developed in the first phase was placed into the beam in three lifts, with cold-joints formed 6 feet from each end of the beam. The cold-joints were placed so as to be mid-way between the steel channels separating the two faces of the module plates. This was considered to be the worst-case scenario, so that any potential slip across the cold-joint boundary, as was seen in the third phase specimens, would be carried only by the concrete, and not bridged by the steel channel. When the concrete had cured 10 days, the specimen was removed from the wall and rotated into the horizontal configuration for flexural testing.

As in the third phase, the self-roughening SCC was tailored from a concrete mix for production in a ready-mix environment—as opposed to the laboratory mixes that were used in the first and second phases. There were significant changes and findings associated with making the mix at the plant—and additional lessons learned with the three concrete pours made during this fourth phase.

It was necessary to add a set retarder to the concrete mix to ensure working time for concrete transport. Sika Plastiment retarder at a dose of 1.5 ounces per hundred pounds of cementitious materials (cement plus fly ash) was added to the mix;

It may be necessary to add an additional dose of super plasticizer and a small amount of water at the site;

The appropriate slump range was in a fairly tight range, from 24 to 26 inches. It is recommended that the slump be no less than 24 inches when the concrete truck leaves the batch plant;

When slump falls beneath 24 inches, the concrete can be placed properly but the self-roughening amplitude is decreased;

Some segregation can be anticipated if the slump exceeds 27 inches. This occurred in the last concrete placement for the fourth phase specimen. Note that the segregation did not impact the structural test as the first cold joint, which did not show this segregation, was tested; and Concrete placement for most modular reactors will be by concrete pump. A professional concrete pump service was used for the third and fourth phases. The SCC placed by pump was observed to be subject to creating a mortar-rich slurry near the end of a given lift of concrete. As the pump ceases operation, the large aggregate exits the pipe first, and a quantity of mortar follows. This mortar may cover the large aggregate, including the LWA, which should form the surface of the cold joint. It is therefore suggested that the pipe leading into the modular unit be at all times just below the surface of the concrete, and any mortar placed inadvertently goes beneath the surface of the placement.

The fourth phase specimen was placed on roller supports in the 1 million pound test frame in the structures lab. The specimen was tested in out-of-plane shear as the third phase specimens showed that these were the most critical configurations for cold-joint performance. The specimen was tested on a 20 foot clear span in three-point bending, with the load positioned weight feet from the end of the beam. See FIG. 37. Thus the point load was two feet from the cold joint.

Instrumentation included a load cell affixed to the hydraulic ram, a displacement device at the point of load application, and an LVDT strain rosette used to measure movement across the cold joint. A set of three dial gages were used to assess concrete strain at the point of load application. A set of bonded resistance strain gages were used on the tension side of the specimen to monitor the stress in the steel plate of the module.

The structural test described above has just been completed as of this writing. The interpretation of the test results is therefore preliminary, and will be expanded upon in the final project reports.

Figure 38:
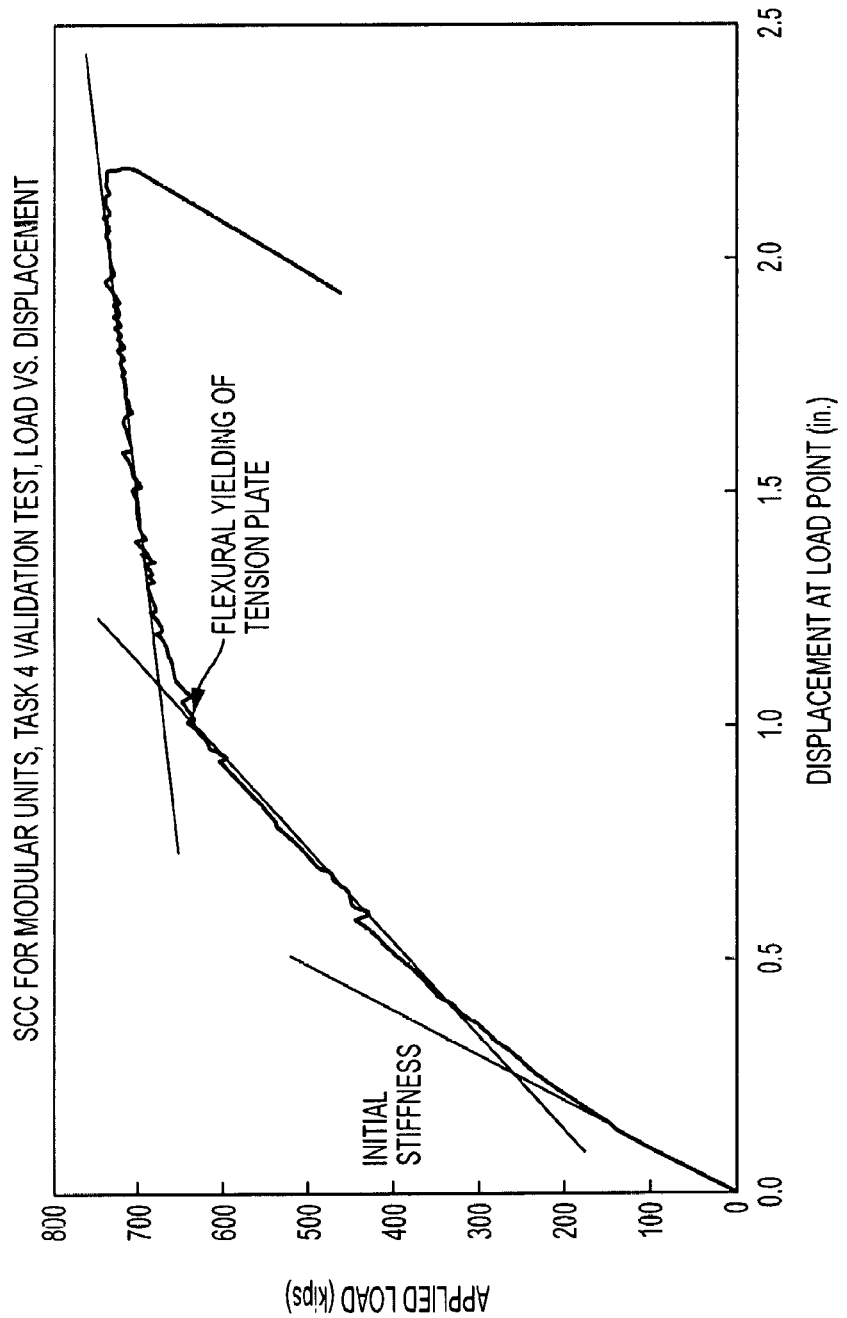
FIGS. 38-39 are graphs of displacement and strain test results.
Figure 39:
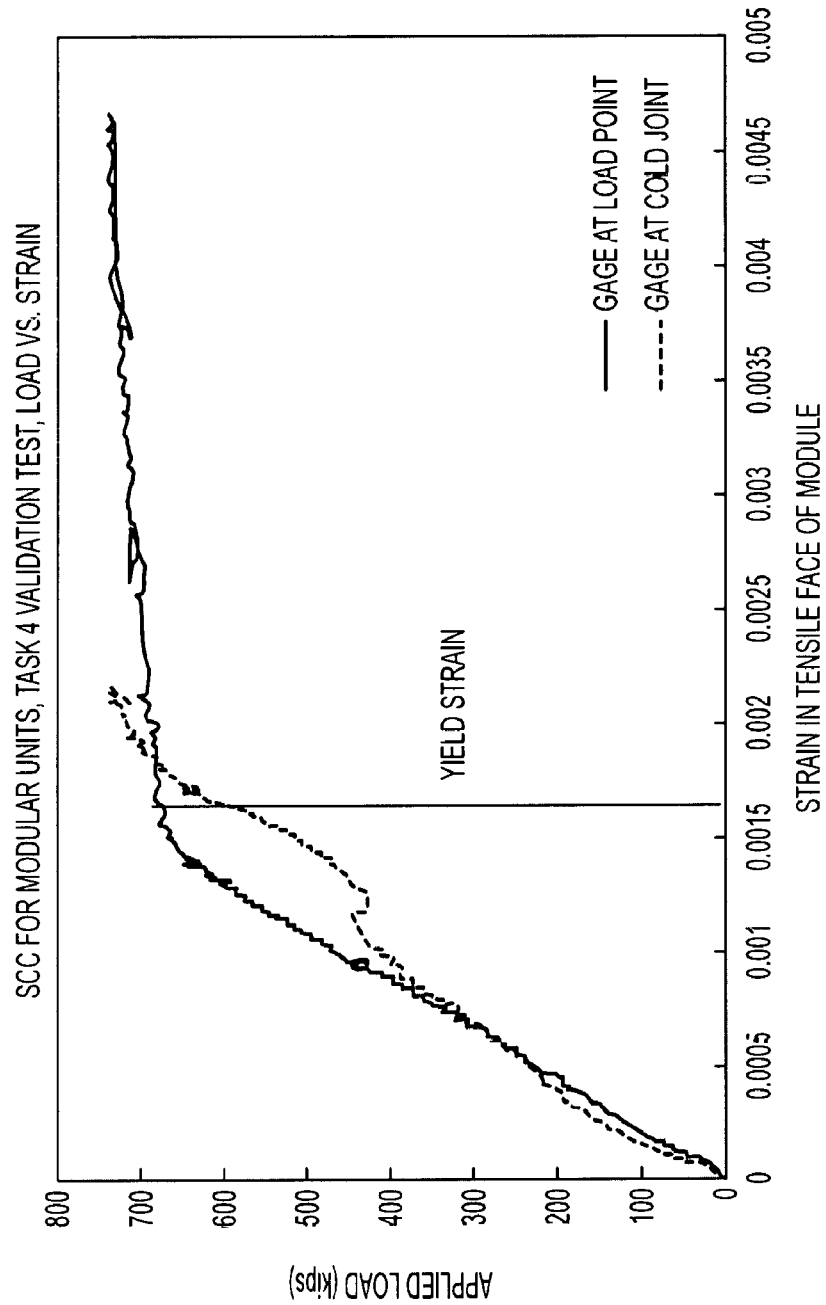
Figure 40:
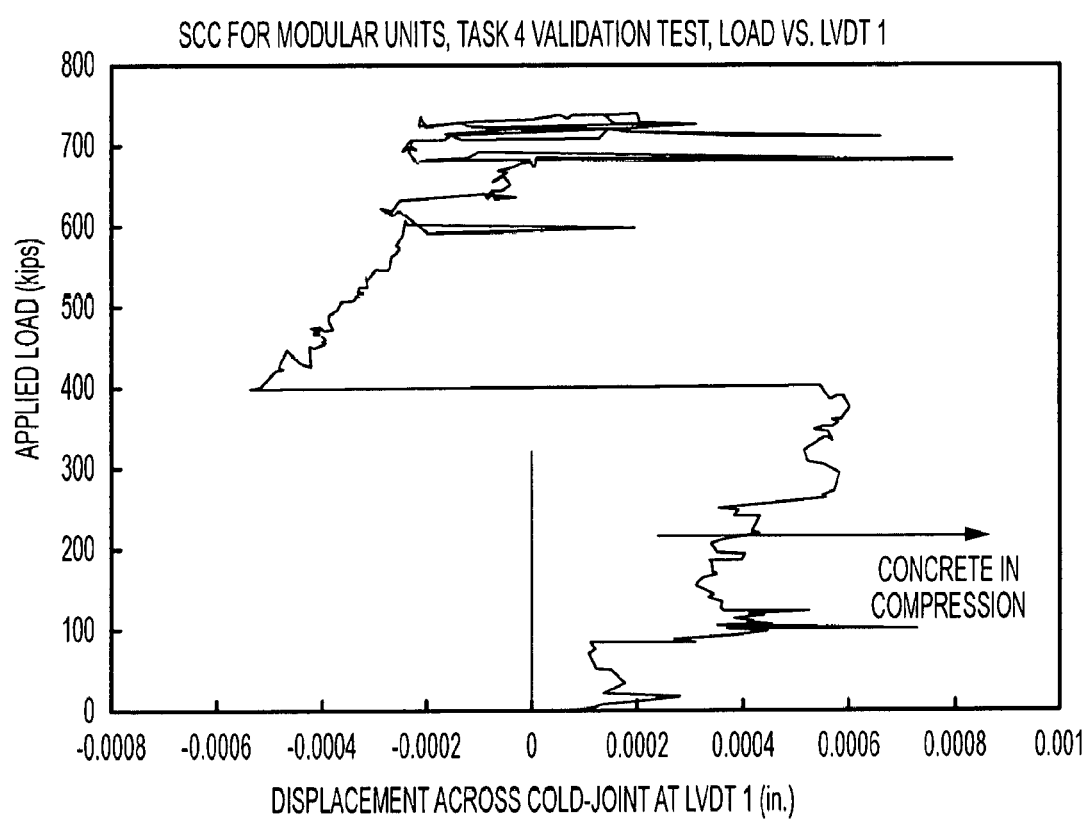
FIGS. 40-43 are graphs of LVDT measurements at the cold joint.
Figure 41:
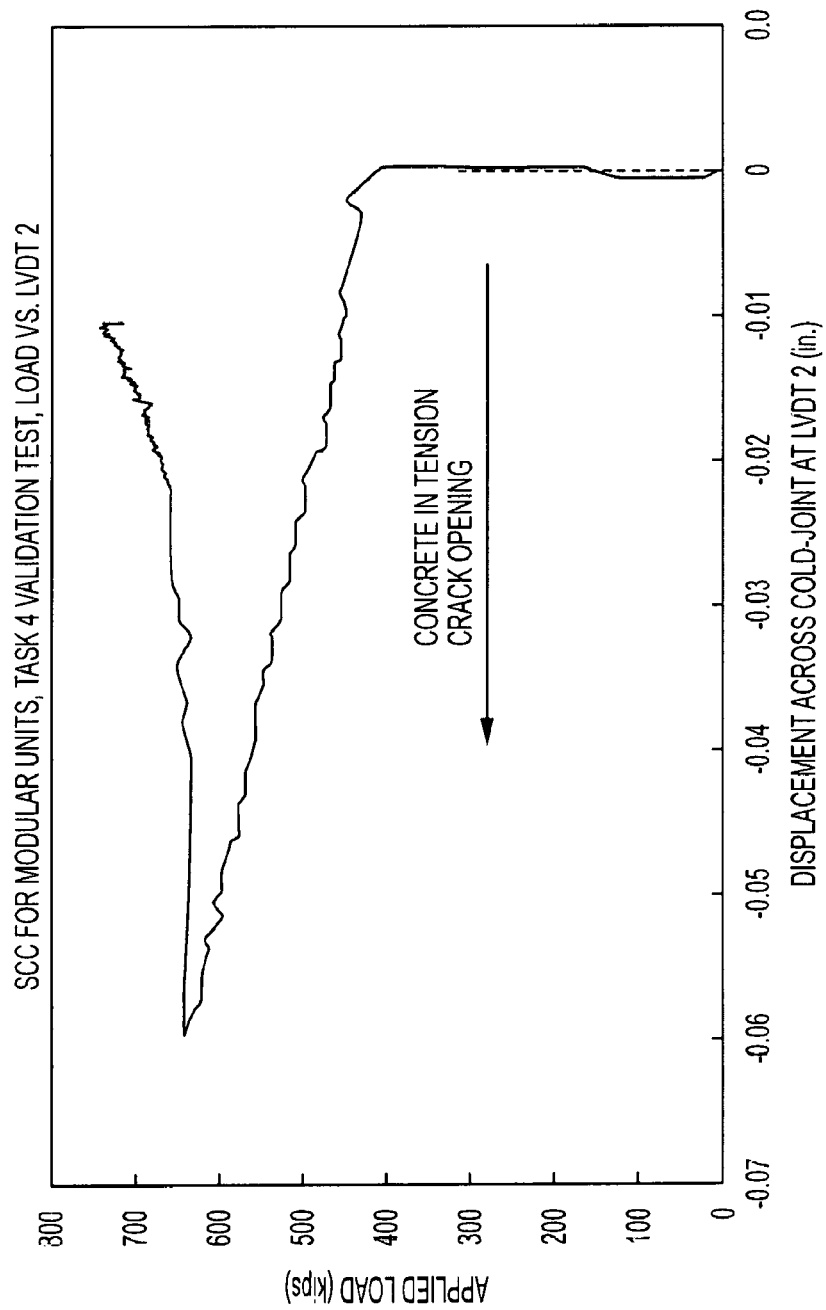
Figure 42:
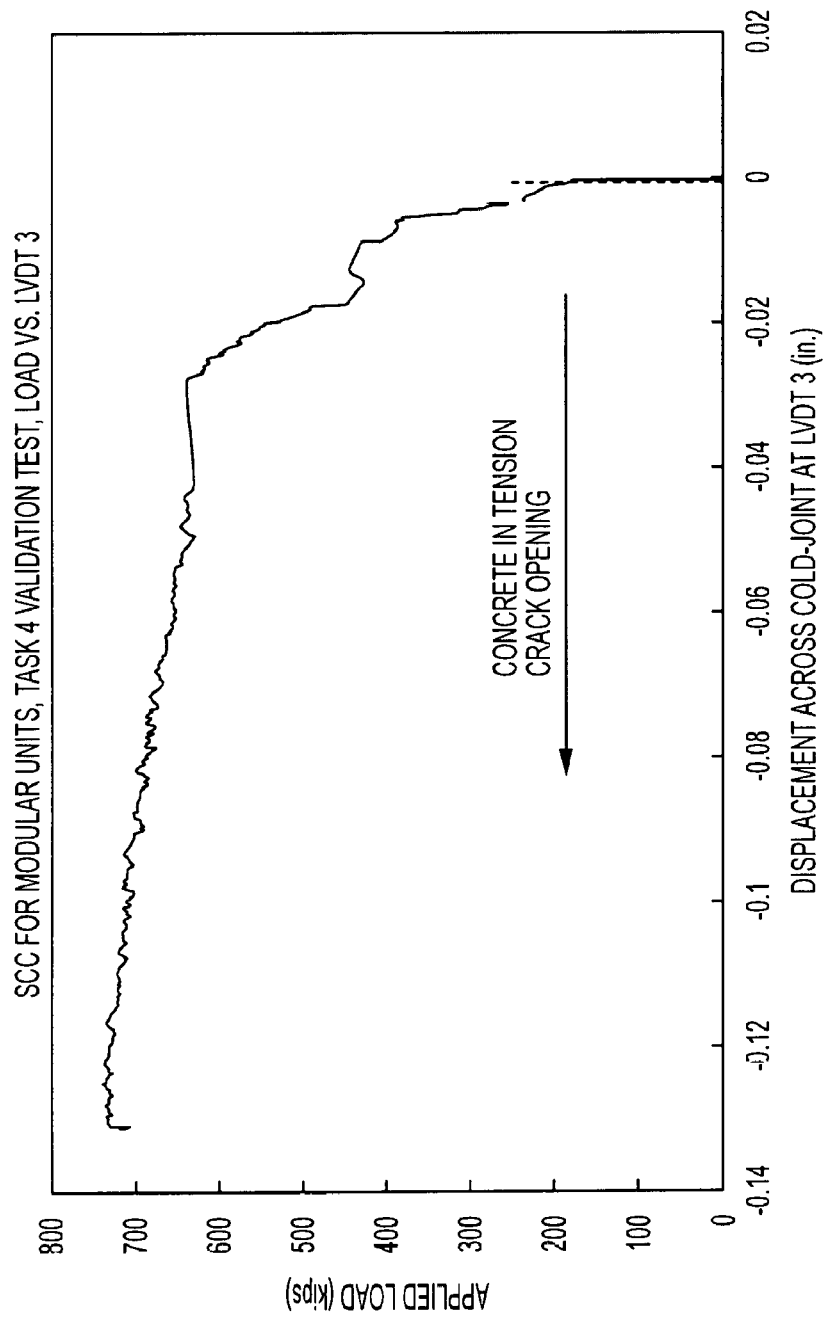
Figure 43:
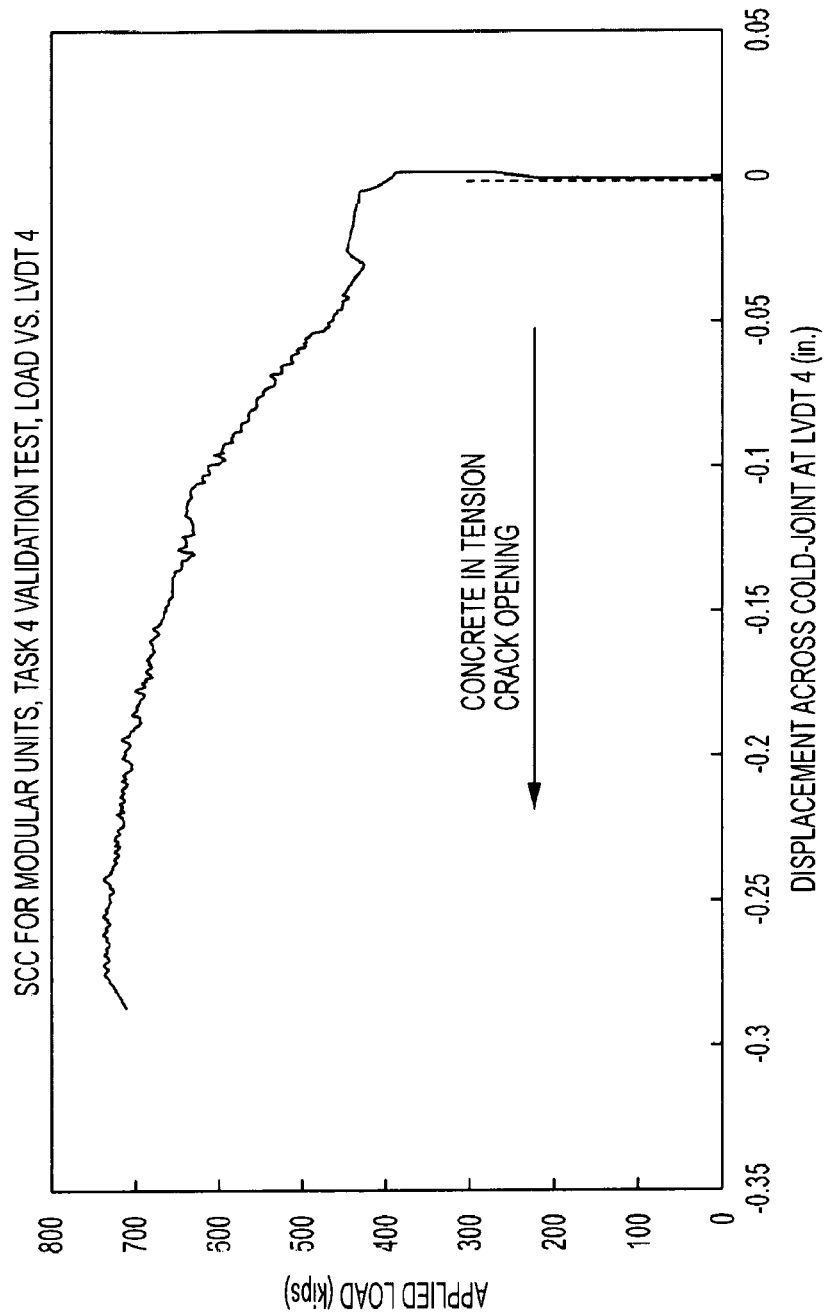

FIGS. 38 and 39 illustrate two key sets of data from the experiment. In FIG. 38, the load-displacement data is shown. As shown in this graph, the specimen behaves linearly up to a load of between 200 kips and 250 kips. A relatively simple calculation shows that the net shear stress in the beam at this time is around $2\sqrt{f'_c}$, which is generally taken as the contribution of the concrete to the shear strength of a reinforced concrete beam. At this point the specimen begins to lose stiffness, but continues to carry an increasing load.

A secondary stiffness is noted on graph of the load-displacement relationship. At a load of around 650 kips, an additional and more significant loss of stiffness occurs, and the behavior of the beam becomes essentially plastic. Significant ductility is noted in the specimen, and the specimen continues to carry load on a slightly increasing slope as the displacement continues to increase.

Figure 37:
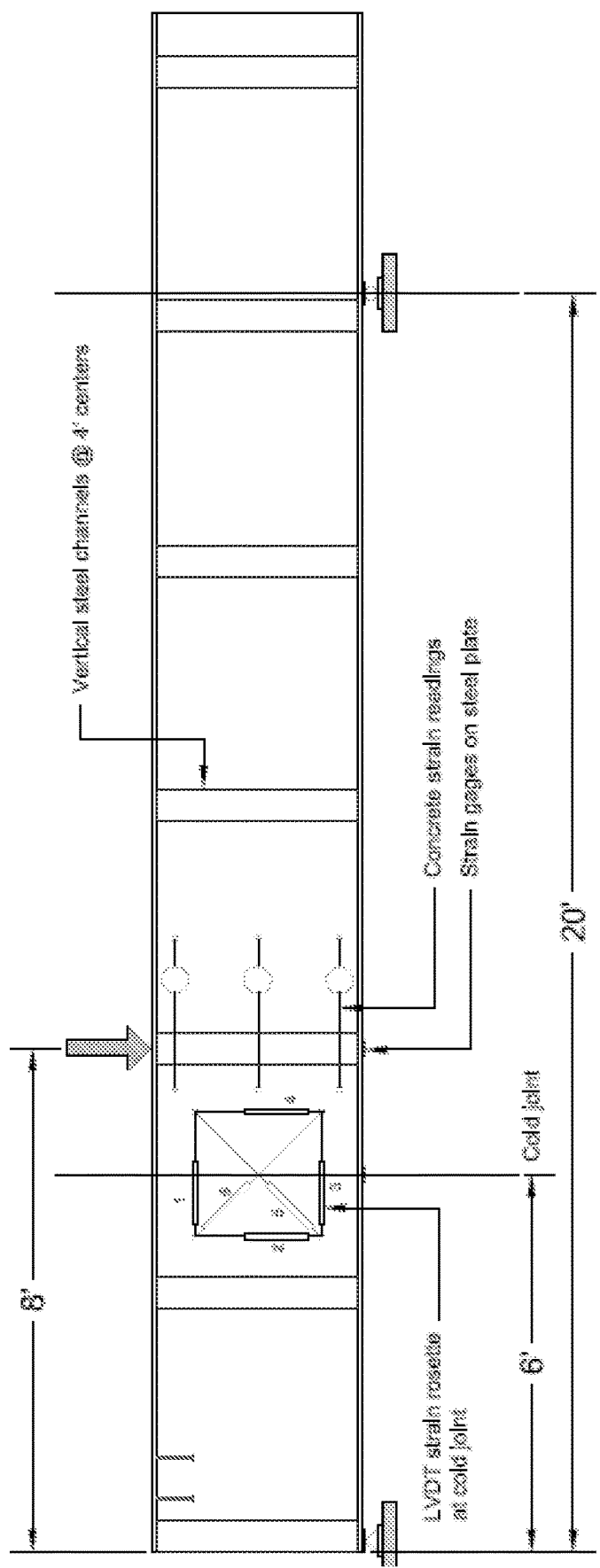
FIG. 37 illustrates a test configuration and instrumentation.

FIG. 39 depicts the load versus strain behavior. The location of the two strain gages is shown in FIG. 37. Interpretation of the strain data is somewhat difficult, as the steel plates at the bottom of the beam are in global tension due to flexure of the specimen, as well as local bending as the concrete in the vicinity of the gages cracks. The most useful gage is the load point gage on the graph. The simplest interpretation of this gage is that it indicates the onset of flexural yielding of the specimen (650 kips). This is confirmed by the modeling of the specimen, discussed hereinafter.

The second strain gage in FIG. 39 depicts the strain gage on the tension plate just under the cold joint. This strain gage shows a significant event at a load level of around 400 kips. As this point a diagonal shear crack propagated down from the load point and intersected the cold joint. The crack then ran vertically down the cold joint. It is concluded that the increase in strain in the plate at this load level comes from the local debonding of the steel plate in the vicinity of the cold joint together with extensive plastic bending of the studs attached to the plate, which leads to the spread of the tension in the plate from the point of maximum moment (at the load point) to the point of debonding (at the cold joint).

FIGS. 40-43 depict the readings from the two vertical and two horizontal LVDTs that cross the cold joint (see FIG. 37 for LVDT numbering). The readings from LVDTs 2 and 4 capture the formation and opening of shear cracks that pass through the cold-joint zone. LVDT 2 also captures the closing of shear cracks that occurred late in the loading regime, at a point when other flexural cracks opened at other locations in the beam. The readings from LVDT 1 are quite small, and indicate the compressive strain in the concrete at the top of the beam. These readings are quite noisy and the large offset in LVDT 1, at the 400 kip load level, represents a slip in the transducer on the support, and not a tensile strain in the concrete. LVDT 3 captures the opening of the cold joint on the tension side of the beam.

Figure 44:
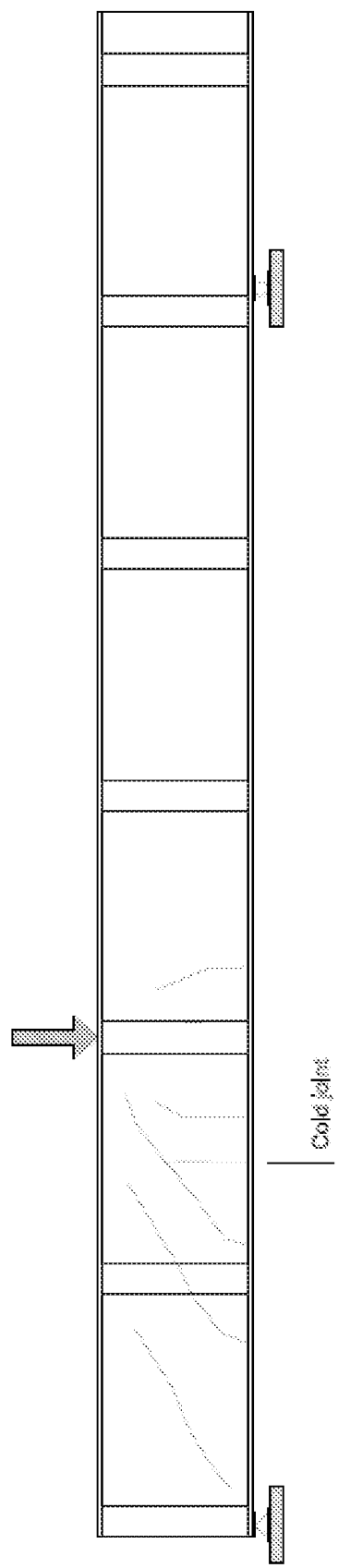
FIG. 44 illustrates the crack patterns in the failed specimen.

Crack patterns in the beam are shown in FIG. 44. The initial cracks in the beam were flexural cracks, primarily vertical, that formed at a spacing of about 10 inches along the bottom of the beam. The first shear crack occurred with a significant release of energy and spread from the load point down diagonally to the mid-height of the cold joint. At that point the crack ran vertically down to the bottom steel plate. As the plate was loaded further, the shear crack began to spread down past the and across the cold joint, maintaining its original angle of about 30 degrees with the horizontal (see in dashed line in the figure). At a later point a second major shear crack occurred, largely parallel with the first.

The cracks indicate the formation of a compression strut between the application of the load point and the steel channel in the module (shown in blue in the figure). This strut would be described as a CTT (compression-tension-tension) strut and is held in equilibrium by tension in the steel plate at the bottom of the beam and tension in the vertical steel channel. Note that this is an important finding, because it recognizes the contribution of the steel channel, which is designed to cross the module faces to carry the hydrostatic loading due to construction, but is not usually considered for structural loading capacity.

The present invention further includes developing relatively simple calculations, in keeping with AISC N690 Appendix N9, that aid in the placement and assessment of cold-joints in the modules. To model the results of the fourth phase specimen, a series of three flexural capacity calculations were made. The model with the largest flexural capacity is then used to assess with the shear capacity of the module, calculated at the cold-joint and considering the possibility of cold-joint failure, is sufficient to develop the flexural capacity of the module.

Figure 45:
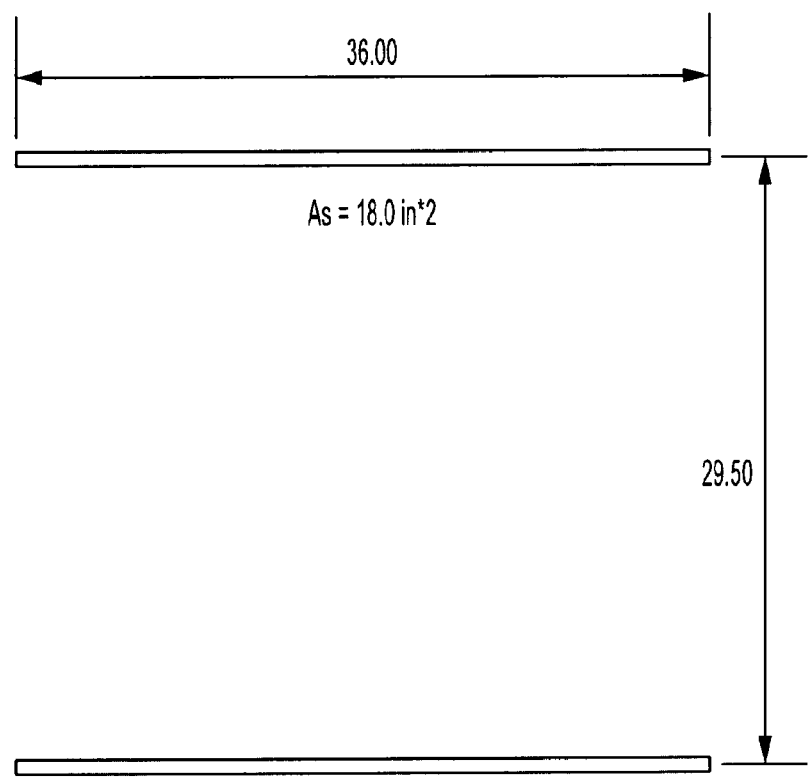
FIGS. 45-47 illustrates simplified flexural modeling of the specimen.
Figure 46:
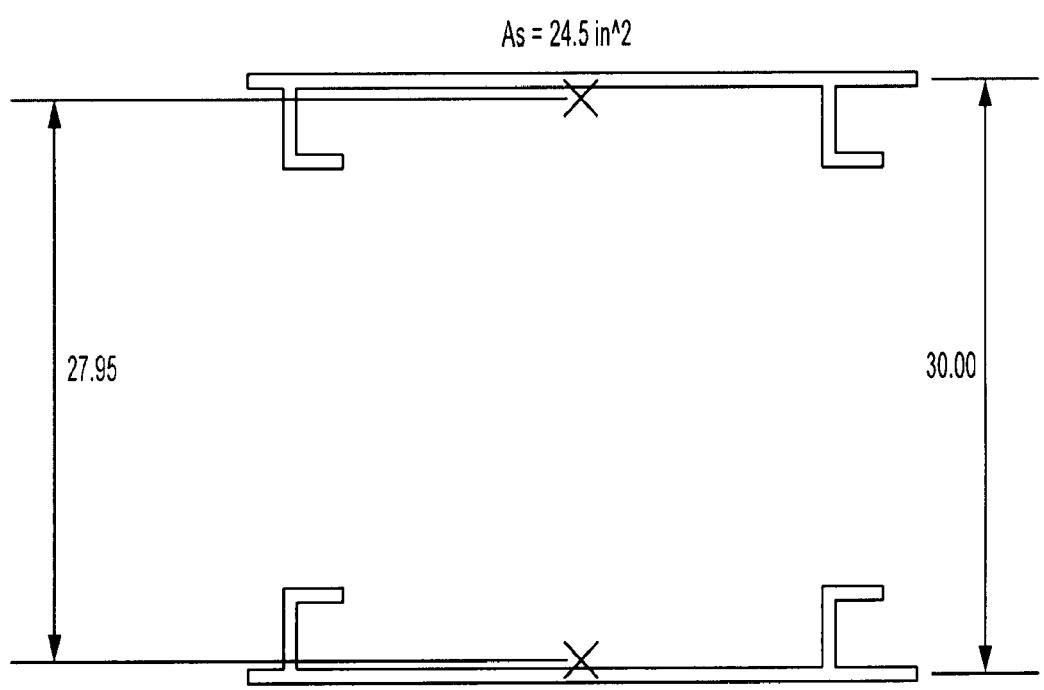
Figure 47:
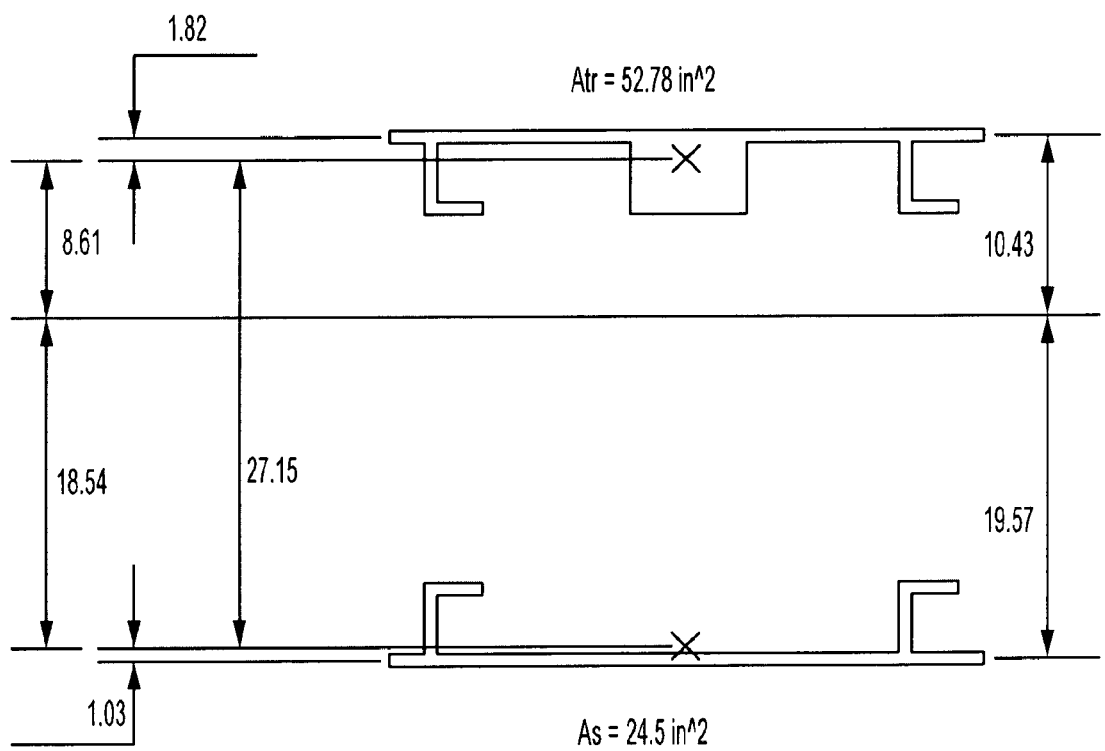
Figure 48:
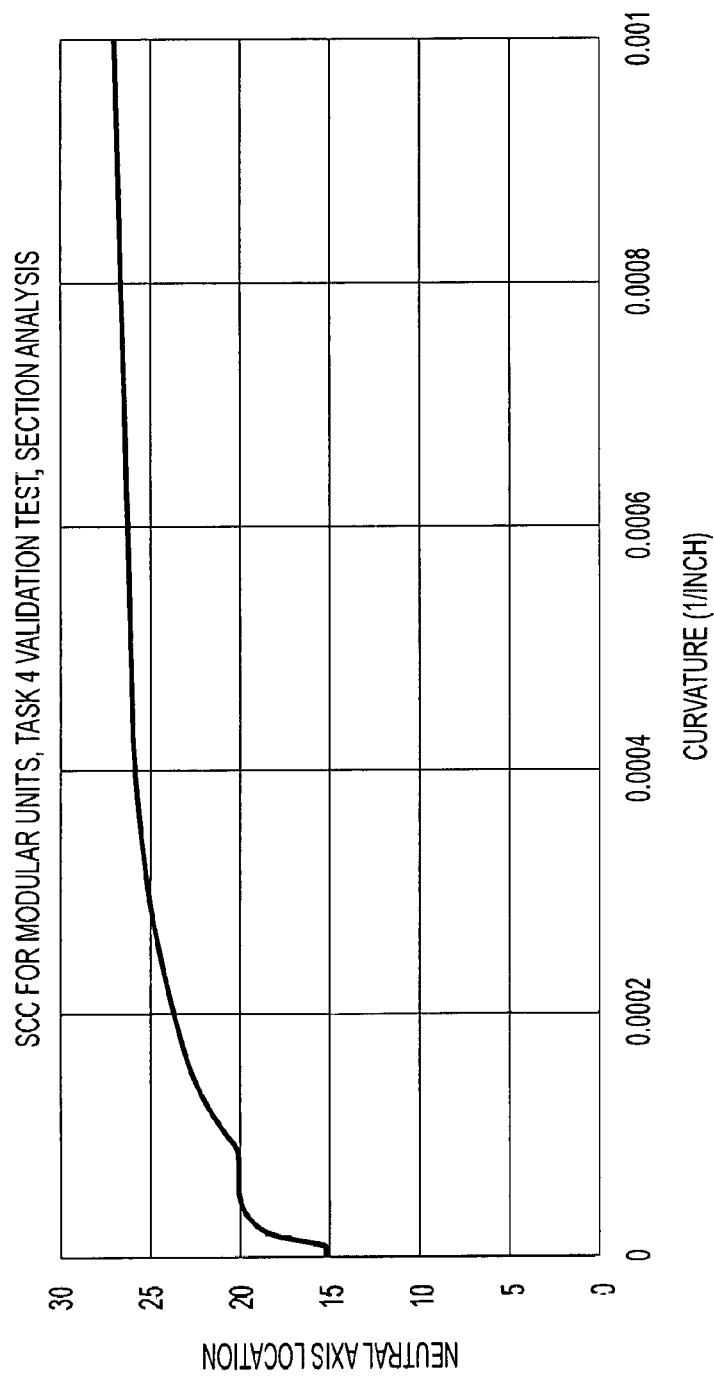
FIGS. 48-49 are graphs providing the calculated neutral axis and moment-curvature relationship for the specimen.
Figure 49:
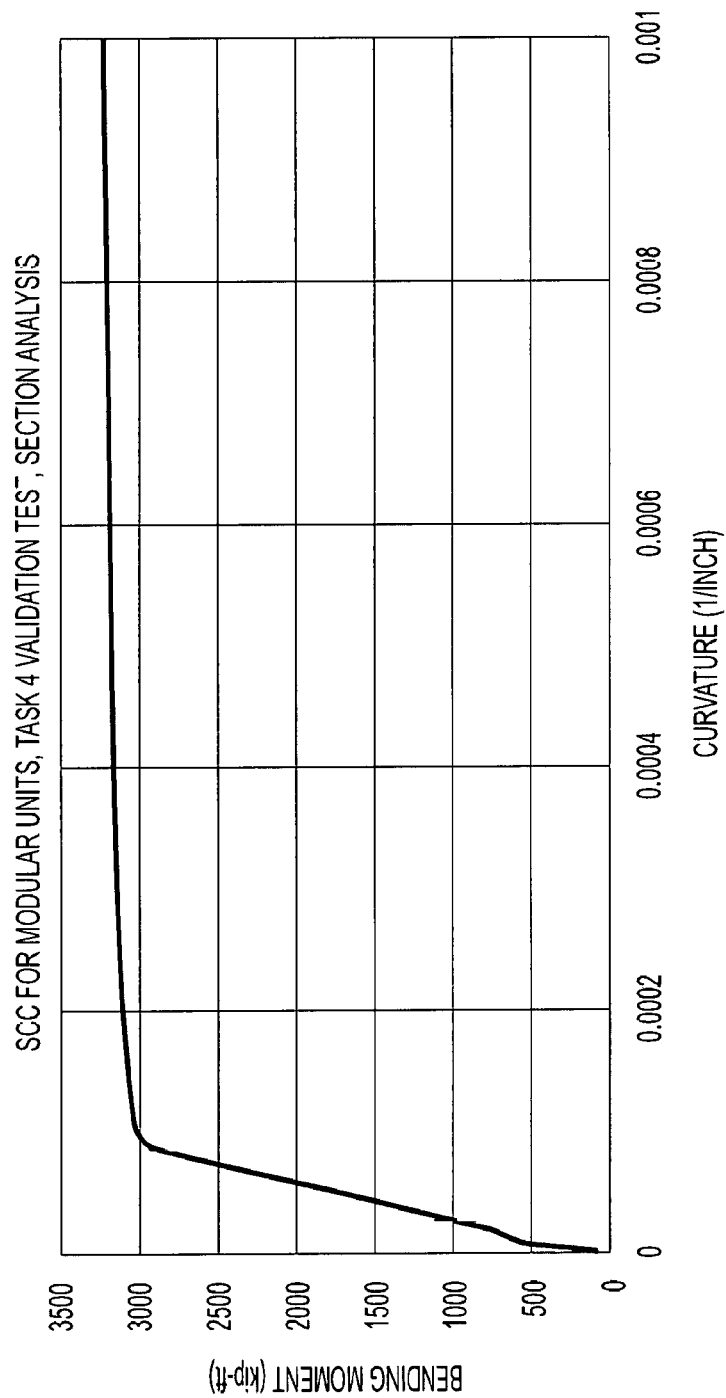

These calculations were based on idealized cross-sections as shown in FIGS. 45-47. In FIG. 45 only the two steel plates are considered. The flexural capacity of the section is calculated as 2,175 kip-feet assuming a steel yield stress of 50 ksi. In FIG. 46 the two steel plates and the continuous steel angles are considered. The flexural capacity of the section is calculated as 3,020 kip-feet assuming that the steel plate and the four angles are fully yielded. Finally, in FIG. 47 the two steel plates and the transformed area of the concrete in compression is considered. In this instance the flexural capacity of the section is calculated to be 3,223 kip-feet. The neutral axis location and moment-curvature relationship for the section shown in FIG. 47 is depicted in FIGS. 48-49. The predicted capacity of the beam in three point bending, taken from the calculated moment-curvature relationship (671 kips), is quite close to the observed peak load from the test (738 kips). It is anticipated that the 10% observe over-strength is due to the fact that the yield strength of the steel is greater than the nominal yield strength of 50 ksi.

Figure 50:
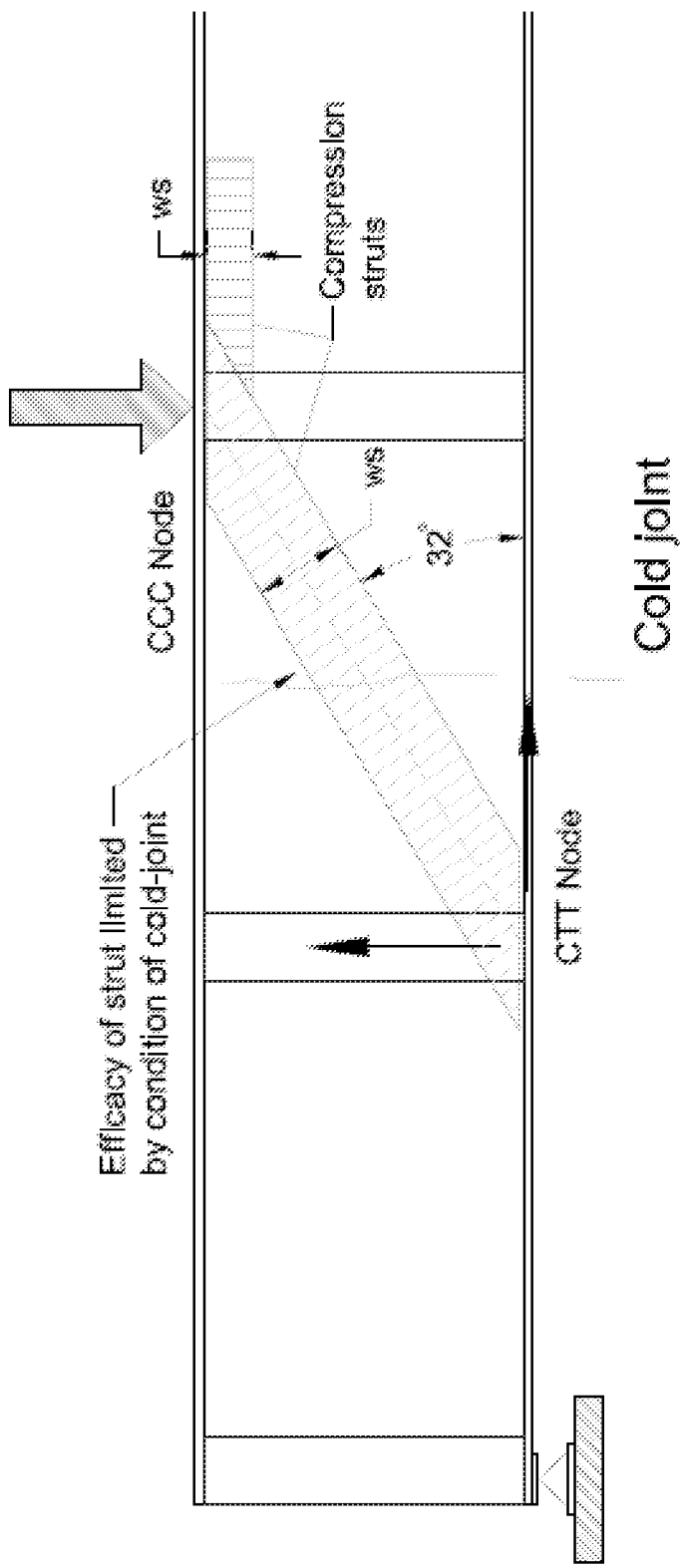
FIG. 50 illustrates a proposed strut and tie model (STM) for modular unit.

Using the flexural strength from the calculation, the shear demand on the joint can be calculated via a modified strut and tie model (STM) as is used in the ACI 318 Building Code Requirements for Structural Concrete (FIG. 50). The compressive capacity of the strut will be a function of the compressive strength and roughness characteristics of the concrete across the cold-joint boundary.

The fourth phase specimen test was successful and necessary to validate the overall findings of the present invention. It is clear that full-scale testing is necessary for validation, even though mid-scale testing such as that completed in the third phase was critical in highlighting the behavior of in-plane versus out-of-plane bending and the potential problems that can occur when poorly roughen cold joints are used.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A method of forming a concrete structure comprising:
    forming a first concrete from a mixture of components;
    pouring a first amount of the first concrete with self-roughening properties derived only from the mixture of components used when forming the first concrete, wherein a first joint surface is formed by the first concrete; and
    pouring a second amount of a second concrete on at least a portion of the first joint surface;
    wherein the first joint surface provides a rough surface derived only from the mixture of components used when forming the first concrete so there is no post pouring modification to the first concrete to derive the self-roughening properties; and
    wherein the first joint surface provides a rough surface so the bond and shear resistance of the interface between the first joint surface of the first concrete and the second concrete are sufficient to form the concrete structure therefrom.

2. The method of claim 1, wherein the first concrete comprises a mixture and lightweight coarse aggregate (LWA);
    wherein the mixture comprises cementitious material, coarse aggregate (CA), fine aggregate (FA), and water;
    wherein the LWA has a specific gravity lower than that of the mixture; and
    wherein the mass of the LWA is not less than approximately 5% of the mass of the CA in the first concrete.

3. The method of claim 2, wherein the first joint surface has a concrete surface profile of 7 or greater; and
    wherein the concrete surface profile is defined by the International Concrete Repair Institute's standard concrete surface profile (CSP).

4. The method of claim 2, wherein the first joint surface has a CSP of 9.

5. The method of claim 2, wherein the first concrete and the second concrete comprises substantially the same mixture of components.

6. The method of claim 2, wherein the first concrete and the second concrete comprises different mixtures of components.

7. The method of claim 2, wherein the first amount and the second amount are substantially the same.

8. The method of claim 2, wherein the first joint surface is formed without manual interference.

9. The method of claim 2, wherein the first joint surface is formed without manual interference via at least a portion of the LWA migrating through an amount of the first concrete.

10. A method of forming a concrete structure comprising:
    forming a first concrete from a mixture of components;
    pouring a first amount of the first concrete with self-roughening properties derived only from the mixture of components used when forming the first concrete, wherein a first horizontal joint surface is formed by the first concrete, the first horizontal joint surface formed free of manual interference; and
    pouring a second amount of a second concrete on at least a portion of the first horizontal joint surface;
    wherein the first horizontal joint surface provides surface roughness derived only from the mixture of components used when forming the first concrete sufficient so the bond and shear resistance of the interface between the first horizontal joint surface of the first concrete and the second concrete poured on top of the first horizontal joint surface are sufficient to form the concrete structure therefrom.

11. The method of claim 10, wherein the first concrete comprises:
    a mixture of:
        a cementitious material;
        coarse aggregate (CA);
        fine aggregate (FA); and
        water; and
    lightweight coarse aggregate (LWA) having a specific gravity lower than that of the mixture;
    wherein the mass of the LWA is not less than approximately 5% of the mass of the CA in the first concrete.

12. The method of claim 11, wherein the first concrete further comprises very fine aggregate (VFA).

13. The method of claim 11, wherein the cementitious material comprises approximately 16%-27% by weight of the first concrete.

14. The method of claim 11, wherein the cementitious material comprises approximately 22%-27% by weight of the first concrete.

15. The method of claim 11, wherein the CA comprises between approximately 31%-36% by weight of the first concrete.

16. The method of claim 11, wherein the FA comprises between approximately 30%-35% by weight of the first concrete.

17. The method of claim 11, wherein at least a portion of the LWA provides self-roughening properties without vibration to the first concrete.

18. The method of claim 10, wherein the first concrete comprises:

| Cementitious | lb/yd$^3$ |
| --- | --- |
| Cement Type I/II | 617 |
| Fly Ash, Class F | 459 |
| Water | 343 |
| w/cm | 0.318 |

-continued

| Cementitious | lb/yd³ |
|---|---|
| Coarse Aggregates | |
| # 67 | 1286 |
| # 89 | — |
| LWA | 15% |
| Fine Aggregates | |
| Natural sand | 678.5 |
| Manufactuted sand | 678.5. |

19. The method of claim 10, wherein forming the first concrete comprises a self-consolidating concrete mixture comprising a sufficient amount of lightweight coarse aggregate (LWA) such that upon subsequent pouring of the first amount of the self-consolidating concrete mixture into steel plate composite modular structures, there is no post pouring modification to the self-consolidating concrete mixture to derive the self-roughening properties, and the pouring can comprises discontinuous concrete pourings.

20. The method of claim 19, wherein the self-consolidating concrete mixture comprises coarse aggregate (CA), and the mass of the LWA is not less than approximately 5% of the mass of the CA in the mixture.

21. The method of claim 10, wherein the first concrete comprises a self-consolidating concrete mixture comprising a sufficient amount of lightweight coarse aggregate (LWA) such that in use it forms the first joint surface comprising a self-roughening cold-joint having a concrete surface profile of 7 or greater, wherein the concrete surface profile is defined by the International Concrete Repair Institute's standard concrete surface profile (CSP).

22. The method of claim 10, wherein the first concrete comprises:

| Cementitious | lb/yd³ | lb/yd³ |
|---|---|---|
| Cement Type I/II | 808 | 808 |
| Fly Ash, Class F | 161 | 161 |
| Water | 315 | 315 |
| w/cm | 0.326 | 0.326 |
| Coarse Aggregates | | |
| # 67 | 1510 | 1510 |
| # 89 | — | — |
| LWA | — | 10% |
| Fine Aggregates | | |
| Natural sand | 712 | 712 |
| Manufactured sand | 712 | 712. |

* * * * *